Oct. 10, 1939.　　　M. M. GOLDBERG　　　2,175,346
ACCOUNTING MACHINE
Filed Aug. 27, 1931　　　39 Sheets-Sheet 1

Inventor
Maximilian M. Goldberg
By Earl Benst
His Attorney

Oct. 10, 1939.                M. M. GOLDBERG                2,175,346
                              ACCOUNTING MACHINE
                           Filed Aug. 27, 1931        39 Sheets-Sheet 2

Inventor
Maximilian M. Goldberg
By
Earl Benst
His Attorney

Oct. 10, 1939.                M. M. GOLDBERG                2,175,346
                             ACCOUNTING MACHINE
                    Filed Aug. 27, 1931          39 Sheets-Sheet 3

Inventor
Maximilian M. Goldberg
By
Earl Bent
His Attorney

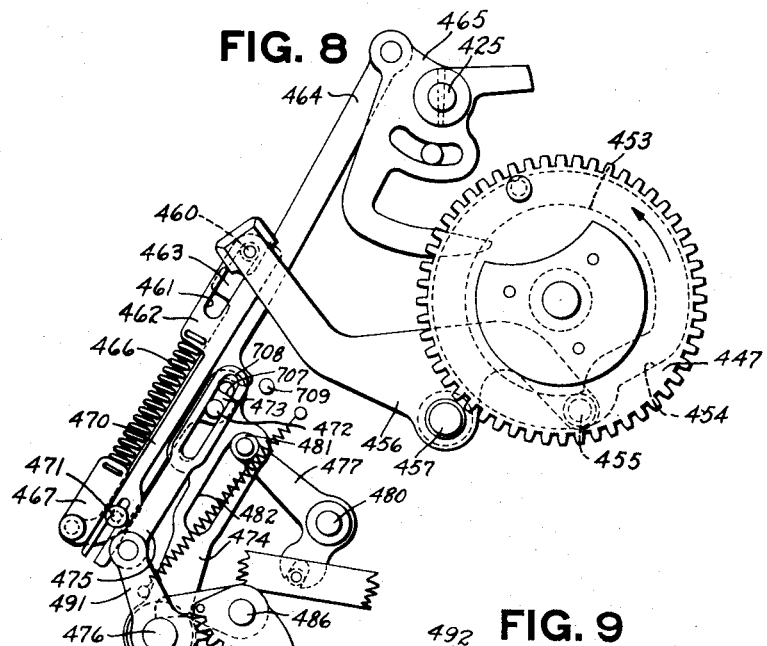
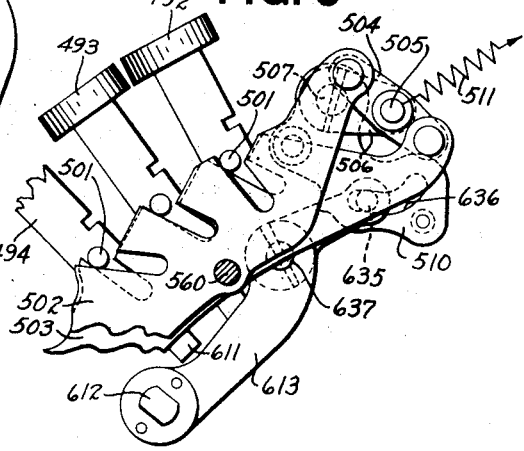
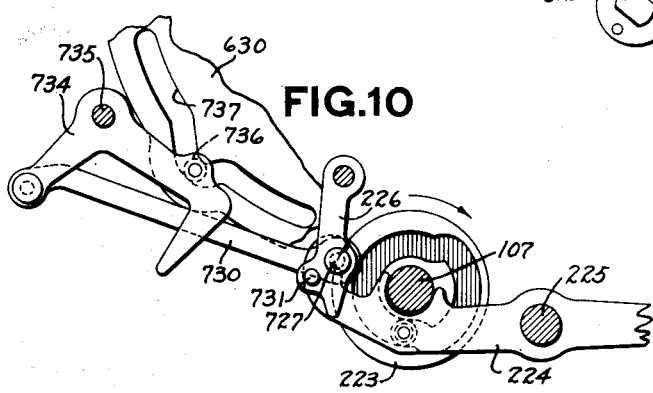

Oct. 10, 1939.  M. M. GOLDBERG  2,175,346
ACCOUNTING MACHINE
Filed Aug. 27, 1931  39 Sheets-Sheet 5

Inventor
Maximilian M. Goldberg
By
*Carl Benst*
His Attorney

Oct. 10, 1939.   M. M. GOLDBERG   2,175,346
ACCOUNTING MACHINE
Filed Aug. 27, 1931   39 Sheets-Sheet 6

Inventor
Maximilian M. Goldberg
By
Carl Beust
His Attorney

Oct. 10, 1939.　　M. M. GOLDBERG　　2,175,346
ACCOUNTING MACHINE
Filed Aug. 27, 1931　　39 Sheets-Sheet 7

Inventor
Maximilian M. Goldberg
By
His Attorney

Oct. 10, 1939.  M. M. GOLDBERG  2,175,346
ACCOUNTING MACHINE
Filed Aug. 27, 1931  39 Sheets-Sheet 8

Inventor
Maximilian M. Goldberg
By
Earl Beust

His Attorney

Oct. 10, 1939.  M. M. GOLDBERG  2,175,346
ACCOUNTING MACHINE
Filed Aug. 27, 1931  39 Sheets-Sheet 9

Inventor
Maximilian M. Goldberg
By Carl Benst
His Attorney

Oct. 10, 1939.  M. M. GOLDBERG  2,175,346
ACCOUNTING MACHINE
Filed Aug. 27, 1931  39 Sheets-Sheet 10
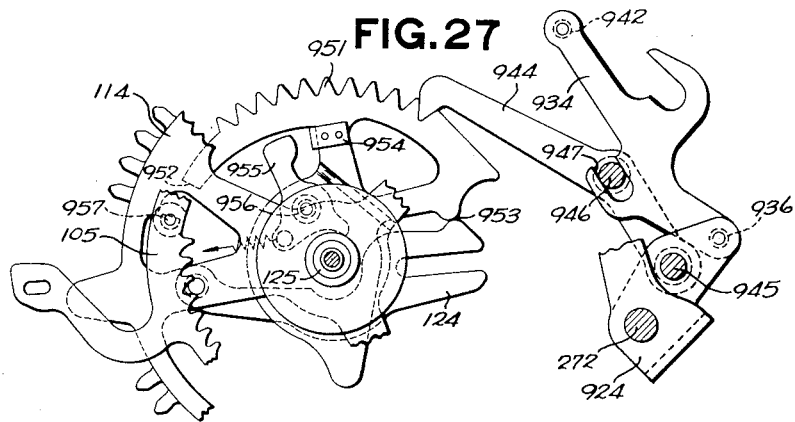
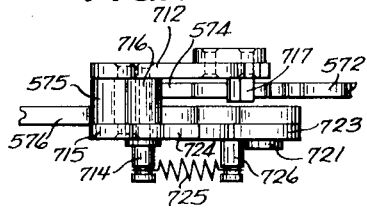
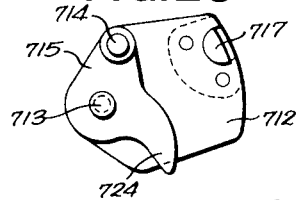
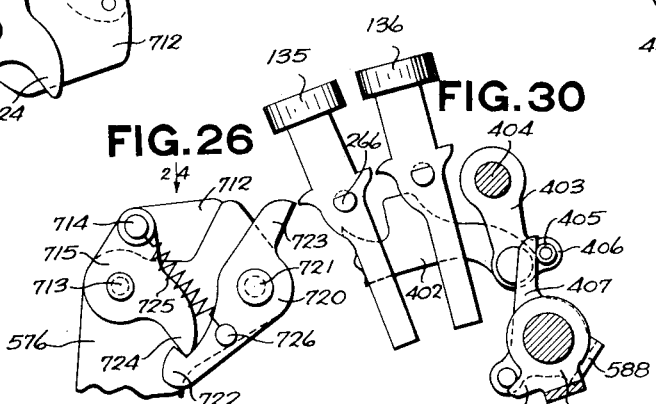
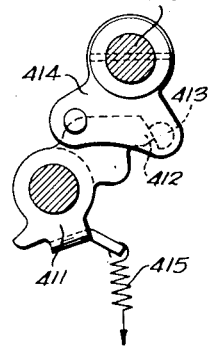
Inventor
Maximilian M. Goldberg
By Carl Beust
His Attorney

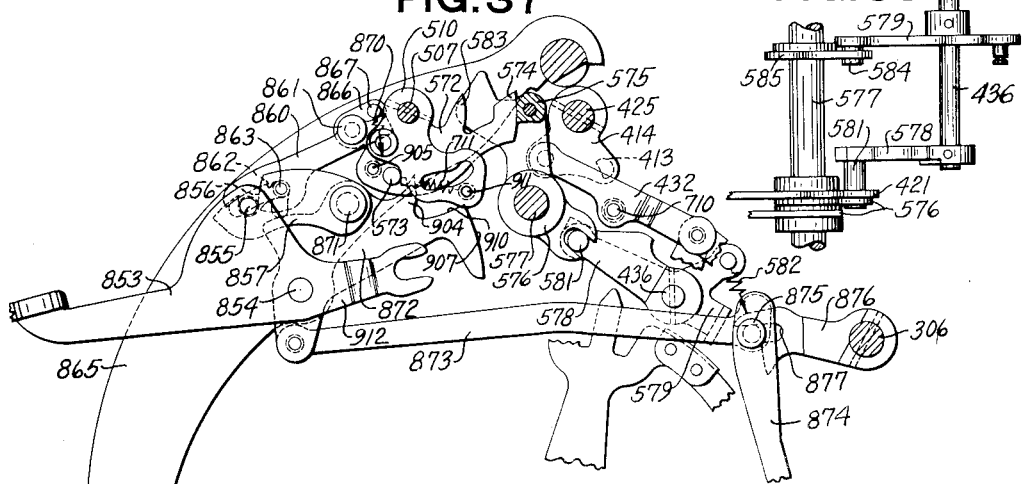
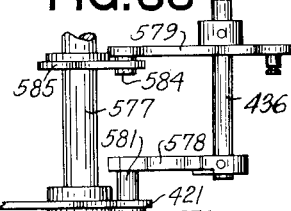
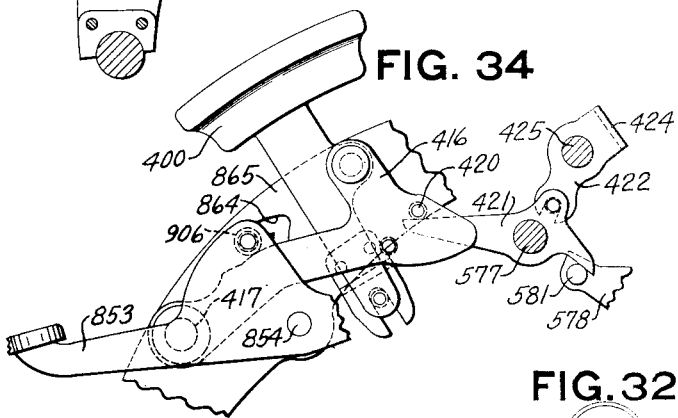
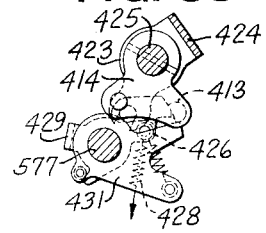
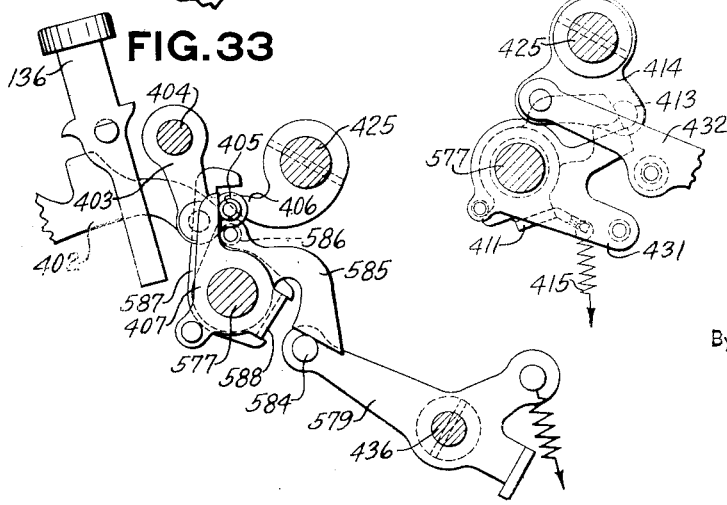
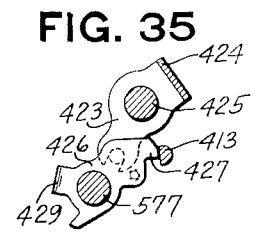

Oct. 10, 1939. M. M. GOLDBERG 2,175,346
ACCOUNTING MACHINE
Filed Aug. 27, 1931 39 Sheets-Sheet 12

Inventor
Maximilian M. Goldberg
By
Earl Benst
His Attorney

Inventor
Maximilian M. Goldberg
By
Carl Beust
His Attorney

Oct. 10, 1939.  M. M. GOLDBERG  2,175,346
ACCOUNTING MACHINE
Filed Aug. 27, 1931  39 Sheets-Sheet 14

Inventor
Maximilian M. Goldberg
By
Carl Beust
His Attorney

Oct. 10, 1939.  M. M. GOLDBERG  2,175,346
ACCOUNTING MACHINE
Filed Aug. 27, 1931  39 Sheets-Sheet 15

Inventor
Maximilian M. Goldberg
By Earl Beust
His Attorney

Oct. 10, 1939.  M. M. GOLDBERG  2,175,346
ACCOUNTING MACHINE
Filed Aug. 27, 1931   39 Sheets-Sheet 17

Inventor
Maximilian M. Goldberg
By
Carl Beust
His Attorney

Oct. 10, 1939.                M. M. GOLDBERG                2,175,346
                              ACCOUNTING MACHINE
                            Filed Aug. 27, 1931          39 Sheets-Sheet 18

Inventor
Maximilian M. Goldberg
By
Carl Beust

His Attorney

Oct. 10, 1939.    M. M. GOLDBERG    2,175,346
ACCOUNTING MACHINE
Filed Aug. 27, 1931    39 Sheets-Sheet 19

Inventor
Maximilian M. Goldberg
By Earl Beust
His Attorney

Oct. 10, 1939.  M. M. GOLDBERG  2,175,346
ACCOUNTING MACHINE
Filed Aug. 27, 1931  39 Sheets-Sheet 20

Inventor
Maximilian M. Goldberg
By
Earl Benst
His Attorney

Oct. 10, 1939.　　　M. M. GOLDBERG　　　2,175,346
ACCOUNTING MACHINE
Filed Aug. 27, 1931　　　39 Sheets-Sheet 21
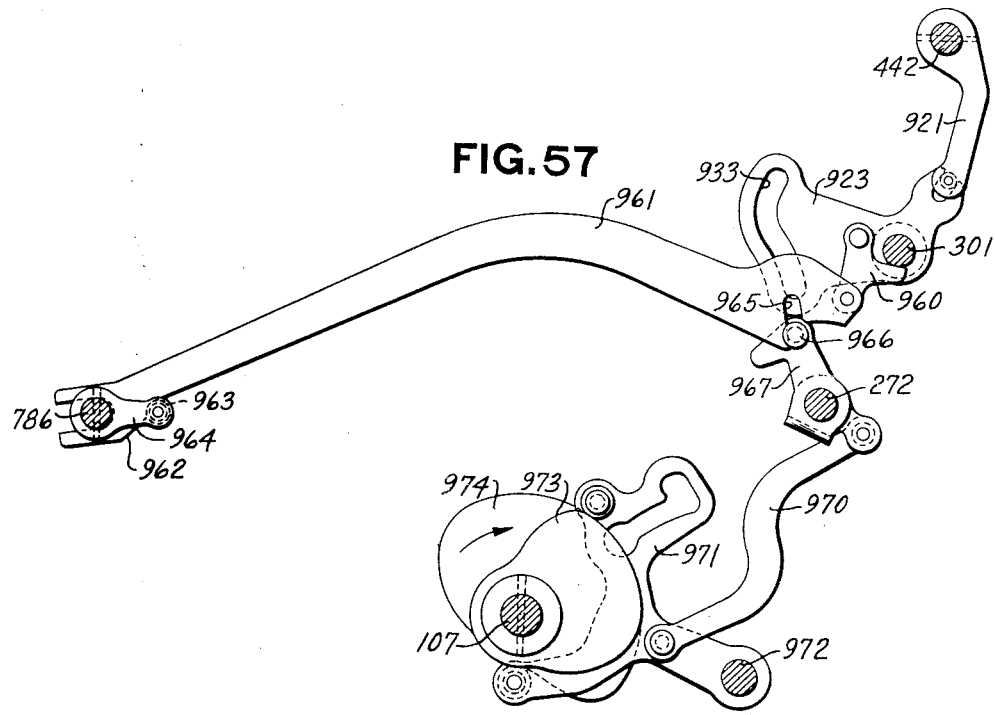
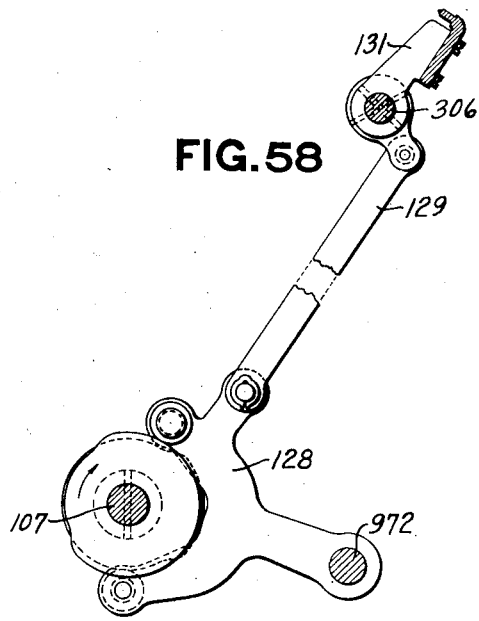
Inventor
Maximilian M. Goldberg
By
Earl Benst
His Attorney Oct. 10, 1939.   M. M. GOLDBERG   2,175,346
ACCOUNTING MACHINE
Filed Aug. 27, 1931   39 Sheets-Sheet 22
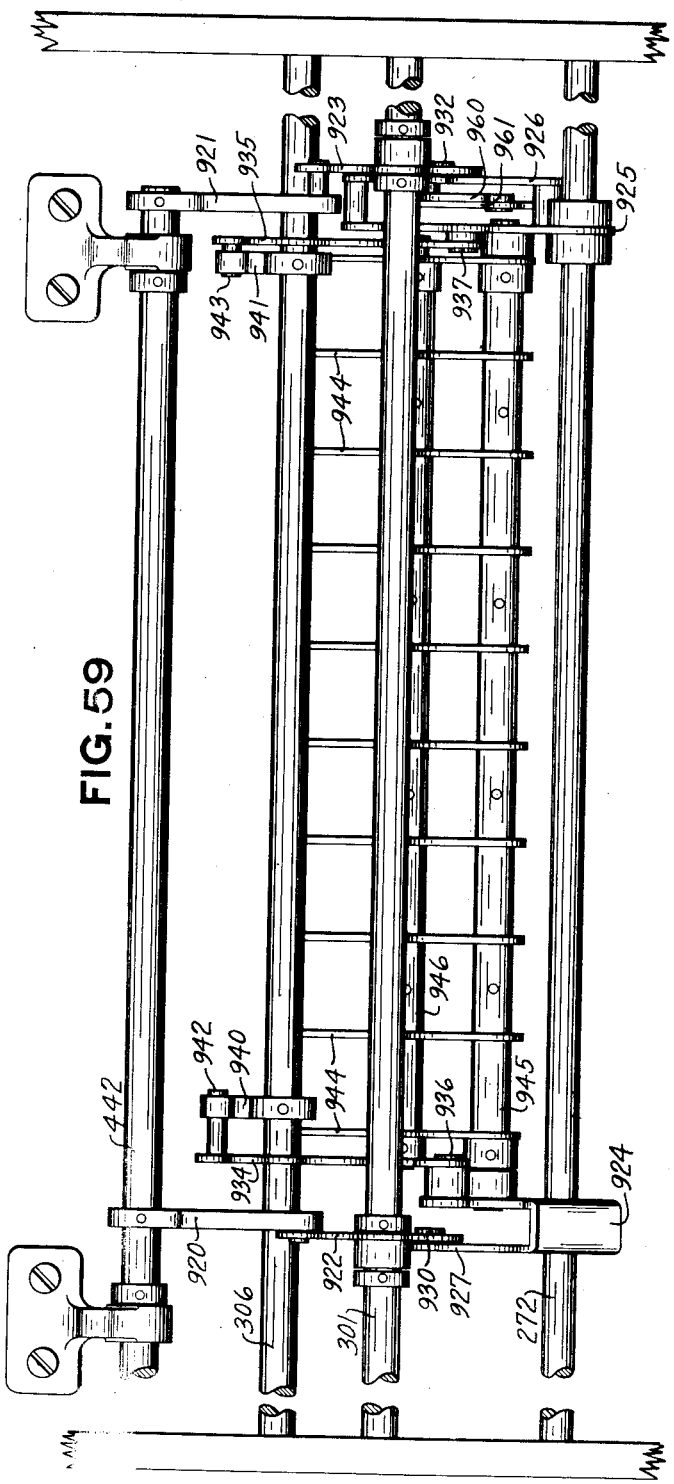
Inventor
Maximilian M. Goldberg
By
His Attorney Oct. 10, 1939.  M. M. GOLDBERG  2,175,346
ACCOUNTING MACHINE
Filed Aug. 27, 1931  39 Sheets-Sheet 23
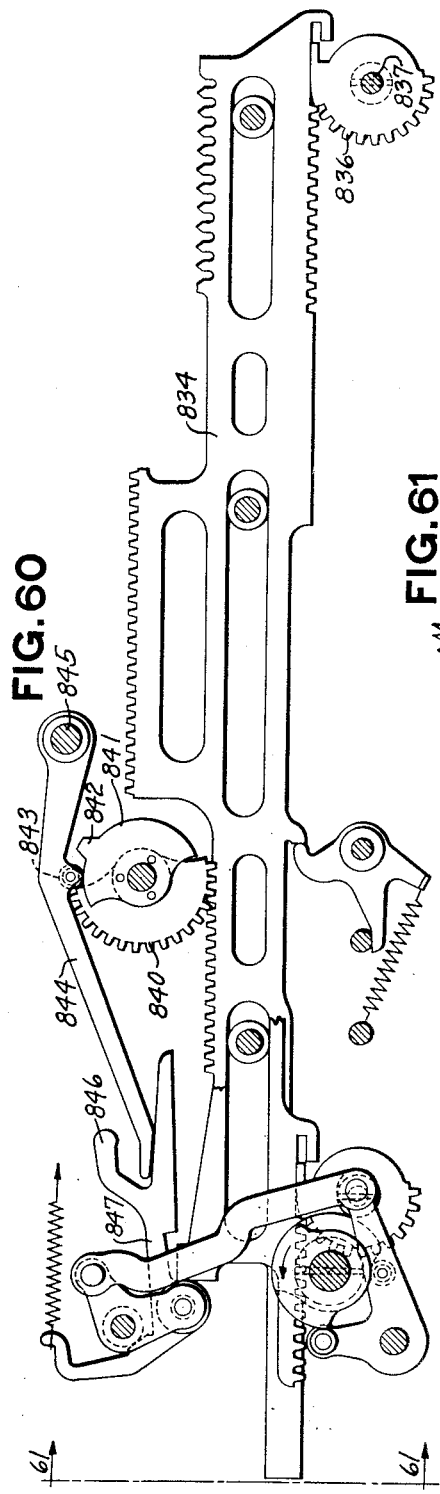
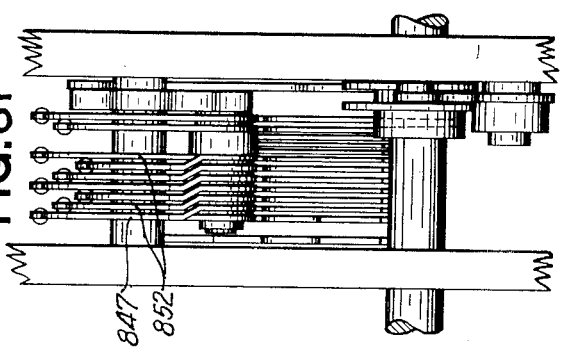
Inventor
Maximilian M. Goldberg
By Carl Benst
His Attorney

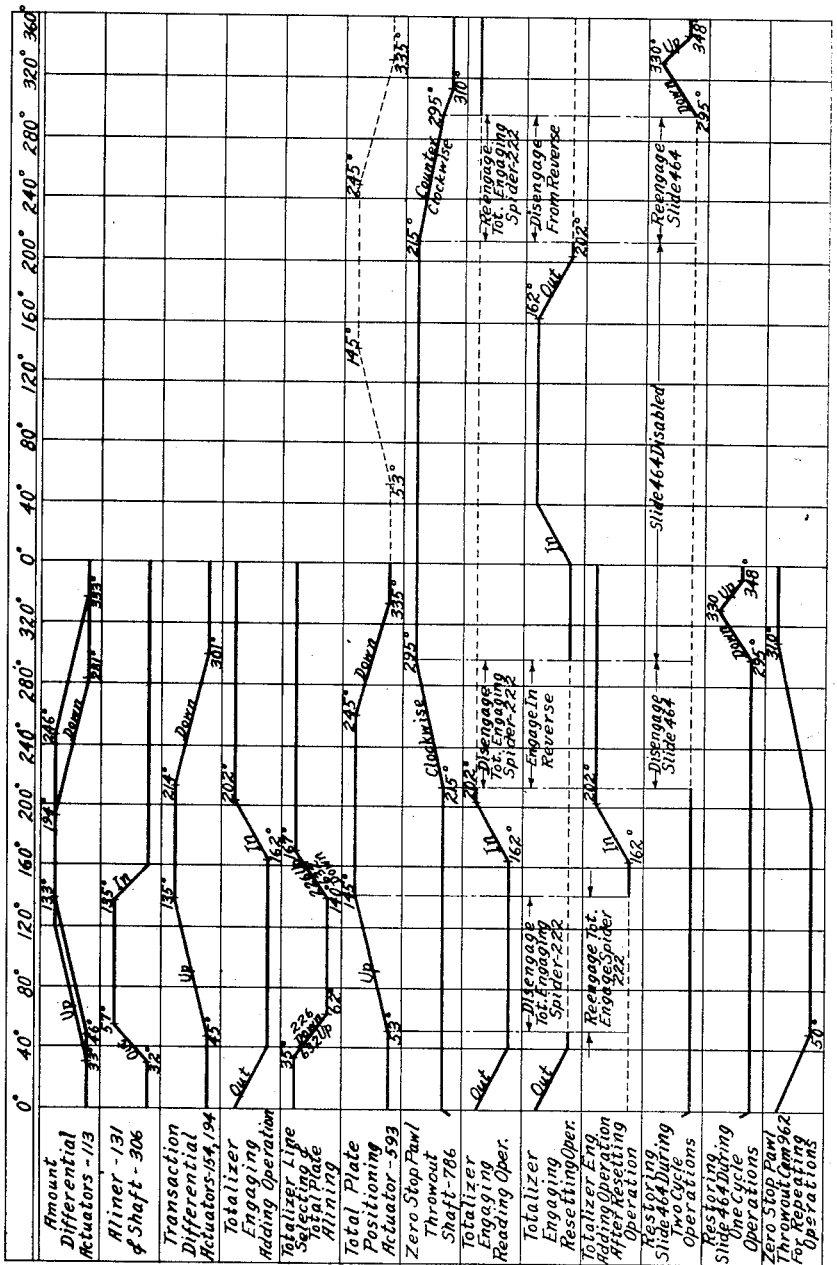

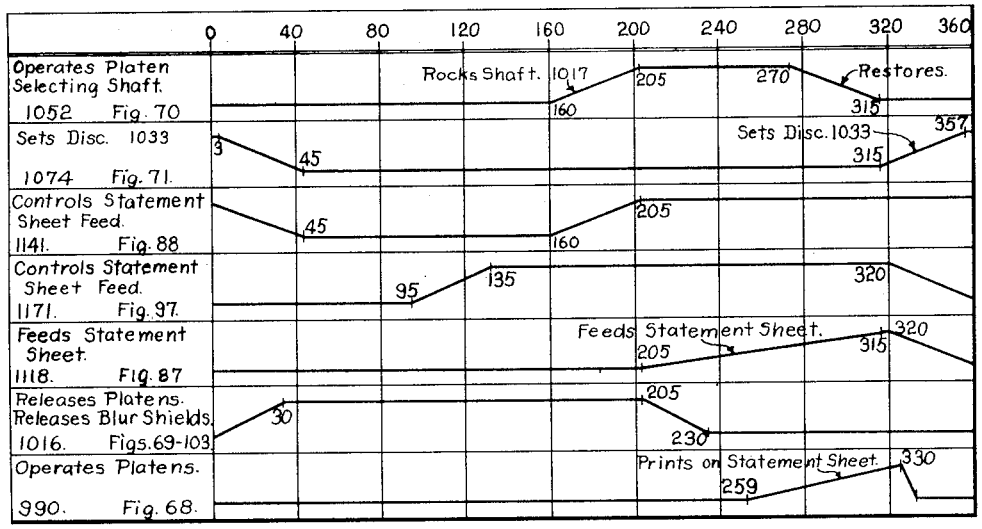

Oct. 10, 1939.    M. M. GOLDBERG    2,175,346
ACCOUNTING MACHINE
Filed Aug. 27, 1931    39 Sheets-Sheet 26

FIG.64

JOHN DOE COMMERCIAL BANK
ANYWHERE, OHIO

ND — Notes Discounted
IN — Interest
CL — Collection
+ — Deposit
— — Clearing House.
US — Counter Checks.
CH — Collection Charges
CC — Certified Checks.

| | MEMO | DATE | CHECKS | CHECKS. | DEPOSITS | TR. DATE | BALANCE |
|---|---|---|---|---|---|---|---|
| 1 | 1 | * | 2.50* | 5.00* | 250.00 +US. | | |
| 2 | 2 | * | 3.00* | 1.25 | | — | |
| 3 | 3 | 7-1-31* | 10.00 | | | — 7-1 • | 228.25 |
| 4 | 4 | * | 5.00* | 7.50 | | — | |
| 5 | 5 | * | 10.00* | 20.00 | | — | |
| 6 | 6 | * | 50.00* | 2.00 | | — | |
| 7 | 7 | 7-9-31* | 1.00 | | | — 7-9 • | 132.75 |
| 8 | 8 | * | 50.00* | 70.00 | | US. | |
| 9 | 9 | * | 10.00* | 5.00 | | — | |
| 10 | 10 | 7-12-31* | 1.00 | | | US 7-12 | 20,000,003.25 |
| 11 | 11 | | | | | | |
| 12 | 12 | | | | | | |
| 13 | 13 | | | | | | |
| 14 | 14 | | | | | | |
| 15 | 15 | | | | | | |
| 16 | 16 | | | | | | |
| 17 | 17 | | | | | | |
| 18 | 18 | | | | | | |
| 19 | 19 | | | | | | |
| 20 | 20 | | | | | | |
| 21 | 21 | | | | | | |
| 22 | 22 | | | | | | |
| 23 | 23 | | | | | | |
| 24 | 24 | | | | | | |
| 25 | 25 | | | | | | |
| 26 | 26 | | | | | | |
| 27 | 27 | | | | | | |
| 28 | 28 | | | | | | |
| 29 | 29 | | | | | | |
| 30 | 30 | | | | | | |
| 31 | 31 | | | | | | |

Inventor
Maximilian M. Goldberg
By
Earl Beust
His Attorney

Oct. 10, 1939.   M. M. GOLDBERG   2,175,346
ACCOUNTING MACHINE
Filed Aug. 27, 1931   39 Sheets-Sheet 28

FIG. 66

Inventor
Maximilian M. Goldberg
By Carl Beust
His Attorney

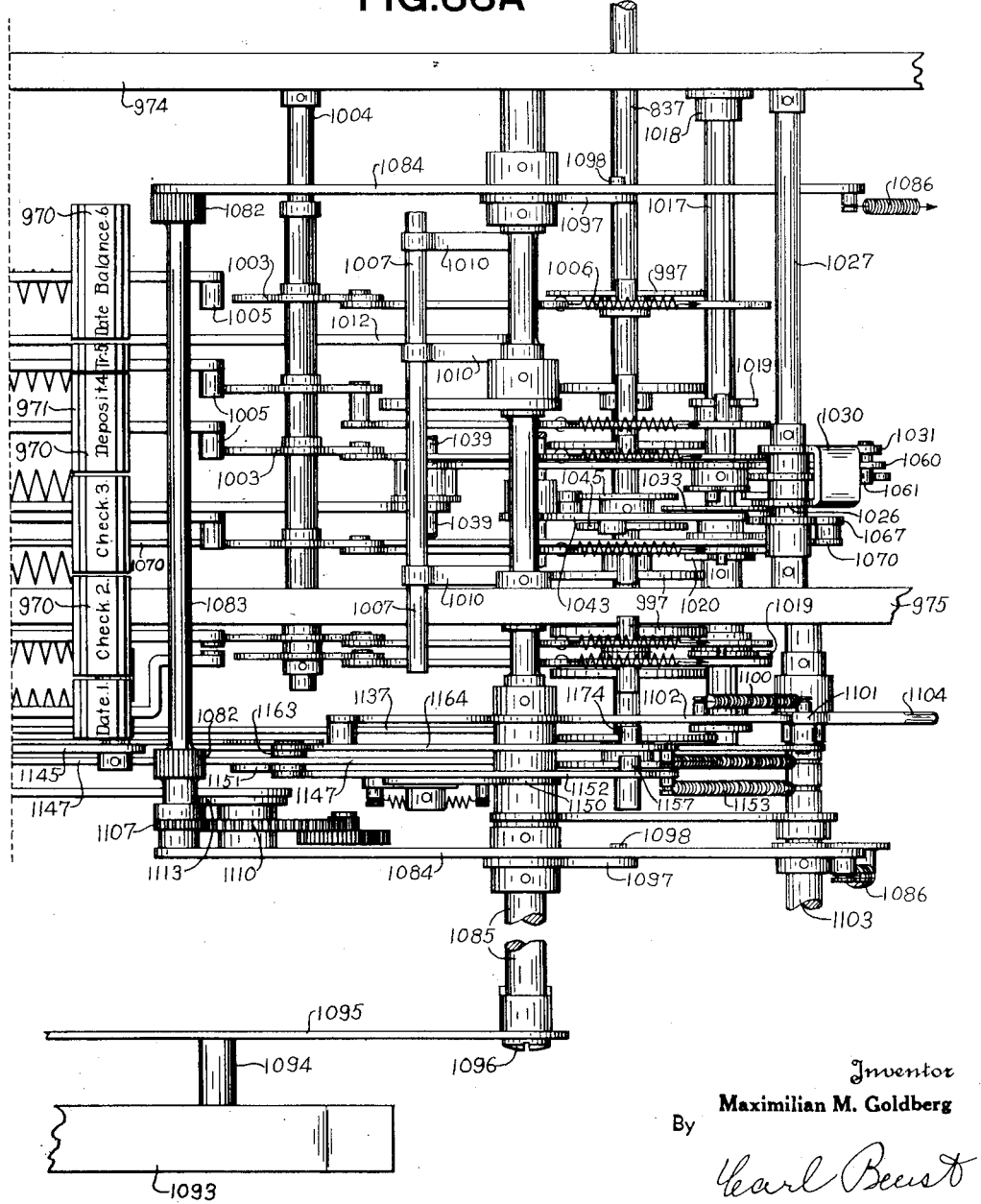

Oct. 10, 1939.   M. M. GOLDBERG   2,175,346
ACCOUNTING MACHINE
Filed Aug. 27, 1931    39 Sheets—Sheet 30
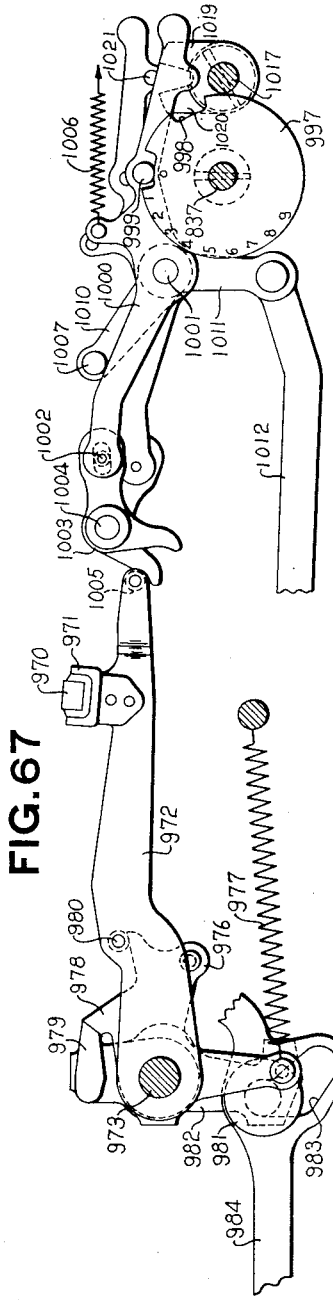
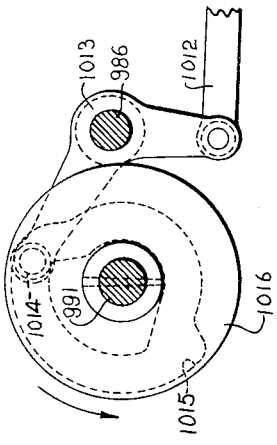
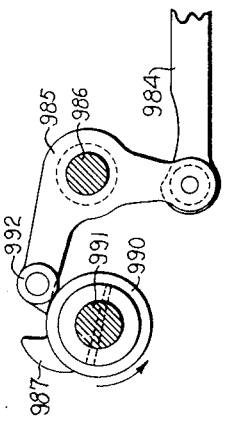
Inventor
Maximilian M. Goldberg
By
Earl Beust
His Attorney Oct. 10, 1939.                M. M. GOLDBERG                    2,175,346
                              ACCOUNTING MACHINE
                          Filed Aug. 27, 1931         39 Sheets-Sheet 31
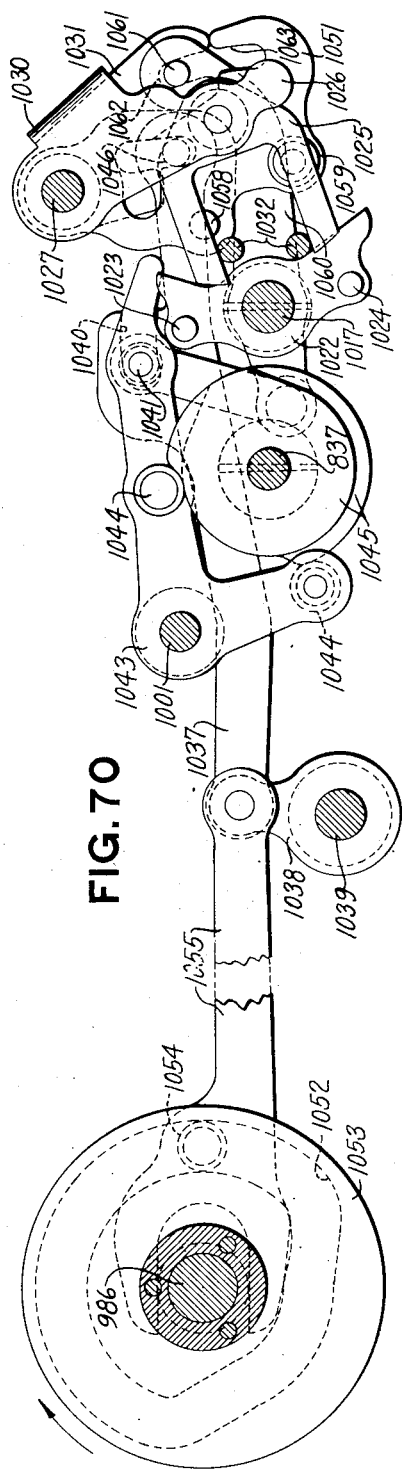
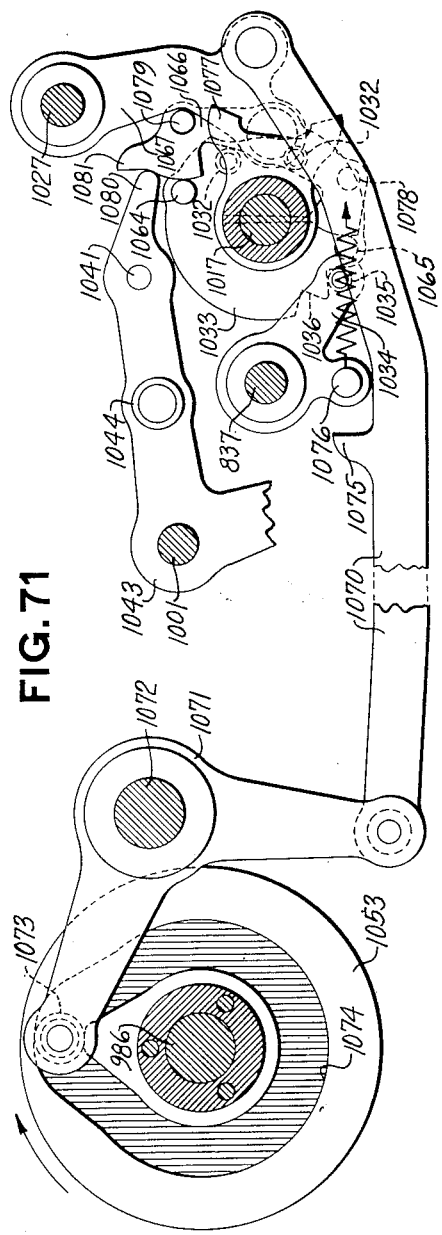
Inventor
Maximilian M. Goldberg
By
Earl Berest
His Attorney Oct. 10, 1939.   M. M. GOLDBERG   2,175,346
ACCOUNTING MACHINE
Filed Aug. 27, 1931   39 Sheets-Sheet 32

Inventor
Maximilian M. Goldberg
By
Carl Beust
His Attorney

Oct. 10, 1939.                M. M. GOLDBERG                 2,175,346
                             ACCOUNTING MACHINE
                             Filed Aug. 27, 1931          39 Sheets-Sheet 33

Inventor
Maximilian M. Goldberg
By
Carl Benst
His Attorney

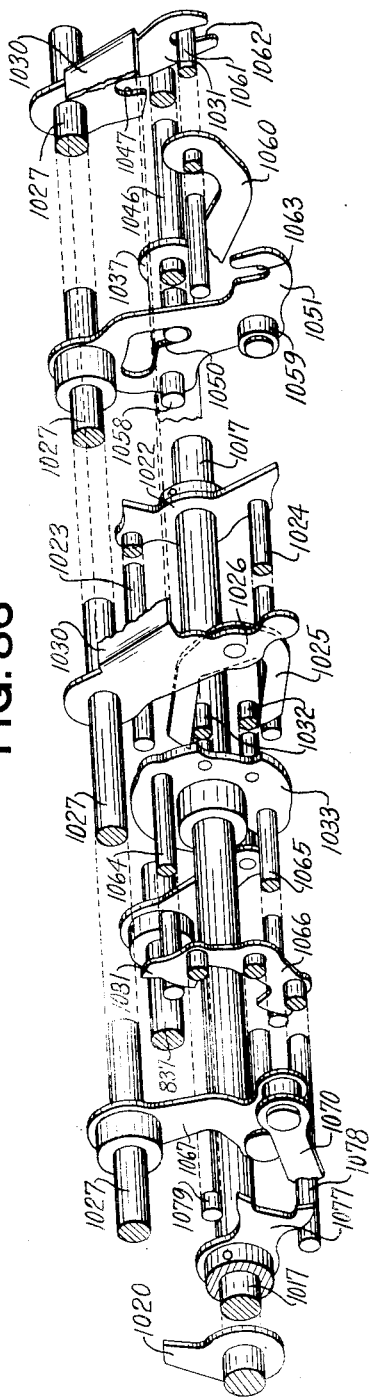

Oct. 10, 1939.  M. M. GOLDBERG  2,175,346
ACCOUNTING MACHINE
Filed Aug. 27, 1931  39 Sheets-Sheet 35
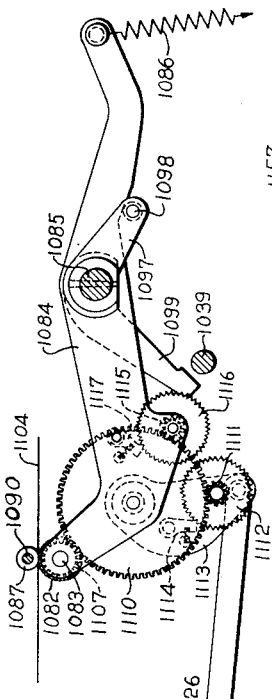
FIG. 87
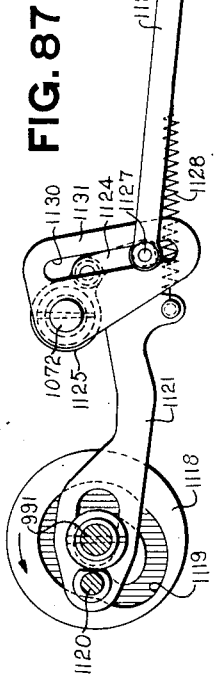
FIG. 88
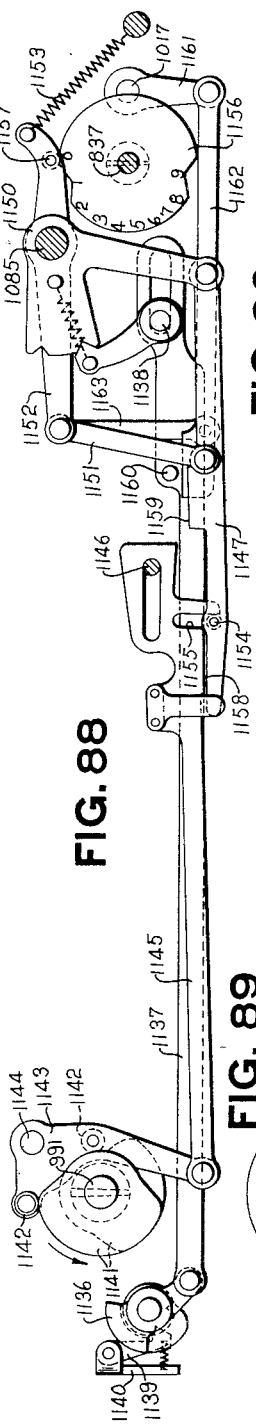
FIG. 89
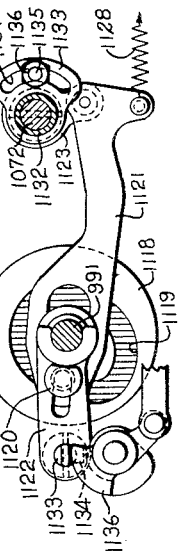
FIG. 90
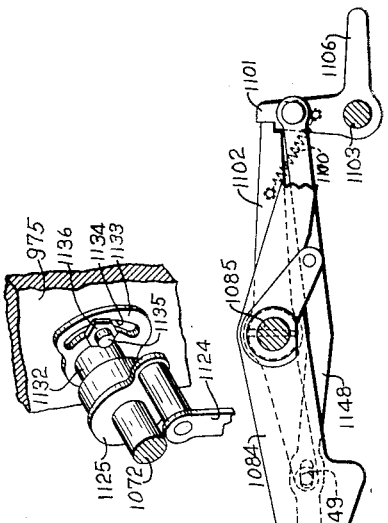
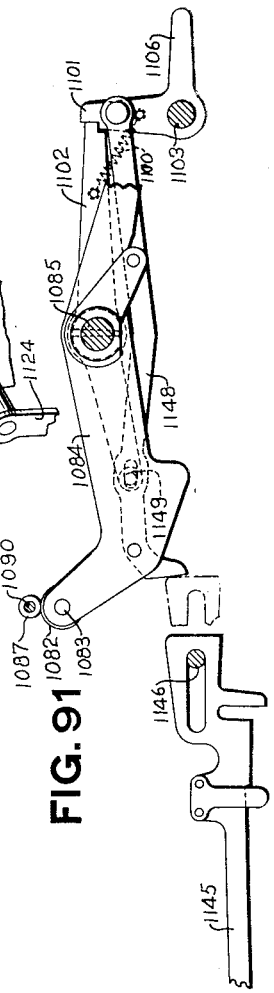
FIG. 91
Inventor
Maximilian M. Goldberg
By Carl Beust
His Attorney

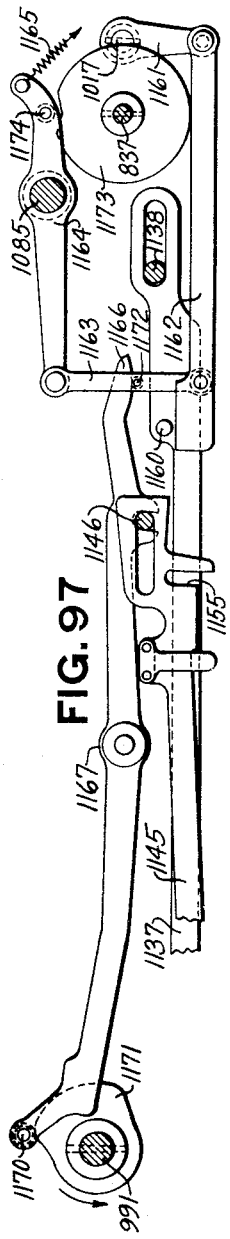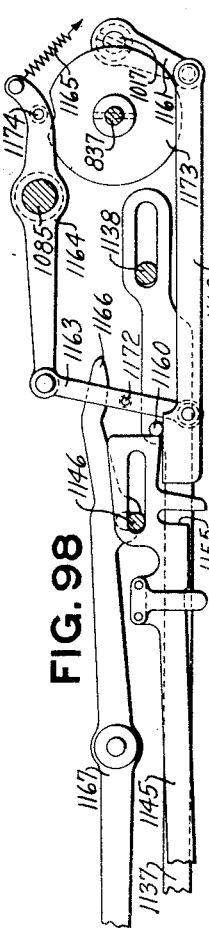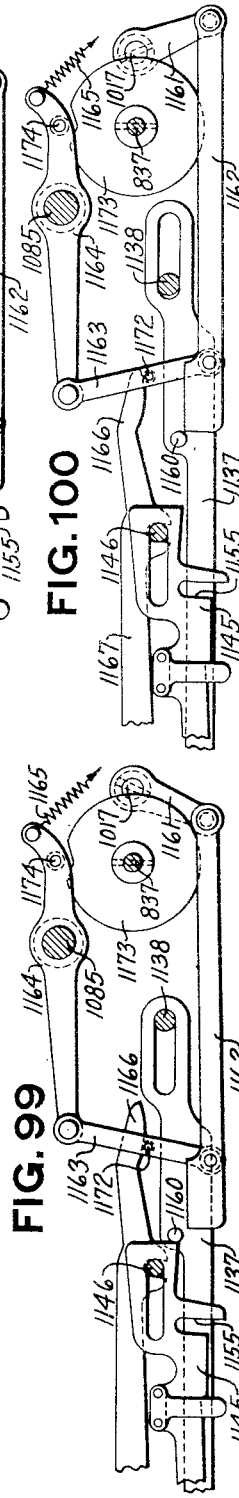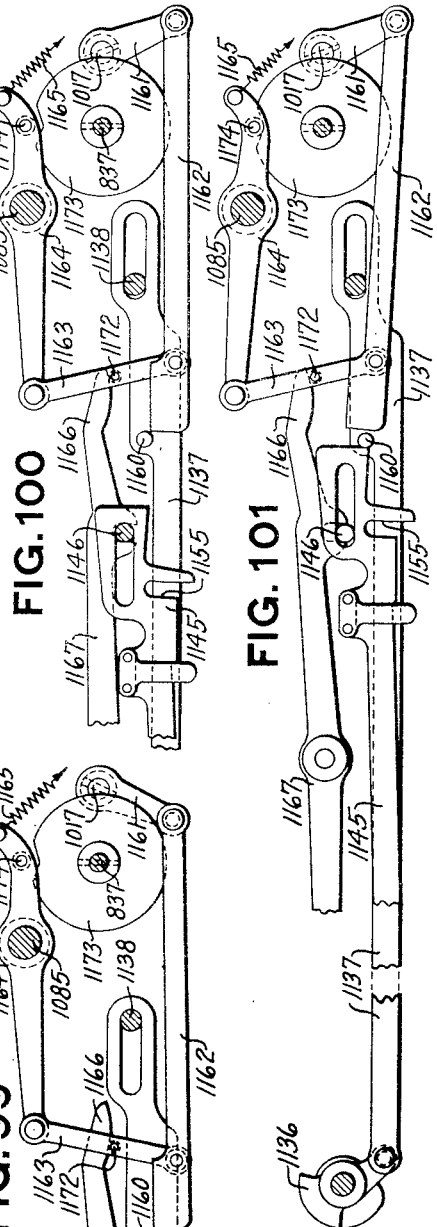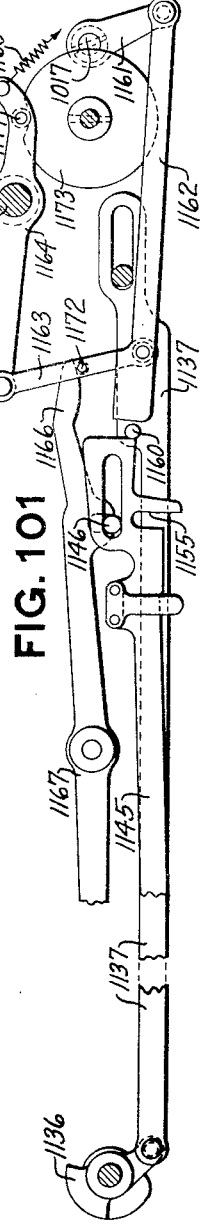

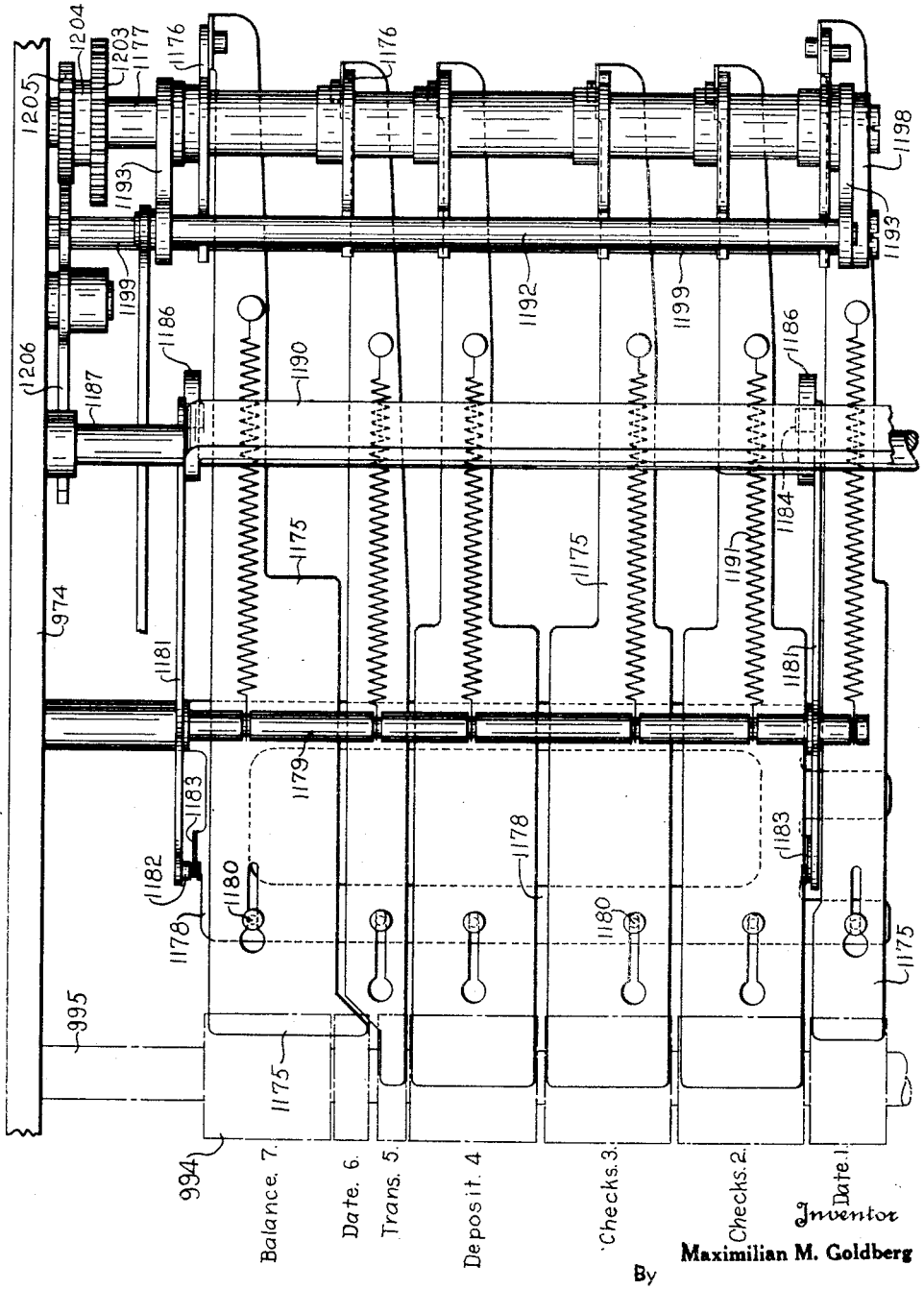

Oct. 10, 1939.  M. M. GOLDBERG  2,175,346
ACCOUNTING MACHINE
Filed Aug. 27, 1931   39 Sheets-Sheet 39
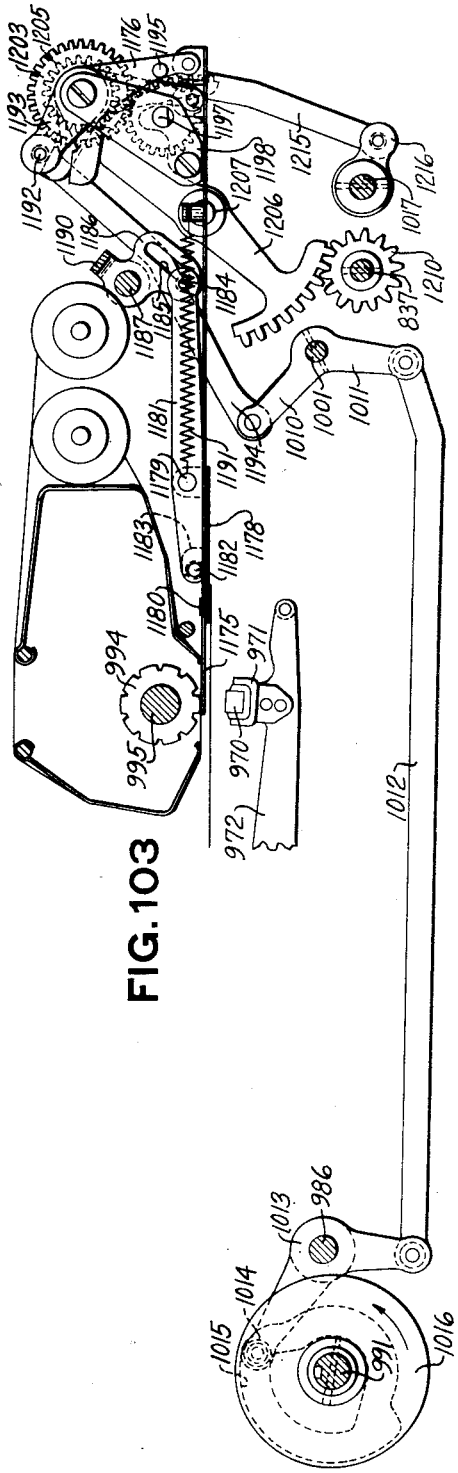
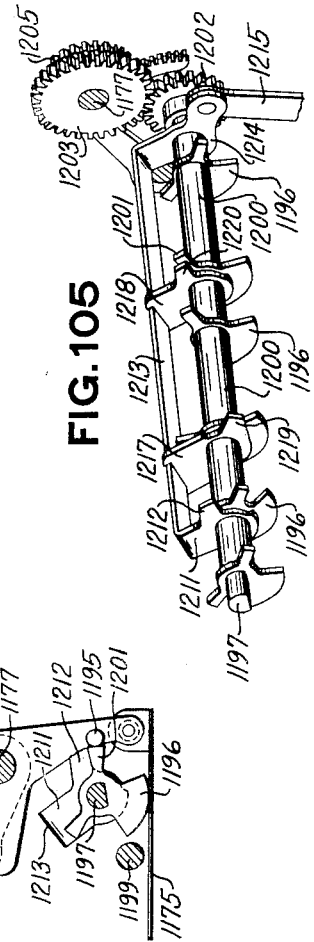
Inventor
Maximilian M. Goldberg
By Carl Beust
His Attorney Patented Oct. 10, 1939

2,175,346

UNITED STATES PATENT OFFICE 2,175,346

ACCOUNTING MACHINE

Maximilian M. Goldberg, Dayton, Ohio, assignor to The National Cash Register Company, Dayton, Ohio, a corporation of Maryland Application August 27, 1931, Serial No. 559,720

105 Claims. (Cl. 235—2)

This invention relates to business machines and more particularly to that type involving the adding and subtracting of amounts, the taking of totals and repeating of those totals, and the transferring of them from one register to another.

The present embodiment of the invention shows it in connection with a machine adopted to compute balances of customer's accounts in banking houses and the like, but it is to be understood that the invention can as readily be applied to other machines in the field of computing and accounting.

One of the objects of this invention is to provide a machine capable of balancing, total taking, repeating, and transferring totals of amounts, with a minimum of mental and physical manipulation on the part of the operator. Other objects of the invention are, to provide an improved total reading and resetting mechanism, and one which will not require the depression of the customary motor bar; to provide suitable inter-locks between the various keys; to provide a novel device to prevent repeated operations of the machine if a total key is held depressed during an entire operation; to provide an improved mechanism to automatically select the proper side of the add and subtract, or "balance" totalizer upon the depression of a transaction key; to provide a novel overdraft mechanism, to add to the totalizer the fugitive unit whenever the totalizer passes through zero; to provide a novel mechanism to automatically shift the add and subtract totalizer for a total reading and resetting operation, so as to show the algebraic total standing thereon; to provide a suitable mechanism to print the positive and negative totals in such a manner that they will be readily distinguishable; to provide an improved repeat mechanism; to provide a mechanism to automatically select a totalizer in accordance with the algebraic state of the number standing on another totalizer, and also to automatically enter this number in the selected totalizer simply by the depression of a key.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

Fig. 3 is a side elevation of the mechanism for positioning the total plate, under the control of the total keys.

Fig. 4 is a sectional front elevation of a total key and its associated inter-locking plates.

Figs. 5 and 6 are side elevations of the total keys and their inter-lock slides.

Fig. 7 is a front elevation of the connection between the inter-lock slides and the transaction keys.

Fig. 8 is a side elevation of both the automatic and the manual restoring devices for the machine release mechanism.

Fig. 9 is a detail side elevation of the block for holding the total plate in its "add" position, and the associated mechanism for removing the block upon depression of a total key.

Fig. 10 is a detail side elevation of parts of the totalizer engaging mechanism with its disabling device, and parts of the total plate alining device.

Fig. 24 is a plan view of the non-repeat mechanism, looking in the direction of the arrow 24, Fig. 26.

Figs. 25 and 26 are detail views of parts of the mechanism shown in Fig. 22, as seen from the opposite side.

Fig. 27 is a detail view of parts of the repeat mechanism in connection with the differential mechanism.

Fig. 28 is a back view of the machine release mechanism.

Fig. 29 is a detail view looking in the direction of the arrow in Fig. 28 of parts of the machine release mechanism, employed to remove the left hand releasing block, as viewed in Fig. 28, when a total key is depressed.

Fig. 30 is a detail view looking in the direction of the arrow in Fig. 28, of parts of the machine release mechanism employed to remove the left hand releasing block, as viewed in Fig. 28, when a transaction key is depressed.

Fig. 31 is a detail view looking in the direction of the arrow in Fig. 28, of the left hand block, and its connection with the blocked member.

Fig. 32 is a view similar to Fig. 31, but also showing the non-repeat pawl.

Fig. 33 is a view similar to Fig. 29, showing parts of Fig. 30, in connection therewith.

Fig. 34 is a detail view of parts of the key release mechanism in connection with the motor bar and the repeat key.

Fig. 35 is a detail view of a part of the mechanism shown in Fig. 34, in association with the right hand releasing block, as seen in Fig. 28.

Fig. 36 is a view similar to Fig. 35, but also showing the non-repeat pawl and the association of this pawl and the block to the blocked member.

Fig. 37 is a side elevation of parts of the machine release mechanism controlled by the total and repeat keys, and also of the engaging means for the automatic selecting device.

Fig. 38 is a detail plan view of certain parts shown in Figs. 33, 34 and 37.

Fig. 49 is a back view of the overdraft mechanism, looking in the direction of the arrows 49—49, Fig. 47, and also of the mechanism for shifting the add and subtract, or "balance" totalizer.

Fig. 50 is a plan view of parts of the overdraft mechanism shown in Fig. 49.

Fig. 51 is a diagrammatic view of the shifting cam for the add and subtract, or "balance" totalizer.

Fig. 57 is a side elevation of the mechanism controlling the removal of the zero stop pawls during a repeat operation.

Fig. 58 is a side elevation showing the mechanism for operating an aliner shown in Fig. 55.

Fig. 59 is a back view of the repeat mechanism.

Fig. 60 is a front elevation of parts of the printing mechanism, showing the disabling device for the zero eliminating mechanism.

Fig. 61 is an end view taken on the line 61—61 in Fig. 60, and looking in the direction of the arrows.

Fig. 62 is a chart showing the timing of many of the principal mechanisms in the machine.

Fig. 63 is a diagrammatic showing of the timing of the cams for the printing mechanism.

Fig. 64 is a facsimile of the statement sheet such as may be prepared and printed in the machine disclosed herein.

Figure 1:
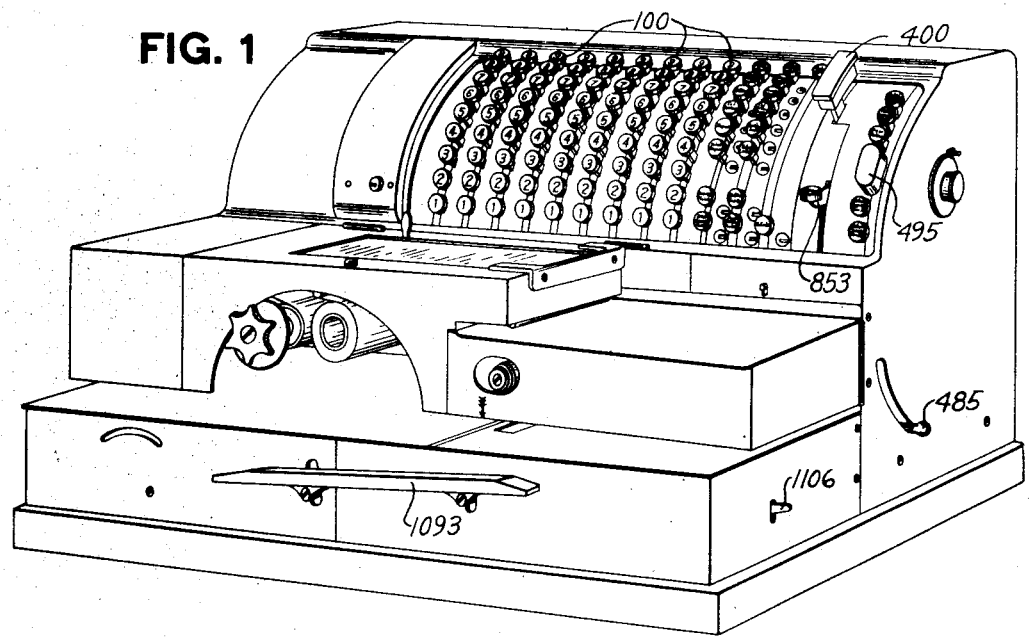
Fig. 1 is a perspective of the machine.

Figs. 66 and 66A taken together form a plan view of the lower or statement printing mechanism. This view represents a section taken approximately on line 66—66A, Fig. 65.

Fig. 67 is a detail view of the platen selecting mechanism.

Fig. 68 is a detail view of the platen operating cam.

Fig. 69 is a detail view of the platen selector restoring operating means.

Fig. 70 is a detail view of the mechanism for automatically selecting certain of the platens to effect alternate or staggered printing when listing checks.

Fig. 71 is a detail view of a part of the mechanism shown in Fig. 70.

Figs. 72 to 85 inclusive are detail views of parts of the automatic platen selecting mechanism. These figures show the parts in different positions which are fully described below.

Fig. 86 is a disassembled perspective view of the platen automatic selecting mechanism.

Fig. 87 is a detail view of the statement feed sheet mechanism and the operating mechanism therefor.

Fig. 88 is a detail view of the mechanism set by the first transaction differential to control the feed mechanism.

Fig. 89 is a detail view of the mechanism for disabling the statement sheet feed mechanism.

Fig. 90 is a detail prospective view of the mechanism for controlling the length of feed.

Fig. 91 is a detail view of the statement sheet tension device.

Figs. 92 to 96 inclusive are detail views in several positions of part of the statement sheet feed disabling mechanism controlled by the first transaction differential..

Figs. 97 to 101 inclusive shows, in several positions, the mechanism for disabling the feed mechanism for the statement sheet. This mechanism is controlled by the platen automatic selecting shaft.

Fig. 102 is a fragmentary top plan view of the blur shields.

Fig. 103 is a detail view of the mechanism for operating the blur shields.

Fig. 104 is a fragmentary view of a part of the mechanism for selecting the blur shields.

Fig. 105 is a perspective view of the blur shield selectors.

GENERAL DESCRIPTION

This machine is adapted to be used in computing and balancing bank depositors' accounts, involving old balances, various forms of deposits, checks drawn, and new balances computed.

The machine has the ordinary amount keys, and has three banks of transaction keys. The keys in the first, or right hand transaction bank are used solely for controlling the printing mechanism, used in connection with this machine. The keys in the second and third transaction banks are used to denote old balances, deposits, and withdrawals. The depressed keys of these second and third bank keys, aside from controlling the totalizer cooperating with each key, control the movement of the differential mechanism in the first transaction bank. This, in turn, controls the shifting of an add and subtract, or "balance" totalizer, used for accumulating the amounts involved in one account. When one of the keys denoting an additive item is depressed, the differential mechanism in the first transaction bank is automatically freed for a movement sufficient to allow it to shift the "balance" totalizer to its additive side, and similarly the movement of the differential mechanism is restricted sufficiently to shift the totalizer to its subtractive side when a key denoting a subtractive item is depressed.

When it is desired to take a total of, or "balance" the items listed on the statement sheet, one of the "new balance" total keys is depressed. By this depression, the machine is started on a total reading or resetting operation, printing, and either resetting or reading the balance appearing on the "balance" totalizer.

It it is desired to accumulate these totals taken off the "balance" totalizer, the "repeat" key is then depressed. This key, aside from performing its ordinary amount repeating function, engages, for operation a mechanism that automatically selects in accordance with the algebraic state of the number, a totalizer into which the repeated number is to be entered. This selecting is performed by what is known in the art as overdraft mechanism, designed to add a unit to the totalizer whenever the latter passes through zero. This overdraft mechanism is so connected with the repeat mechanism, that a totalizer in the second transaction bank is selected if the number being entered is positive, and one in the third transaction bank is selected if the number is negative.

When it is desired to read or reset the amount standing on the individual totalizer of any of the keys in the second or third transaction banks, for instance the total of the amounts entered as certified checks, it is necessary to first depress the "certified checks" key, and then depress the "read" or "reset" key for the second transaction bank.

The machine is provided with the usual zero elimination devices for the type wheels, but when amounts are entered in the "balance" totalizer sufficient to cause it to overdraft (to pass through the zero point), a device is positioned to cause a disabling of the zero elimination devices, and a printing of a special character, if the totalizer is read or reset while in this state. In this manner, a row of zeros and a special character appears in front of every negative balance printed, making it readily distinguishable from the positive totals. This device which is positioned, also causes the Balance totalizer to remain in or be shifted to its subtractive position, in order that the total may be taken off its subtractive side, thus securing an algebraic reading.

When it is desired to read or reset the total amount of deposits entered by the various deposit keys, the "read" or "reset" key for the second transaction bank is alone depressed. This reads or resets the total from the totalizer of the zero position in the second bank, which is the grand totalizer for the deposit keys in the third bank. Likewise, when it is desired to read or reset the total amount of checks entered under the various check keys, the "read" or "reset" key for the third transaction bank is alone depressed. This reads or resets the total from the totalizer of the zero position in the third bank, which is the grand totalizer for the check keys in the second bank.

For convenience in locating the descriptions of the various mechanisms in the specification, each subdivision has been given a number and heading, a list of which follows:

DETAILED DESCRIPTION

*Adding and subtracting*

1. Amount keys and their differential mechanism.
2. Totalizers. In general.
3. Transaction keys and their differential mechanism.
4. Totalizer control by transaction keys. In general.
5. Same. Lateral shifting of totalizers.
6. Same. Totalizer selecting plates.
7. Same. Totalizer engaging mechanism.
8. Same. Shifting of balance totalizer under control of keys in the second and third transaction banks.
9. Transfer mechanism.
10. Automatic overdraft mechanism.
11. Operation of overdraft mechanism.
12. Machine release mechanism for adding and subtracting operations.
13. Driving mechanism.
14. Restoring mechanism for adding and subtracting operations. Restoring of machine release.
15. Same. Restoring of parts of balance totalizer shift control.
16. Restoring mechanism. Automatic key release and disconnecting and stopping of motor.
17. Same. Manual key release..
18. Adding operation.
19. Subtracting operation.

Total reading and resetting

20. Reading and resetting operations in general.
21. Total keys and their interlocks with each other and with the transaction keys.
22. Machine release mechanism for total reading and resetting operations.
23. Automatic positioning of the total plate.
24. Engaging of the cycle control for total reading and resetting operations.
25. Cycle control and machine release restoring mechanism for total reading and resetting operations.
26. Non repeat mechanism for total keys.
27. Totalizer selection for total reading and resetting operations. Selection of totalizer line for engagement.
28. Same. Automatic selection of adding or subtracting side of the balance totalizer.
29. Same. Lateral shifting of totalizers for second and third transaction banks.
30. Control of amount key banks during total reading and resetting operations.
31. Totalizer engaging mechanism for total reading and resetting operations.
32. Selection of reset shaft and operation of reset spider.
33. Total reading operation.
34. Total resetting operation.
35. Adding or subtracting operation after a total resetting operation.
36. Visual indication of negative total.

Repeating

37. Automatic selection of totalizer to receive repeated amount.
38. Manual selection of totalizer to receive repeated amount.
39. Machine release mechanism for repeating operations.
40. Interlocks with the repeat key.
41. Control of amount differentials during repeating operations.
42. Repeating operation using automatic selection of the totalizer.
43. Repeating operation using manual selection of the totalizer.
44. Printing. In general.
45. Printing platens.
46. Platen selection.
47. Control of platen on check listing operations.
48. Statement sheet feed mechanism.
49. Control of statement sheet feed mechanism by the first transaction differential.
50. Control of statement sheet feed mechanism by platen selector shaft.
51. Blur shields.

1. Amount keys and their differential mechanism

This machine, as shown, has nine banks of amount keys 100, Fig. 1, arranged on the left side of the keyboard. These key banks, and their differential mechanisms are fully shown and described in the United States Patent No. 1,619,796, to B. M. Shipley, and will therefore be only briefly described here. Each bank, Figs. 1, 2 and 55, has nine keys numbered "1" to "9" consecutively, the "9" keys situated at the top of each bank. The keys are mounted in frames 101, and are held in their undepressed position by springs 102. The depression of a key swings the zero stop pawl 103 of its bank, counterclockwise, out of the path of the nose 104 on the reset spider 105, and projects the lower end of the key into the path of the latch breaking lever 106. When the machine is operated, the main drive shaft 107 rotates the companion cams 110, 111, a pair of which are located under the differential mechanism for each key bank. The rotation of the cam 110 moves the bell-crank 112 and the actuator 113, the latter rotating the differential rack 114 clockwise until the latch breaking lever 106 strikes the lower end of the depressed key 100. This striking disengages or "breaks", the latch 115, forcing its nose 116 into the notch 117 under the depressed key. In this movement the reset spider 105 is arrested as soon as the lever 106 strikes the depressed key, and the rack 114 continues to rotate until the latch 116 is seated in the notch 117. The actuator 113 then continues its clockwise movement, while the rack 114 is held stationary by the engagement of the nose 116 with the notch 117. When the actuator 113 reaches the end of its clockwise movement, whatever totalizer lines 120, 121, 122 are selected under control of the transaction keys, are engaged with the differential rack 114 (see timing of amount differentials and totalizer engaging, adding operation in Fig. 62) and remain in that position while the cam 111 returns the differential unit, counter-clockwise to its home position shown in Fig. 55. This counter-clockwise movement runs the number corresponding to the key depressed, on the selected totalizers. When the cam 110 rotates the bell-crank 112 clockwise, the stud 123 on the bell-crank moves into engagement with the lower edge of the beam 124, and upon continued movement forces the beam against the rod 125. The forward end of the beam is pivoted to the differential rack 114, the clockwise movement of which is completed when the beam is forced against the rod 125. Since the beam is rigidly held at these two points when the differential rack 114 is arrested in the position determined by the depressed amount key 100, its position for the present operation is determined, and the link 126 connecting the type-setting segment 127 and the aliner segment 130 with the beam 124 is likewise positioned, setting the printing type in the position corresponding to the amount key depressed in that bank. The aliner 131 receives a slight clockwise rotation before the beam 124 is adjusted, to free the segment 130 for movement by the link 126 (see timing of amount differentials and aliner 131, Fig. 62). The aliner 131 then remains in its rotated position until after the amount differential receives its clockwise movement, at which time the aliner is returned, by a counter-clockwise movement, to its normal position. The aliner is given these movements by an actuator 128, Fig. 58, operated by two cams on the drive shaft 107 and connected to the aliner through a link 129.

2. Totalizers—In general

This machine has three lines of totalizers, an upper line 120, a back line 121, and a front line 122. The upper line 120 carries only an add and subtract totalizer, also termed hereafter the "balance" totalizer, having an adding side carrying the wheels 118, Fig. 49 and a subtracting side carrying the wheels 119, which are connected to each other in the usual manner, while the back and front lines 121, 122 each carry nine interspersed totalizers. This arrangement is well known in the art, as shown by Patent No. 1,242,170, and will therefore not be further described.

3. Transaction keys and their differential mechanism

Figure 2:
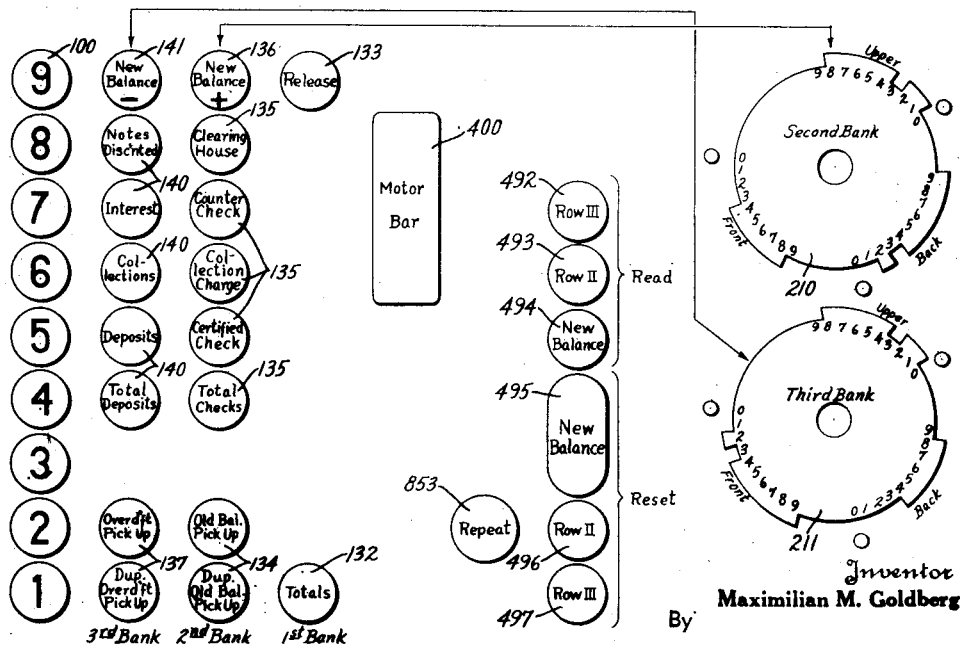
Fig. 2 is a diagrammatic view of the keyboard arrangement.

The machine has three banks of transaction keys, Figs. 1, 2, 39, 41, 44, 46 and 52. As seen in Fig. 2 the first transaction bank has only two keys 132, 133, one designated "Totals" and the other "Release". These two keys are used only in connection with the special type of printer used on this machine and consequently need not be further explained here.

The second transaction bank has eight keys, two 134, bearing the designations of "Old balance pick up" and "Duplicate old balance pick up", the next five, 135 bearing the designations of various forms of checks, and in the "9" position, one 136, bearing the designation "New balance +".

The third transaction bank also has eight keys, two 137, bearing the designations "Overdraft pick up" and "Duplicate overdraft pick up", the next five, 140 bearing the designations of various forms of deposits, and, in the "9" position one, 141 bearing the designation "New balance —."

The differential mechanism for the second and third banks of transaction keys operates the same as that fully shown and described in the United States Patent to Shipley, No. 1,703,959, and will therefore be only briefly described.

Figure 52:
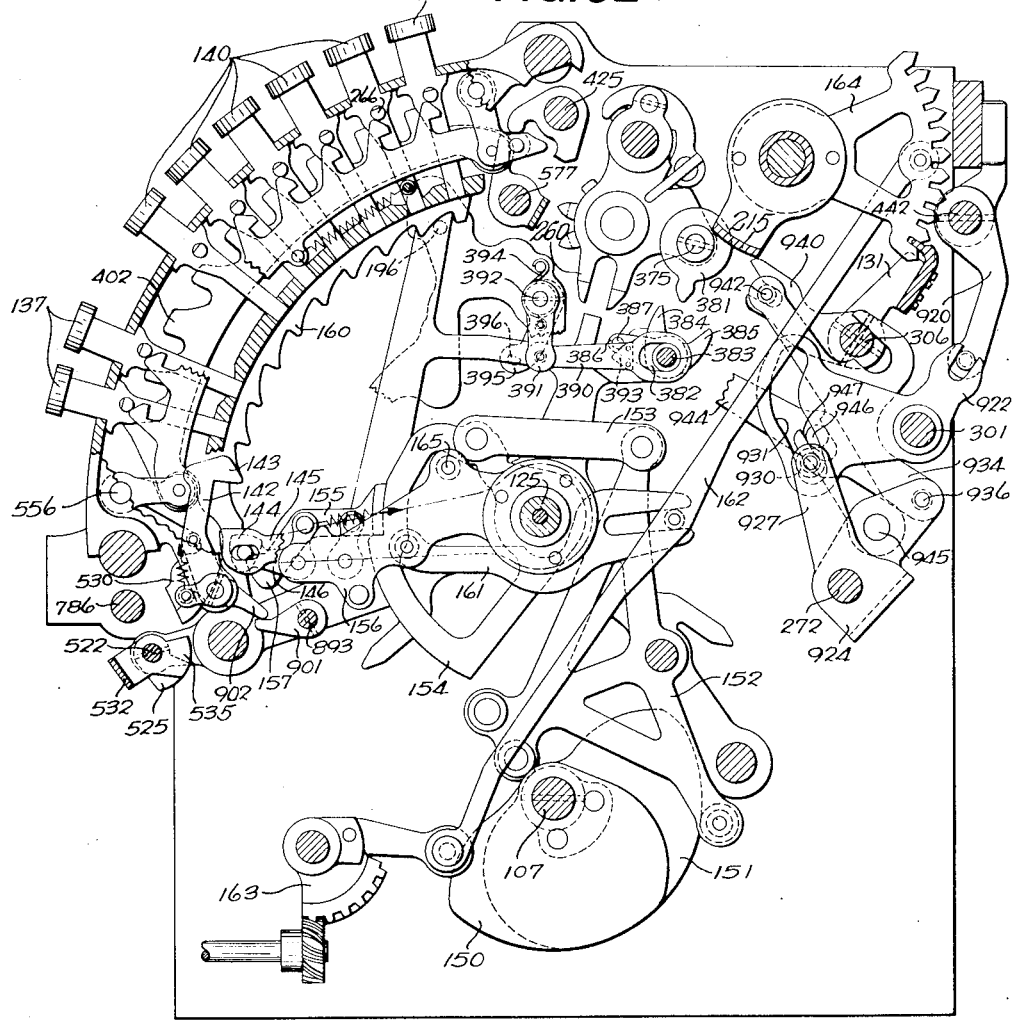
Fig. 52 is a side elevation of the third transaction key bank, showing the parts of the overdraft and repeat mechanisms shown on the left side of Figs. 49 and 58.
Figure 53:
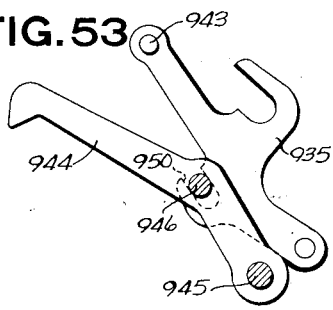
Fig. 53 is a detail view of parts of the repeat mechanism shown in Figs. 52 and 55.
Figure 54:
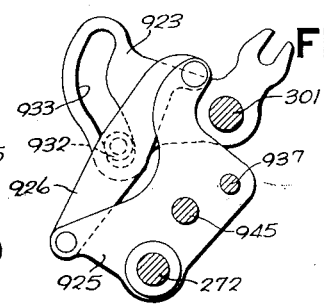
Fig. 54 is a detail view of parts of the repeat mechanism shown in Fig. 55.

When one of the keys 137, 140, 141, Fig. 52 is depressed, the zero stop pawl 142 is swung to the left a distance sufficient to move its nose 143 out of the path of the nose 144 on the arm 145, and the lower end of the key is protruded into the path of the latch breaking lever 146. When the machine is subsequently operated, the main drive shaft 107 rotates the pair of companion cams 150, 151, the cam 150 of which rotates clockwise the bell-crank 152, pulling the link 153 to the right, and, through this link, rotating clockwise, the actuator 154, the latch 155, the latch supporting arm 156 and the arm 145. This rotation continues until the lever 146 strikes the lower end of the depressed key, at which time it disengages or "breaks" the latch 155, as explained under heading 1. The disengaging of the latch 155 and its nose 157 entering one of the notches 160 holds the differential arm 156 stationary and allows the actuator 154 to continue its clockwise movement, as was also explained under heading 1. The beam 161 and the link 162 are similar to the beam 124 and link 126, Fig. 55, and are adjusted in the same manner, positioning the printing mechanism through the segment 163, and shifting the aliner segment 164 to procure the desired lateral shifting of the totalizer line controlled by this bank of keys, and also positioning the plate controlling the totalizer engaging, as will be explained hereinafter.

The aliner 131 is moved out of, and back into engagement with the segment 164 at such times as will allow the segment to be adjusted by the link 162, as explained under heading 1.

The unit is returned to home position by the cam 151 rotating the bell-crank 152 and the actuator 154 counter-clockwise, during which movement the upper part of the actuator strikes the stud 165 on the latch supporting arm 156, and through this stud returns the latch 155, and its associated parts to their home position.

The differential for the first transaction bank is similar to that of the second and third banks, except in the particulars now to be explained.

Figure 39:
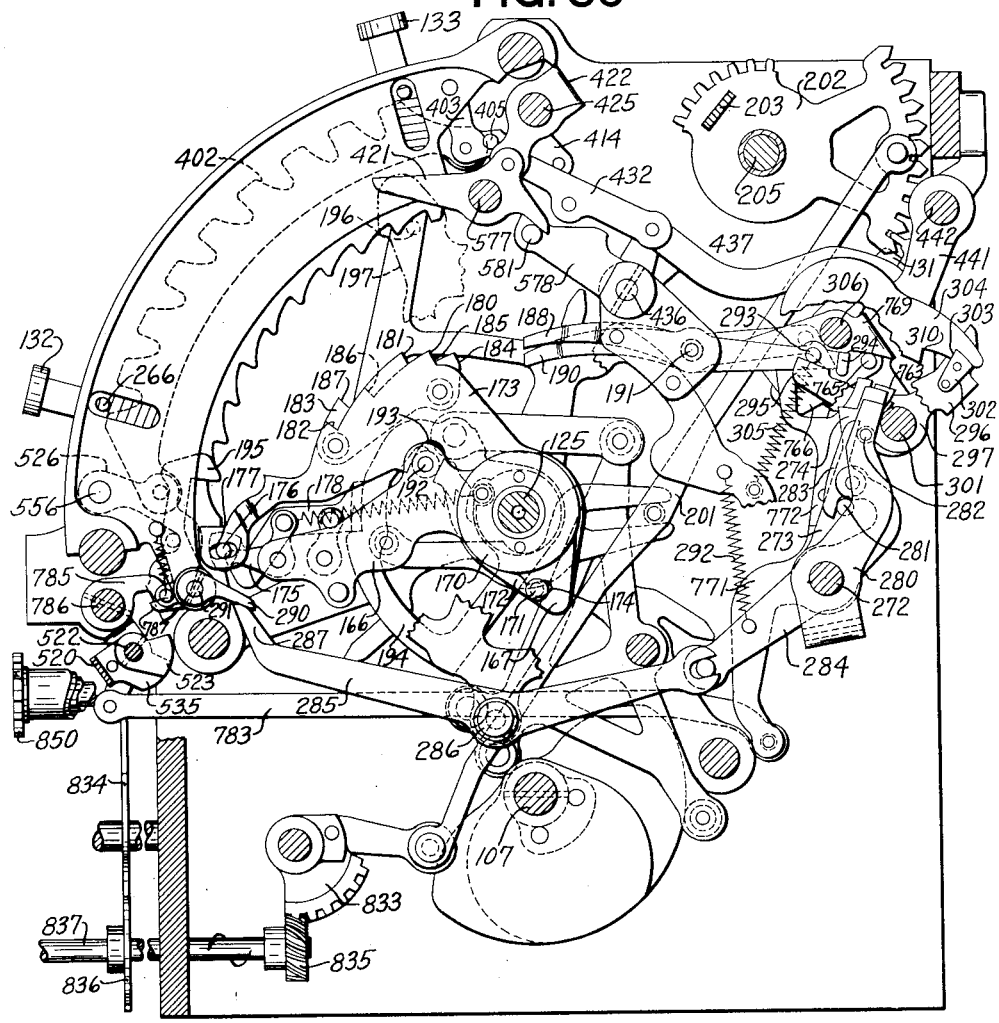
Fig. 39 is a side elevation of the first, or right hand transaction key bank as seen in Figs. 1 and 2, and also of certain controls for the key controlled and the automatic totalizer selecting mechanism for the add and subtract or "balance" totalizer.

The latch supporting arm 166, Fig. 39, corresponding to the latch supporting arm 156 in Fig. 52, has a projection 167 extending downwardly from its hub portion 170. A headed stud 171 is mounted on the projection 172 extending downwardly from the differential arm 173, and extends through a slot 174 in the projection 167, in which it has a limited sliding movement. The differential arm 173 is journaled, at its rear end on the rod 125, and is held at its front end to the latch breaking lever 175 by a pin 176 extending through a slot 177 in the arm 173, in a manner similar to that of the arm 145, in Fig. 52.

The stud 171 holds the differential arm 173 against sidewise movement in relation to the arm 166, and the two slots 174 and 177 allow a relative movement between the arms 166 and 173, caused by the engaging and disengaging of the latch 178. On the upper edge of the differential arm 173 are formed, three shoulders 180, 181 and 182, and on the side of the arm, adjacent these shoulders is fastened a plate 183. This plate is provided with four shoulders 184, 185, 186, and 187. Two stop levers 188 and 190 are pivoted at 191, and are free to be swung into, and out of the paths of the arm 173 and plate 183. When either stop arm is adjusted to lie in the path of one of these shoulders, during an operation of the machine, the clockwise movement of the differential mechanism brings one of the shoulders into abutting relation with the adjusted stop lever, arresting the movement of the arm 173.

The latch breaking lever 175, being held, on its outer end, to the arm 173, by the pin-and-slot connection 176, 177 is rotated counter-clockwise by the continued upward movement of the latch 178. This counter-clockwise rotation of the lever 175 disengages the latch 178, and brings the mechanism to rest as in the other differentials described above.

A stud 192, similar to stud 165, Fig. 52, is fastened in the arm 166, extends through a slot 193 in the arm 173, and lies in the path of the actuator 194, to cooperate with the latter in returning the mechanism to home position.

The shoulders 180, 181, 182, 184, 185, 186 and 187 are arranged so that when shoulder 184 abuts its stop lever 190, the differential stops in the position corresponding to that in which an amount differential stops when a "2" key is depressed, commonly known as the "2" position. When either of the shoulders 180 or 185, abuts its stop lever, the differential stops in the "3" position, and so on, the shoulder 181 stopping it in the "4" position, the shoulder 186 stopping it in the "6" position, the shoulder 187 stopping it in the "7" position, and the shoulder 182 stopping it in the "8" position.

When the zero stop pawl 195 is moved, and the stop lever 188 and 190 are both swung out of the paths of the shoulders, the arm 173 will be free to travel to the end of its path, where the forward end of the arm 173 strikes the stud 196, mounted in the frame 197, disengaging the latch and arresting the mechanism in the "9" position.

4. Totalizer control by transaction keys—In general

Figure 55:
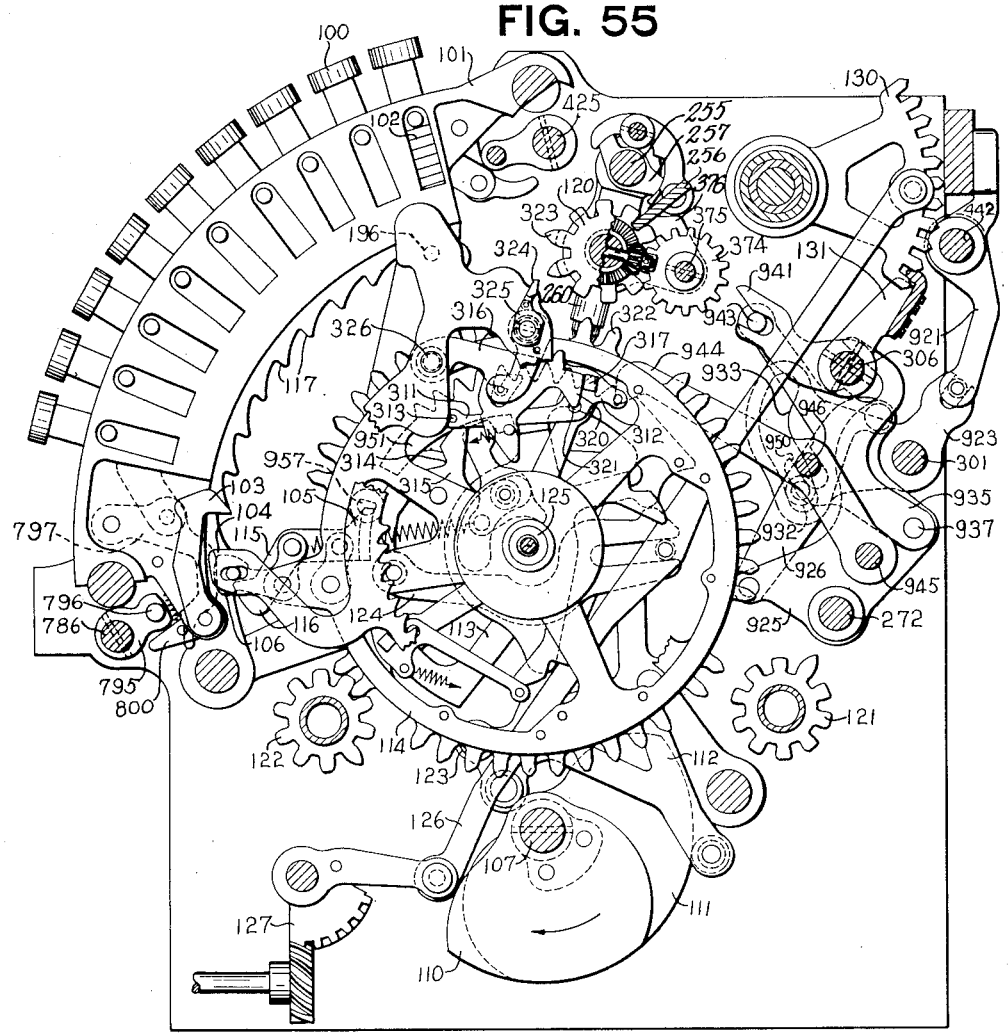
Fig. 55 is a side elevation of an amount key bank, showing the parts of the overdraft and repeat mechanisms shown on the right side of Figs. 49 and 59.

The three totalizer lines are shifted laterally under control of the differentials for the three banks of transaction keys, the differential for the first bank controlling the shifting of the balance (upper) totalizer line 120, Fig. 55, the differential for the second bank controlling the shifting of the rear totalizer line 121, and the differential for the third bank controlling the shifting of the front totalizer line 122. The keys 134, 135, 137, and 140, Fig. 2 aside from controlling the shifting of the totalizer lines 121, 122, for their respective banks, control the shifting of the balance totalizer 120. Whenever one of these keys is depressed, the differential for the first bank is released for adjustment, and when adjusted, shifts the balance totalizer to the add or subtract position as determined by the transaction key depressed. The number set on the amount keys for this transaction can then be properly entered into the balance totalizer as well as into the individual totalizer for the particular transaction key depressed.

The mechanism controlling the engaging of the various totalizers upon the depression of the various transaction keys, operates according to the following plan:

When the upper one of the keys 134 is depressed, the rear 121 and upper 120 totalizer lines are engaged, the amount set up being accumulated on the individual totalizer of the depressed key, and on the balance totalizer, and when the lower key 134 is depressed, only the upper, or balance totalizer 120 is engaged.

When a key 135 is depressed, all three totalizer lines are engaged, the amount set up being accumulated, on the individual totalizer of the depressed key 135, lying in the rear line 121, on the balance totalizer 120, and on the grand totalizers for the second bank located in the "zero" position of the front line 122, which is used to obtain the total amount of "checks" entered by these keys 135.

When the key 136 is depressed, the rear totalizer line alone is engaged, the amount being accumulated on the individual totalizer for the key 136.

When the upper one of the keys 137 is depressed, the front 122 and upper totalizer lines are engaged, the amount being accumulated on the individual totalizer of the depressed key, and on the balance totalizer, and when the lower key 137 is depressed, only the upper, or balance totalizer 120 is engaged.

When a key 140 is depressed, all three totalizer lines are engaged, the amount being accumulated, in the front line, on the individual totalizer of the depressed key 140, on the balance totalizer, and on the grand totalizer for the third bank, situated in the "zero" position of the rear line, and is used to obtain the total amount of "deposits" entered by these keys 140.

When the key 141 is depressed, the front totalizer 122 line alone is engaged, the amount being accumulated on the individual totalizer for the key 141.

5. *Totalizer control by transaction keys—Lateral shifting of totalizers*

Referring to Figs. 39, 49 and 51, when the differential in the first transaction bank receives a movement, the shifting cam 200, Fig. 49, through the link 201, Fig. 39, the segment 202, the yoke 203, Fig. 49, the collar 204, the shaft 205, the arm 206, and the link 207, is given a proportionate movement, shifting the balance totalizer from its adding to its subtracting position, or vice versa, whenever the movement of the arm 173 is through the "5" and "6" positions. When the movement is not sufficient to carry the arm through these positions, the totalizer does not shift for that operation. When the arm is stopped in either the "5" or "6" position, the balance totalizer can take no part in the operation, since neither the adding wheels 118, nor the subtracting wheels 119, are in line with the differential racks 114. When the arm is stopped in one of the positions "0" to "4", the totalizer assumes its subtracting position, and when stopped in one of the positions "7" to "9", it assumes its adding position.

The differential for the second transaction bank shifts the rear totalizer line 121, and the differential for the third transaction bank shifts the front totalizer line 122, in a manner similar to that just described in connection with the first transaction bank, except that the shifting cams for these totalizers, corresponding to the cam 200 of the balance totalizer, are given a helical contour, so as to shift their totalizers, laterally, an increment for each key position. This mechanism is fully described in the United States Patent, No. 1,394,256, to F. L. Fuller, and will, therefore, not be explained in greater detail.

6. *Totalizer control by transaction keys— Totalizer selecting plates*

Since this mechanism is well known in the art, as shown by United States Patent No. 1,619,796 to B. M. Shipley, it will be only briefly described.

Figure 17:
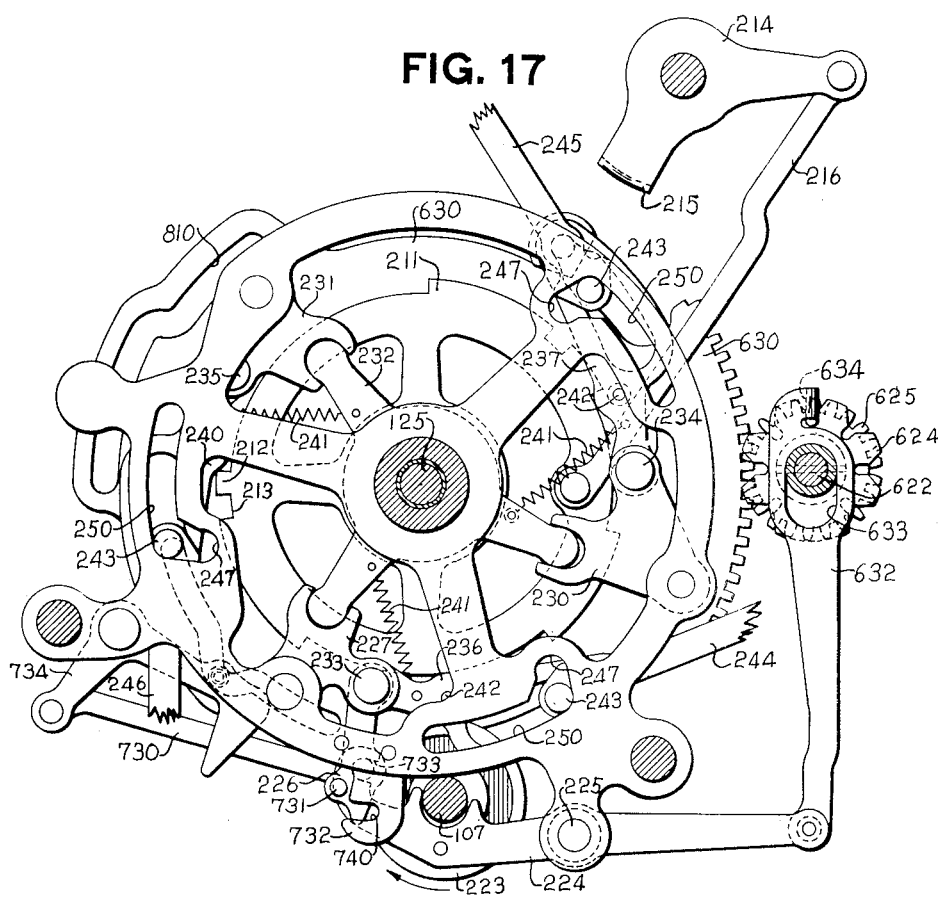
Fig. 17 is a side view of the total plate alining mechanism, and parts of the totalizer engaging mechanism.

There are two selecting plates 210, 211, Figs. 2 and 17, which are adjusted under control of the second and third transaction bank differentials, respectively. These plates are provided with the customary high and low spots 212, 213, which control the engaging of the totalizers, as will be hereinafter explained, and which are cut in a pattern designed to engage the three totalizer lines according to the plan already set out under heading 4.

Referring to Fig. 52, when the segment 164 receives an adjustment from the differential in that figure, the bracket 214, Fig. 17, receives a corresponding adjustment, through the segment 164 being connected to the bracket 214 by the yoke 215. Movement of the bracket 214 adjusts the plate 211 correspondingly, through the link 216.

7. *Totalizer control by transaction keys—Totalizer engaging mechanism*

Figure 14:
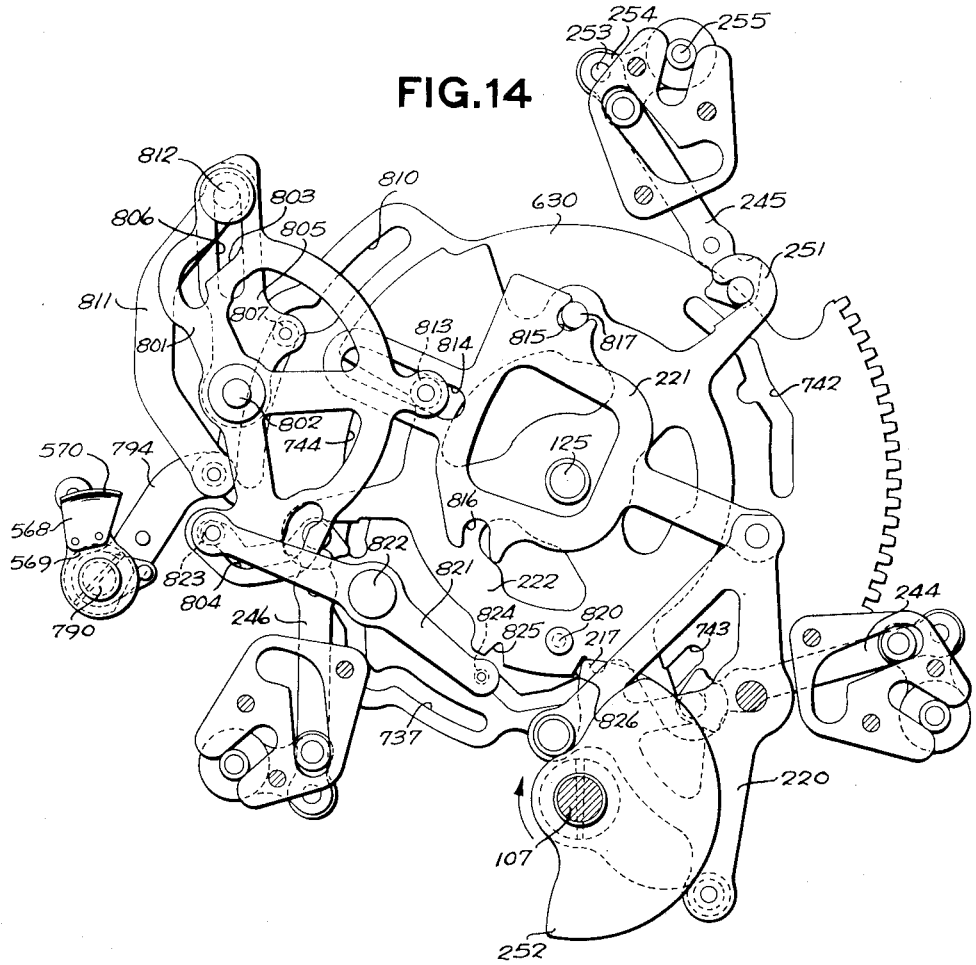
Fig. 14 is a side view of the totalizer engaging mechanism and the total plate in partially operated position.
Figure 19:
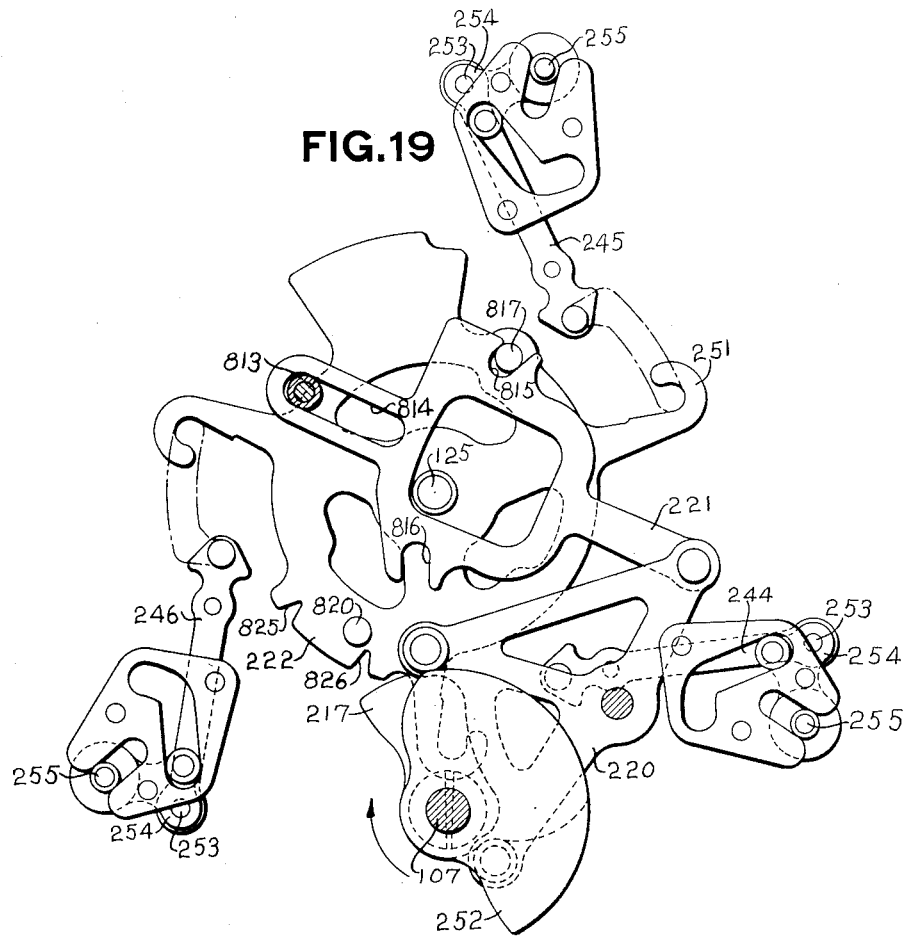
Fig. 19 is a side elevation of the totalizer engaging mechanism in home position.

This mechanism, Figs. 14, 17 and 19, is well known in the art, as shown by United States Patent No. 1,619,796 to B. M. Shipley, and operates, in this machine, in the same manner as in that disclosed by the patent, except in the following two particulars.

First, the pattern of the plates 210 and 211, is changed, which alters the plan of engagement for the totalizer lines, but which does not change the general operation of the engaging mechanism.

Second, the timing of this mechanism is such that any totalizers which are engaged during an operation remain engaged at the end of that operation, and are disengaged at the very beginning of the succeeding operation; see Fig. 62.

This mechanism will now be briefly described. Referring to Figs. 14, 17 and 19, when the drive shaft 107 begins its rotation, the cam 217 rotates the bell-crank 220 counter-clockwise, moving the link 221 to the left and rotating the spider 222 counter-clockwise, from the position shown in Fig. 19, to that shown in Fig. 14. When the spider reaches this latter position, the cam 223, Fig. 17, rotates the lever 224 counter-clockwise, about its pivot 225. This moves the link 226 downward rotating the bell-cranks 227, 230 and 231 clockwise, and the three armed lever 232 counter-clockwise. The clockwise movement of the three bell-cranks 227, 230 and 231 moves the pivot points 233, 234 and 235 of the levers 236, 237 and 240 away from the plate 211, tensioning the springs 241, moving the studs 242 away from the plate 211, moving the studs 243 on the ends of the links 244, 245 and 246 into the recesses 247 of the slots 250, if such studs are not already there, and allowing the plate 211 to be adjusted when the movement is completed.

After the plate 211 is adjusted, the cam 223 rotates the lever 224, clockwise, to its former position; see Fig. 62. This moves the link 226 upward, rotates the bell-cranks 227, 230 and 231 counter-clockwise and the three armed lever 232 clockwise, to their former positions. The movement of the bell-cranks 227, 230 and 231 moves the pivots 233, 234 and 235 toward the plate 211, and along with them the studs 242. Where high spots such as 212 are located opposite the studs 242, the studs are held against movement, and form fulcrums for the levers 236, 237 and 240, the outer ends of which move the studs 243 of the links 244, 245 and 246 into engagement with the hooks 251 on the spider 222. Where low spots such as 213 are located opposite the studs 242, the studs are moved into the depressions and fail to engage the studs 243 with their hooks 251.

When the levers 236, 237 and 240 have completed their movement just described, the cam 252, Figs. 14 and 19, rotates the bell-crank 220 and the spider 222, clockwise, pulling with them any of the links 244, 245 and 246 which are engaged with the hooks 251. The opposite ends of these links are pivoted at 253 to the arms 254 fastened to the shafts 255, and pull these shafts toward the differential racks 114, Fig. 55, at the same time rotating them sufficiently to remove the aliner 256 from its engaged position, by the action of the cam 257. The totalizers 120, 121 and 122, being mounted on the same brackets 260 as the shafts 255, are moved into engagement with their racks 114, Figs. 49 and 55.

The totalizers 120, 121 and 122 remain engaged with their racks 114 until the beginning of the next operation, as explained above, at which time they are disengaged by a counter-clockwise movement of the spider 222.

8. *Totalizer control by transaction keys—Shifting of balance totalizer under control of the keys in the second and third transaction banks*

Referring to Figs. 2, 39, 41, 43, 44, 45, 46 and 49, when one of the keys 134, 135, 137, or 140 is depressed, and the machine then released for an adding or subtracting operation, the balance totalizer will be shifted to its adding or subtracting side, as determined by the key depressed.

Figure 41:
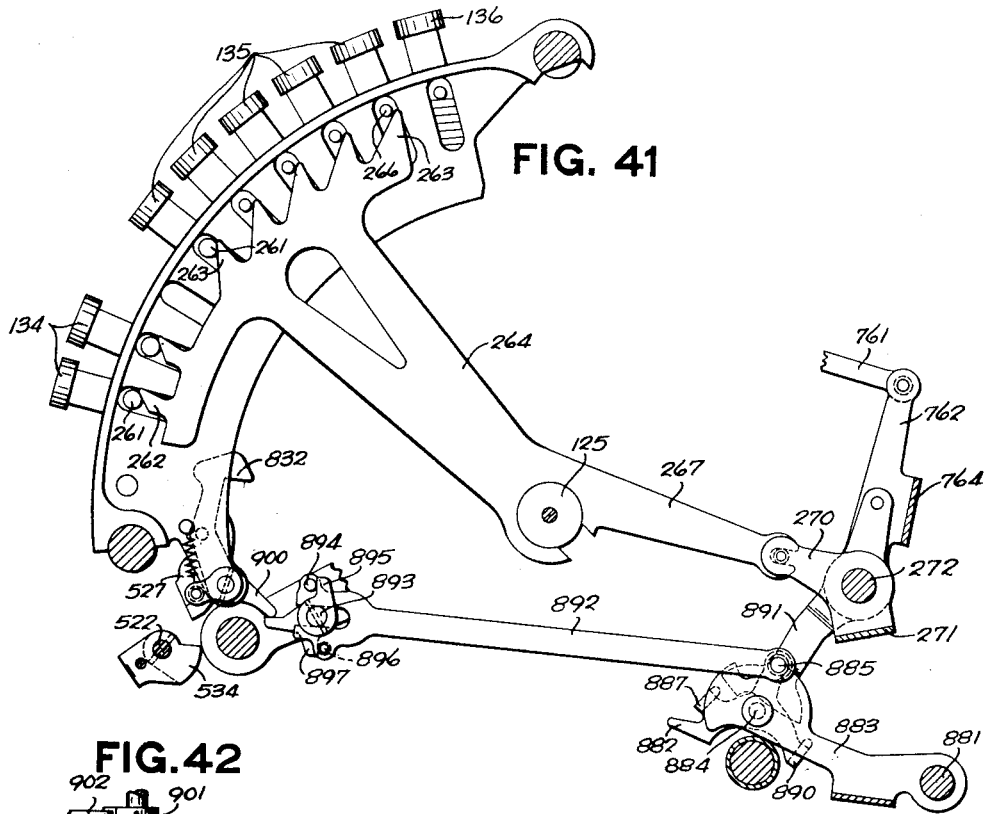
Fig. 41 is a side elevation of the second, or middle transaction key bank as seen in Figs. 1 and 2, and also of parts of the key controlled and automatic totalizer selecting mechanisms.
Figure 44:
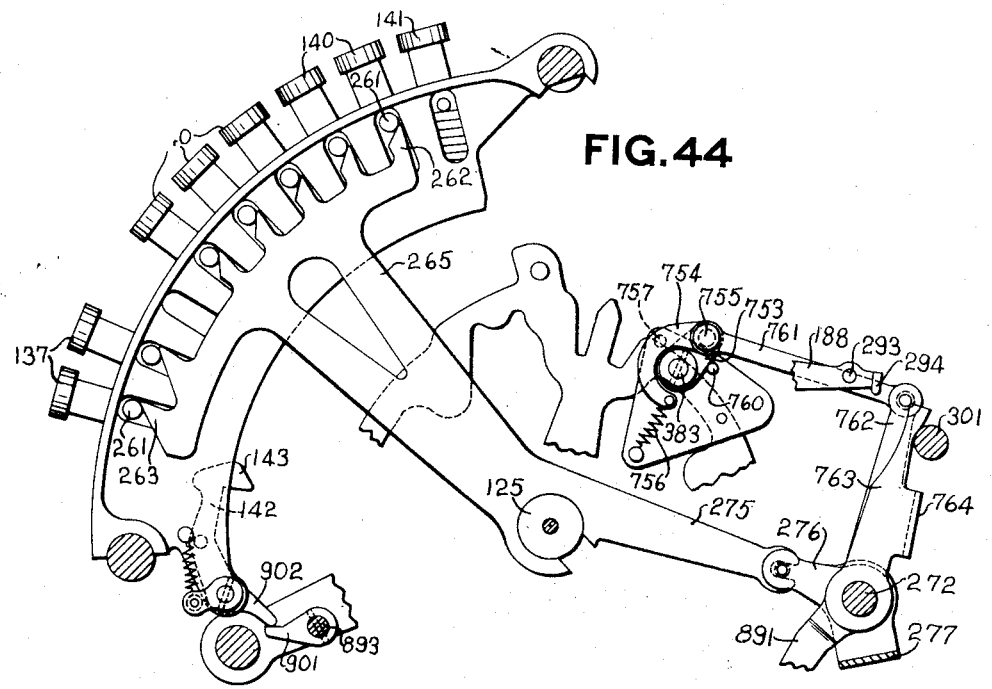
Fig. 44 is a side elevation of the third, or left hand transaction key bank as seen in Figs. 1 and 2, and also of parts not shown in Fig. 41, of the key controlled and automatic totalizer selecting mechanisms.

The keys 134, the "total checks" key of the keys 135, and the keys 137 and 140 are provided with long studs 261, Figs. 41 and 44, which overlie the teeth 262 and 263 on the segments 264 and 265. The keys 135, other than the "total checks" key have only the customary short studs 266, which do not overlie the teeth on the segments, and have no control over them.

The segment 264 is pivoted on the rod 125 and has a rearwardly extending arm 267 coupled to the arm 270 of the yoke 271 pivoted on the shaft 272. On its other end, Fig. 45, the yoke 271 has an upwardly extending finger 273, having a flat top, and a step 274 extending from its front edge a short distance below the top.

The segment 265, Fig. 44, also is pivoted on the rod 125 and has a rearwardly extending arm 275 coupled to the arm 276 of the yoke 277 pivoted on the shaft 272. The yoke 277 has an upwardly extending finger 280, Fig. 45, having a flat top which lies at a height midway between the step 274 and the top of the finger 273. The finger 280, unlike the finger 273, has no step on its forward edge.

Figure 45:
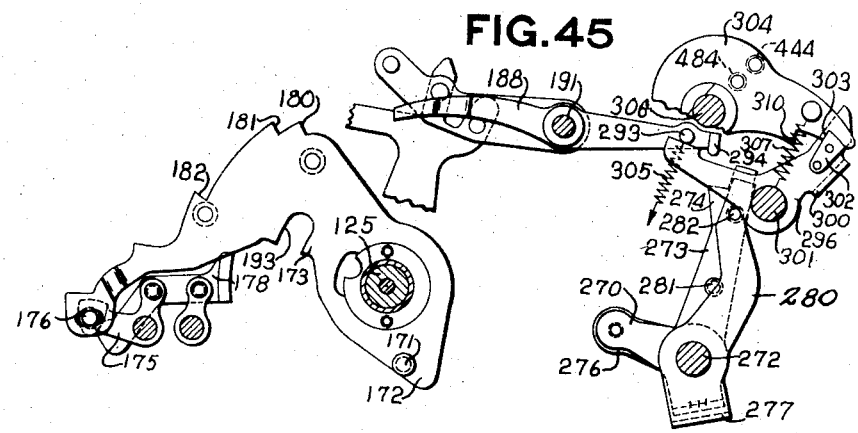
Fig. 45 is a detail view of certain parts of the totalizer selecting mechanism shown in Fig. 39, and not shown in Fig. 43.

Two studs 281 and 282, Figs. 39 and 45, are fastened to the sides of the fingers 273 and 280, and extend across the space between them. A spanning lever 283 is pivoted on the upper end of a lever 284, and rests, at its upper and lower ends against the studs 282 and 281, respectively. The lever 284 is pivoted on the rod 272 and is coupled, at its lower end, to the lever 285 pivoted to a part of the machine frame at 286. A nose 287, on the forward end of the lever 285 lies under the arm 290, pinned to the shaft 291. This shaft 291 is journaled in the stationary frame of the key bank and has pinned to its other end, the zero stop pawl 195. A spring 292 is fastened to the lever 284 and to the machine frame, to hold the spanning lever 283 against the studs 281 and 282, and to return the lever 284 to its home position after it has received a counter-clockwise rotation.

Of the two stop levers 188 and 190, only 188 is used during adding and subtracting operations, lever 190 being used only during total reading and resetting operations.

The lever 188 has, on its rear arm, a stud 293 and an extension 294. The stud rests on the forward arm 295 of the bell crank 296, connected to the bell crank 297 by the yoke 300. These bell cranks are both pivoted on the rod 301.

A block 302 is secured to the bell crank 296, and engages the notch 303 in the latch 304 to hold the forward arm 295 raised and accordingly hold the rear end of the lever 188 in raised position, against the tension of spring 305. The latch 304 is pivoted on shaft 306 and receives a constant clockwise tension from the spring 307 fastened to the latch and to the rod 301.

When a key 134 is depressed, its stud 261 rotates the segment 264 one step clockwise, due to the camming action of the narrow tooth 262, causing the segment to move the finger 273, Fig. 45, forward one step, where the step 274 lies in the path of the extension 294. This movement of the finger moves the lower end of the lever 283, Fig. 39 forward, rotating the levers 284 and 285, the arm 290, the shaft 291, and the zero stop pawl 195. The rotation of pawl 195 removes it from the path of the arm 173, allowing the latter to be rotated clockwise upon rotation of the drive shaft 107. When the machine is released for an adding or subtracting operation the latch 304 receives a slight counter-clockwise rotation, by mechanism to be later described, releasing the block 302 from the notch 303, and allowing the spring 305 to rotate the bell crank 296 counter-clockwise, and lower the rear end of the lever 188 until the extension 294 rests on the step 274 which was moved into the path of the extension, as explained above.

The movement of the extension 294 into contact with the step 274 raises the front end of the lever 188 to a position lying in the path of the step 182 on the arm 173.

The operation of the machine release mechanism also allows the arm 173 to begin its excursion immediately after the lever 188 is adjusted.

Due to the zero stop pawl 195 (Fig. 39) being previously removed from the path of the arm 173, the latter is free to rotate until the shoulder 182 strikes the lever 188, stopping the arm 173 and the cam 200, Figs. 49 and 51, in the "8" position. This movement of the cam 200 shifts the balance totalizer 120 to its adding position where the wheels 118 will mesh with the differential racks 114 when the totalizer is engaged with these racks by mechanism already described.

After the differential arm 173 is returned to its home position, the bell crank 296, Fig. 39, receives a clockwise movement, sufficient to move the block 302 from the notch 310 to the notch 303, as will be hereinafter more fully described, allowing the spring 307, Fig. 45, to lower the notch 303 over the block 302, to hold the latter, and the bell crank 296, in retracted position, against the tension of spring 305.

When the "total checks" key 135, Figs. 2 and 41, is depressed, the segment 264 is rotated two steps, due to the action of the wide tooth 263 on the stud 261, rotating the yoke 271 and moving the flat top of the finger 273 under the extension 294. This removes the zero stop pawl 195 from the path of the arm 173, and prevents the spring 305 from rotating the lever 188 when the machine is released, thereby holding the lever in the position where its front end lies in the path of the shoulder 180 of the differential arm 173. When the arm 173 is rotated clockwise, its shoulder 180 strikes the arm 188 and stops the arm in the "3" position, Fig. 51, causing the balance totalizer to be shifted to its subtracting position. At the end of the operation the mechanism is returned to home position in the manner described in reference to the operation with keys 134.

When a key 135, other than the "total checks" key, is depressed, the segment 264 is not moved, due to the absence, on these keys, of the long studs 261. This prevents the finger 273, the stud 281 and the levers 283, 284 and 285 from removing the zero stop pawl 195, which, being left in the path of the arm 173, stops the movement of the arm in the "0" position, when the machine is operated, and consequently causes the balance totalizer 120 to be shifted to its subtracting position. At the end of the operation the mechanism is returned to home position in the manner described in reference to the operation with keys 134.

When a key 137, Fig. 44 is depressed, the segment 265 is rotated two steps, moving the yoke 277 and the finger 280, Fig. 45, correspondingly. This places the flat top of the finger 280 under the extension 294 and moves the lever 283, Fig. 39, forward, due to its contact with stud 282. As in the above instances, this removes the zero stop pawl 195 from the path of arm 173. When the machine is released for operation, the extension 294 is lowered until it rests on the flat top of the arm 280, and the front end of the lever 188 raised to the position where it lies in the path of shoulder 181. The subsequent clockwise movement of the arm 173 causes the shoulder 181 to strike the lever 188, stopping the differential mechanism in the "4" position and causing the totalizer to be shifted to its subtracting position. At the end of the operation the mechanism is returned to home position in the manner described in reference to the operation with keys 134.

When a key 140 is depressed, the segment 265 is rotated one step, moving the yoke 277 and the finger 280 correspondingly. This movement of the finger is not sufficient to place the flat top of the finger under the extension, but is sufficient to withdraw the zero stop pawl 195 by causing a movement of the lever 283. When the machine is released for operation, the extension 294 is allowed to fall until the block 302 comes into contact with the notch 310. This movement raises the front end of lever 188 entirely clear of the shoulders on the arm 173, allowing the arm to rotate until it strikes the stud 196 on the frame member 197. The arm 173 is, in this manner, stopped in the "9" position, causing the balance totalizer to be shifted to its adding position. At the end of the operation the mechanism is returned to home position in the manner described in reference to the operation with keys 134.

9. Transfer mechanism

The transfer mechanism employed to carry the excess digits from one denominational order to the next is old and well known in the art, and since it is fully shown and described in the United States Patent No. 1,230,864 to W. A. Chryst, it will be only briefly described.

Referring to Fig. 55, during an operation of the differential when there is no transfer taking place in this particular bank, when the mechanism begins its return movement the arm 311 of the transfer coupler 312 is in its lower position, with the stud 313 extending into the notch 314 of the bracket 315 mounted rigidly on the rack 114. When the coupler 312 reaches the transfer blocking plate 316, the stud 317 on the coupler 312 strikes the nose 320 of the plate 316, and upon continued movement of the rack 114, a clockwise rotation is imparted to the coupler 312 about its pivot 321. This forces the stud 313 upward, out of the notch 314, allowing the bracket 315 to be rotated to its home position while the coupler 312, and the two-toothed transfer segment 322 to which it is pivoted, are held in their retracted position.

Referring to the totalizer line 120, when the long tooth 323 of the totalizer wheel 118 or 119 in the bank of next lower denomination to that shown in Fig. 55, is rotated from "9" to "0", it strikes the tail 324 of the transfer pawl 325, and rotates the pawl counter-clockwise sufficiently to let the blocking plate 316 rotate clockwise a short distance about its pivot 326. This latter movement swings the nose 320 of the plate 316 out of the path of the stud 317, so that when the rack 114 moves through the last part of its return stroke, the coupler 312 is not rotated by striking the nose 320, but passes over it, and, as a consequence, the stud 313 remains in engagement with the notch 314 of the bracket 315 which pulls the coupler 312 and the segment 322 with it until the two teeth on the segment 322 register an additional unit on the totalizer wheel.

The pawl 325 and the plate 316 are returned to normal position at the end of the upward stroke of the succeeding operation by a member rotating the plate 316 counter-clockwise to its former position, allowing the powl 325 to rotate clockwise to its former position.

10. Automatic overdraft mechanism

The machine is provided with a mechanism designed to add one unit in the penny, or units denominational order of the balance totalizer whenever the wheels in its highest denominational order pass through "0" and the sign of the amount in the totalizer changes during a subtracting operation, or during an adding operation subsequent to such a subtracting operation. This mechanism is known in the art as "Overdraft mechanism", and the extra unit as the "Fugitive unit", and will be termed such hereinafter.

Referring to Figs. 1, 46 to 50, 52 and 55, and more particularly to Fig. 49, it may be seen that the wheels 1180 and 1190 of the highest denominational order have the usual differential mechanism including the rack 114, but have no corresponding bank of keys 100. This denominational order having no corresponding key bank is known in the art as an "overflow denomination", and will be termed such hereinafter.

Figure 46:
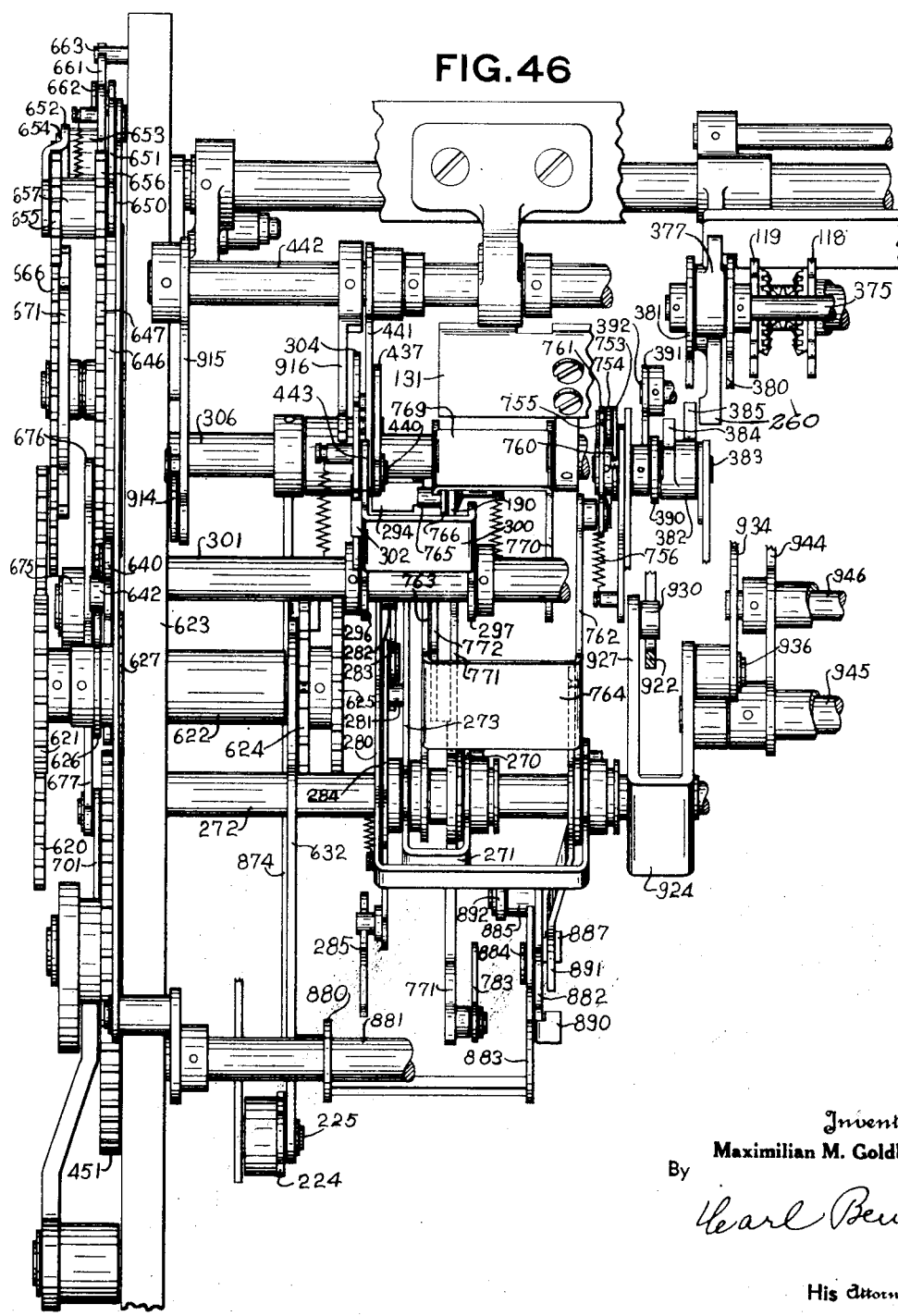
Fig. 46 is a back view of the right end of the machine, as seen in Fig. 1, showing the mechanism with the cover removed.
Figure 48:
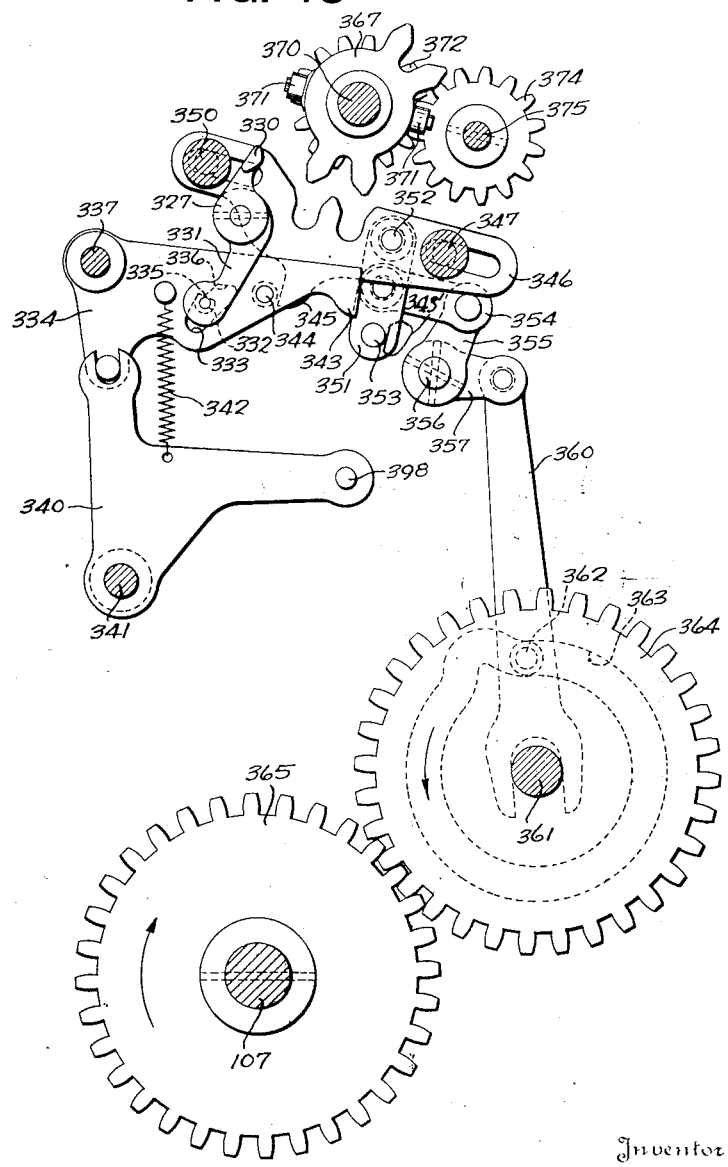
Fig. 48 is a side elevation of a portion of the overdraft mechanism partly shown in Fig. 47 showing its connection to the machine drive.

The overdraft transfer pawl 327, Fig. 49, is situated in line with whatever wheel of the overflow denomination is in line with its rack 114, and cooperates with it in the same manner that the pawl 325, Fig. 55, cooperates with the totalizer wheel with which it is in line. The construction of this pawl is identical to that of the pawl 325, having a tail 330, Fig. 48, a lower arm 331 and a stud 332 fastened thereon. The stud 332 extends into a recess 333 in the bell crank 334, the recess having a step 335 and a pocket 336. The bell crank 334 is pivoted to the machine frame at 337 and is coupled to another bell crank 340 pivoted to the frame at 341. The two bell cranks 334 and 340 are tensioned clockwise and counter-clockwise, respectively, by the spring 342 fastened to each. The bell crank 334 has a nose 343 and a stud 344, the latter normally lying in the path of the ear 345 which depends from the lower edge of the rack 346. The rack 346 is mounted at 347 and 350 for sliding movement, and has the driven lever 351 pivoted to it at 352. The driven lever 351 has a stud 353, at its lower end, lying in the plane of the bell crank 334, and has a link 354 pivoted to it midway of its pivot 352 and the stud 353. A block 343' is mounted on a frame adjacent the stud 353 and lies in the path of the stud to prevent rearward movement thereof. The link 354 is pivoted, at its opposite end, to the arm 355 pinned to the shaft 356, which has pinned to its other end the arm 357. A cam rod 360 is pivoted at its upper end to the arm 357, and is bifurcated at its lower end to have a sliding motion on the rod 361. A stud 362 on the cam rod 360 rides in a cam groove 363 in the cam gear 364. A gear 365 meshes with the cam gear 364 and is pinned to the drive shaft 107, from which the mechanism just described receives its movement. Two mutilated gears 366 and 367, Figs. 48, 49 and 50 are loosely mounted on the totalizer shaft 370 and have their movements transmitted to each other through the bevelled gear pinions 371 in a manner similar to the totalizer wheels 118 and 119. The gear 366 lies in the plane of the rack 346 when the totalizer is in its adding position and is engaged with the rack, when the totalizer is engaged with the differential mechanism, to receive whatever motion is imparted to the rack 346. Likewise, the gear 367 lies in the plane of the rack 346 when the totalizer is in its subtracting position, as shown in Fig. 49, and receives whatever motion is imparted to the rack 346. A gear 372 (Figs. 48, 49, and 50) is connected to the gear 366 by the hollow shaft 373 and meshes with the gear 374 pinned to the shaft 375. The shaft 375 is journaled in the shiftable totalizer frame at 376 and 377, and has secured to it the tappets 380 and 381, Figs. 46, 49 and 52. A rocker 382, pinned to a shaft 383 journaled in the machine frame, has two upwardly extending arms 384 and 385 and a forwardly extending arm 386, Fig. 52, having a stud 387 on the end thereof. When the totalizer is in its adding position and is engaged with the differential mechanism, the arm 384, Figs. 46 and 49, lies in the plane of the tappet 380 and in its path, so that if the tappet should be moved one step counter-clockwise, the rocker 382 would be rotated clockwise, to the position shown in Fig. 52. Likewise, if the totalizer is in its subtracting position, as shown in Figs. 46 and 49, the tappet 381 is in the plane of the arm 385, and when the totalizer is engaged, lies in a position to rotate the rocker 382 counter-clockwise if given one step of rotation clockwise. A cam rod 390 (Fig. 52) is slotted at its rear end to slide on a reduced portion of the rocker 382, and is pivoted at its front end to the arm 391 extending downwardly from the shaft 392, to which it is pinned, and which is journaled in the machine frame. The cam rod 390 has a cam block 393 secured to its side and lying in the plane of the stud 387 and in its path in such a manner that when the rocker is rotated in either direction, the stud will move the block to the rear, rotating the shaft 392 counter-clockwise against the tension of spring 394. An arm 395 depends from the opposite end of the shaft 392, to which it is pinned, and has, on its lower end, a stud 396 extending into the slot in the transfer plate 316, Fig. 55, of the differential mechanism in the units or "pennies" denomination. This plate is identical with the transfer plate 316 shown in Fig. 55, and the arm 395 performs the same functions in respect to it as is performed by the lower arm of the transfer pawl 325.

11. Operation of overdraft mechanism

Assuming the totalizer is standing at positive "1" and the amount 2 is to be subtracted, the totalizer, Fig. 49, will be shifted to its subtracting position, with its wheels 119 in line with the racks 114, and will then be engaged with the racks. The wheel 119 in the units denomination now stands at "8", while the remaining wheels 119 all stand at "9". The wheel 118 of the units denomination now stands at "1", while the remaining wheels 118 stand at 0. When the units rack moves its first step, the units wheel 119 will turn to "9", the wheels 119 then all reading "9". When it moves its second step, the units wheel will turn to "0", tripping the transfer pawl for the tens denomination, which will then have a unit added to its wheel, turning it from "9" to "0", and so on along the entire totalizer until the overflow wheel 1190 trips the overdraft transfer pawl 327. This moves the stud 332, Fig. 48, from under the step 335, allowing the spring 342 to rotate the bell crank 334 clockwise, until the stud 332 rests on the upper edge of the pocket 336. This moves the stud 344 out of the path of the ear 345 and moves the nose 343 in front of the stud 353 to block its movement. The cam slot 363 then raises the cam rod 360 and moves the link 354 to the left. The stud 353 being held against movement to the left, necessitates a movement of the rack 346 to the left, rotating the gear 367 an increment clockwise. This rotates the gear 366 and the gear 372, Fig. 50, counter-clockwise, and the gear 374 and shaft 375 clockwise. This rotates the tappet 381 clockwise, Figs. 46 and 52, and the rocker 382 counter-clockwise, causing the stud 387 to move downward past the cam block 393, while the block moves the cam rod 390 and the stud 396 to the right, Fig. 52. This movement of the stud 396 allows the transfer plate 316, Fig. 55, in the units denomination to rotate clockwise, causing the addition of the fugitive unit in that order. The units wheel 119 now reads "1" and the others "0". The adding wheels 118 now read "8" in the units denomination and "9" in all the others. The slide 346 is returned rightwardly to its normal position when the stud engages the block 343' and the link 354 is moved to the right by the driving means.

Figure 47:
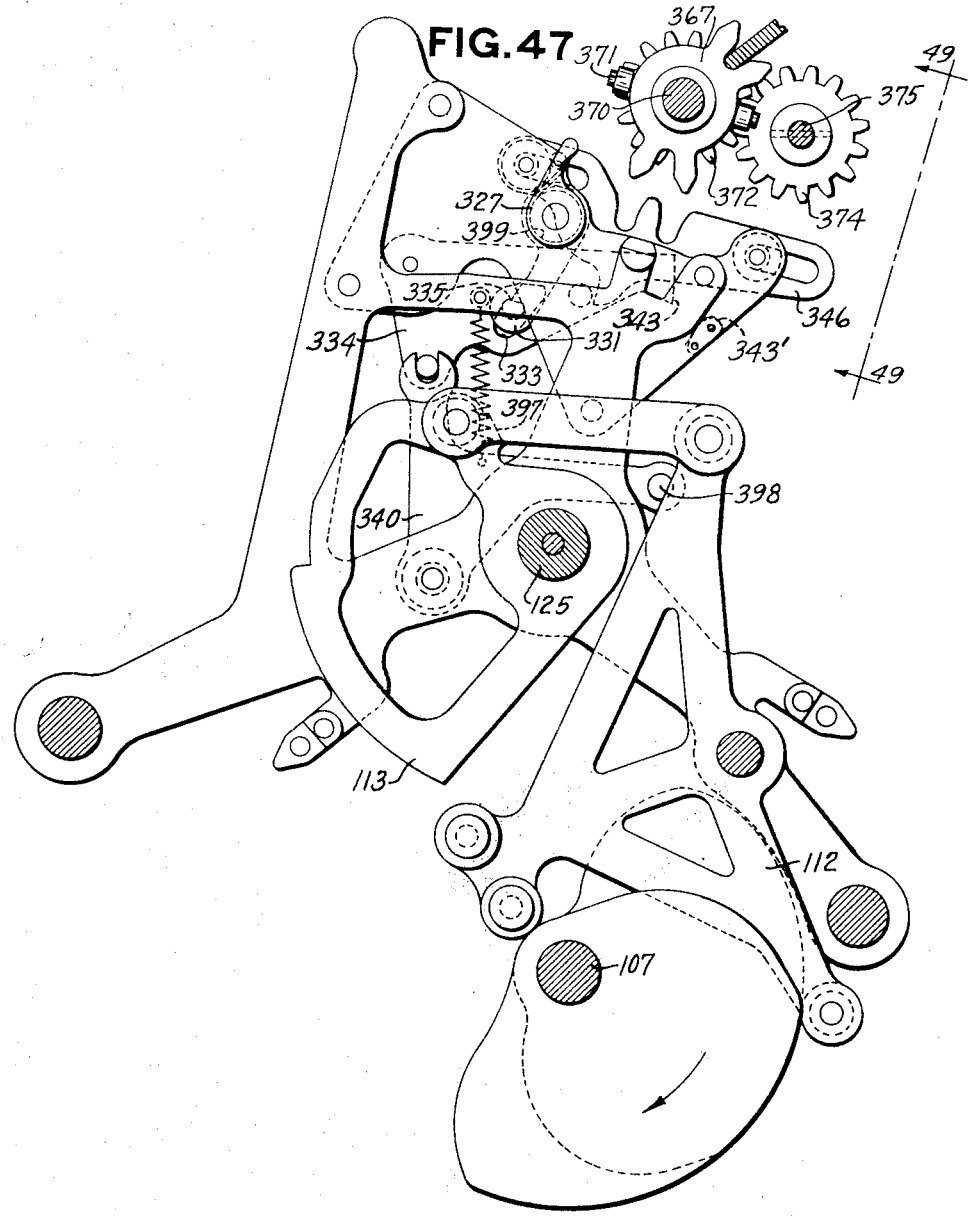
Fig. 47 is a side elevation of parts of the overdraft mechanism, showing their cooperation with the differential mechanism of the amount key bank of highest denominational order.

If now the amount 2 is to be added into the totalizer, it will be shifted to its adding position during the clockwise movement of the actuators 194, Fig. 39, and 113, Fig. 47. When the actuator 113 nears the end of this movement, its shoulder 397 strikes the stud 398 on the bell crank 340, pressing it downward and rotating the bell crank 334 counter-clockwise against the action of spring 342. This allows the transfer pawl 327 to return, by the tension of its spring 399, to its former position on the step 335 of the recess 333, and moves the nose 343 out of the path of the stud 353 so that until the pawl 327 is again tripped, the overdraft mechanism will not be operated. The wheels 118 are now brought into engagement with the racks 114 which begin their return movement. The entering of the first unit will turn the units wheel to "9", the wheels 118 then all reading "9", as in the case of the wheels 119 in the above example. The entering of the second unit causes all the wheels to be turned to "0", and all the transfer pawls to be tripped, the pawl 327 again releasing the bell-crank 334. This time, however, the rack 346 is engaged with the gear 366, which, when rotated clockwise by the gear, rotates the gear 374, the shaft 375 and the tappet 380 counter-clockwise. The tappet 380, now lying in the plane of the arm 384, rotates the rocker clockwise. As in the former example, the cam rod 390 and the stud 396 are moved to the right, releasing the transfer plate 316 in the units denomination and causing the addition of the fugitive unit in that order.

The "fugitive 1" is not added to the units order totalizer element if the totalizer should exceed its capacity. If, for example, the positive, or adding, wheels 118, are in line with the actuators 114, the tappet 380 is in line with the arm 384 of the rocking member 382. Also, if the totalizer contains a positive total, the rocker 382 is in its positive position, shown in Fig. 52. Then, if the totalizer should exceed its capacity, and the highest order element 1180 pass from "9" to "0", the member 327 would be tripped to lower the arm 334 into the path of stud 353 and, thereafter, the train of mechanism, including the rack 346, gears 366, 372 and 374, shaft 375 and tappets 380 and 381, would be given a step of movement. This movement of the tappet 380 would be counter-clockwise, as viewed in Fig. 52 and, since the rocker 382 is already in its clockwise, or positive, position, the movement of the tappet 380 has no effect on the rocker 382. This is true because, at such times, the arm 384 of the rocker 382 has passed beyond the range of movement of the tappet 380. Therefore, it is clear that, although the arm 327 is tripped, when exceeding the capacity of the totalizer, the "fugitive 1" is not entered, because the tappet 380 does not rock rocker 382 and, consequently, the transfer arm 395 does not release the transfer segment of the units order wheel.

If the totalizer should exceed its capacity in a negative direction, it must be when the total on the totalizer is already negative, and the same principle applies. The only different condition existing in the machine is that the rocker 382 will be in its negative position, that is, counter-clockwise from the position shown in Fig. 52, and the tappet 381 will be in line with the arm 385, since such exceeding of the capacity negatively can only occur in the course of a subtracting operation. Then, when the highest order wheel 1190 passes from "9" to "0", the tappet 381 will be operated, but the arm 385 will be out of the range of movement of the tappet and it will not operate the rocker 382. For this reason, the transfer arm 395 will not release the transfer segment of the units order wheel and, therefore, a "fugitive 1" will not be entered. From the foregoing, it will be clear that the "fugitive 1" is entered in the totalizer only when the sign of the total changes, and never when the totalizer exceeds its capacity, either additively or subtractively.

*12. Machine release mechanism for adding and subtracting operations*

For adding and subtracting operations, the machine is released by the depression of any of the transaction keys 134, 135, 137 and 140, Fig. 2, and the motor bar 400.

Referring to Figs. 28 and 30 to 32, when a key 135, Fig. 30, is depressed, its stud 266 moves the cam plate 402 to the left, swinging the arm 403 clockwise, about its pivot on the rod 404. The roller 405 on the ear 406 of the arm 403 then rotates the bell-crank 407 and the arm 410 of the yoked block 411, Figs. 28 and 30. This swings the nose 412, Figs. 28 and 31, of the yoked block 411 out of the path of the stud 413 on the bracket 414, against the tension of the return spring 415.

Referring to Figs. 28 and 34 to 36, when the motor bar 400 is depressed, it swings the lever 416 about its pivot 417, the stud 420 swinging the lever 421 counterclockwise. This swings, clockwise, the arms 422 and 423, connected by the yoke 424 and pivoted on the release shaft 425. The arm 423, Fig. 35, swings the block 426 counter-clockwise, removing its nose 427 from the path of the stud 413, Figs. 28 and 36, against the tension of the return spring 428, connected to the block 426 by the yoke 429 and the arm 430.

The removing of the two blocks 411 and 426 from the path of the stud 413, allows the bracket 414 and the release shaft 425 to be rotated clockwise, by a spring device to be later described, causing a closing of a motor switch and a clutch to start the machine, in the manner fully shown and described in the United States Patent No. 1,619,796, to B. M. Shipley. The pawl 431, fully shown and described in the Shipley patent just mentioned is provided to prevent repeat operations of the machine by the operator holding the keys in depressed position.

Figure 21:
Fig. 21 is a detail side elevation of one of the controls of the key controlled totalizer selecting mechanism.

Referring to Fig. 21, link 432 is pivoted at 433 to the bracket 414 and at 434 to the arm 435 pivoted on the shaft 436. A bar 437 is pivoted at 434 and at 440 to the arm 441 extending downwardly from the shaft 442 on which it is pivoted. The tail 443 of the bell crank 296 and the stud 444 secured to the side of the latch 304 lie in the path of the arm 441, and are moved by the arm, as will be hereinafter explained.

When the shaft 425 is moved clockwise to release the machine, the link 432 and the bar 437 are moved to the left and the arm 441 is swung clockwise. The arm 441 strikes the stud 444, rotating the latch 304 and causing the block 302 to move from the notch 303 to the notch 310. This allows the differential mechanism in the first transaction bank to carry out its functions already explained.

13. Driving mechanism

The machine can be driven either by a motor or by hand. The clutch, motor, switch, and other parts necessary to the motor driving mechanism are fully shown and described in the United States Patents, Nos. 1,144,418, to C. F. Kettering and W. A. Chryst, and 1,619,796 to B. M. Shipley, the latter of which shows the mechanism employed to start the operation of the motor drive when the release shaft such as 425, Figs. 3, 28, 31 and 37, is rotated. Also shown in the latter patent is the gear train transmitting the driving motion from the clutch to the drive shaft such as shaft 107, Figs. 3, 14, 17, 39, 55 and 57.

To drive the machine by hand, a crank shown in outline in Fig. 3 is employed. This crank drives the machine through a ratchet mechanism 445 secured to the gear 446, the crank and ratchet mechanism being similar to that fully shown and described in the United States Patent No. 1,761,542, of B. M. Shipley. The gear 446 transmits its motion through the gears 447, 450, 451 and 452, to the drive shaft 107 which operates the machine.

14. Restoring mechanism for adding and subtracting operations—Restoring of machine release Referring to Figs. 3 and 8 the gear 447, which is driven during every operation of the machine, either manually by the gear 446 or by power through the drive shaft 107, has a groove 453 with a cam surface at 454. A roller 455 rides in the groove and is mounted on the rear arm of the lever 456 pivoted at 457. A stud 460 is secured in the forward arm of the lever 456, protrudes through the slot 461 in the upper end of the coupler 462, and extends over the ear 463 of the slide 464. A lever 465, is pivoted to the upper end of the slide 464 and is pinned to the shaft 425. A spring 466 is fastened at its ends to its couplers 462 and 467, the latter of which is pivoted to the lower end of the slide 464, and exerts on the slide a constant force upward. The coupler 462 has a downwardly extending arm 470 with a bifurcation, at its lower end, extending around the stud 471 in the slide 464, and acts as a guide for the coupler 462 and spring 466. A stud 472, fixed to the ear 473 extending from the back edge of the slide 464 protrudes through slots in the guide plate 474 and the link 475, and serves as a guide for the lower end of the slide 464. The guide plate 474 is pivoted on the stud 476 and has its swinging movement controlled by the movement of the lever 477, pivoted at 480 and having a roller 481 lying within the slot 482 in the guide plate 474.

When a transaction key and the motor bar 400 are depressed, removing the blocks 411 and 426, Figs. 31 and 36, from the path of the stud 413, the spring 466, Fig. 8, being held stationary at its upper end, lifts the slide 464 to rotate the lever 465 and the shaft 425 clockwise. This rotation of the shaft 425 releases the machine for operation in the manner fully shown and described in the United States Patent No. 1,619,796.

Near the end of the operation, the cam surface 454 raises the roller 455, lowering the stud 460 and pulling, downward, the slide 464 by the contact of its ear 463 with the stud 460, the lower end of the slide being guided by the stud 472 riding in its slot in the guide plate 474. This rotates the shaft 425, counter-clockwise, a distance considerably greater than is received on its clockwise rotation, allowing the return springs 415 and 428, Figs. 31, 32, 35 and 36 to return their respective blocks 411 and 426 to their former positions, with their noses 412 and 427 in the path of the stud 413.

As the cam surface 454, Fig. 8, moves past the roller 455, the slide 464 is allowed to move upward, by the tension of the spring 466, until the stud 413 comes to rest in the position shown in Figs. 31, 32 and 36.

15. Restoring mechanism for adding and subtracting operations—Restoring of parts of balance totalizer shift control The counter-clockwise rotation of the shaft 425, Fig. 21, moves the link 432 and the bar 437 to the right, and swings the lower end of the arm 441 sufficiently to rotate the bell-crank 296 clockwise, by contact with its nose 443, from its position where the block 302 rests in the notch 310, to that shown in Fig. 21. When the bell-crank has been rotated to this extent, the shoulder 483 on the bar 437 strikes the stud 484 on the latch 304 and rotates the latch clockwise, by this positive movement, to lower the notch 303 over the block 302 if for some reason it had not already been lowered by the tension of the spring 307.

16. Restoring mechanism—Automatic key release and disconnecting and stopping of motor The counter-clockwise rotation of the shaft 425, Figs. 8, 52 and 55, returns the depressed amount and transaction keys to their former positions, disconnects the motor from the machine drive and breaks the motor circuit in the manner fully shown and described in the United States Patents 1,144,418, to C. F. Kettering and W. A. Chryst and 1,619,796 to B. M. Shipley.

17. Restoring mechanism—Manual key release

Referring to Fig. 8, the handle 485 is pivoted at 486 and has a segment 487 meshing with the segment 490 of the lever 491 pivoted on the stud 476. The link 475, having the stud 472 projecting into the slot in its upper end, is pivoted at its lower end to the lever 491.

When it is desired to release any key erroneously depressed, and before the machine is released, the handle 485 is rotated clockwise, pulling the link 475 and the slide 464 downward, and rotating, counter-clockwise, the shaft 425. This releases all the depressed keys in the manner fully shown and described in the United States Patent No. 1,619,796, to B. M. Shipley.

18. Adding operation

Presuming, while making out a statement, a deposit of $25 is to be entered. The amount is set up on the amount keys 100, Figs. 2 and 55. The "deposit" key 140, Figs. 2, 45, and 52, is next depressed, moving the finger 280, Fig. 39, one step, removing the zero stop pawl 195 and making it possible for the stop lever 188 to rotate its fullest extent.

The motor bar 400, Figs. 2 and 34, is then depressed, releasing the machine for operation by allowing the shaft 425, Figs. 8 and 21, and the bell-crank 296 to be rotated, as explained under heading 12. The drive shaft 107, Figs. 3, 10, 14, 17, 19, 39, 47, 48, 52, 55, 57 and 58, then begins to rotate, first disengaging any totalizers engaged during the previous operation, Fig. 62, as explained under heading 7. The differentials in the amount and transaction banks then start their upward stroke and the aliner 131 Figs. 52, 55 and 58, rocks out of engagement with its segments 130 and 164, as explained under headings 1 and 3. When the differentials start their movement, the levers 236, 237 and 240 Fig. 17, are moved away from the totalizer selecting plates 210 and 211 as explained under heading 7, to permit them to be rotated by the transaction differential as explained under heading 6. The upward movement of the transaction differential also shifts the totalizer lines laterally, as explained under heading 5, the "balance", or upper totalizer being shifted to its adding side, by the differential arm 173 being free to move up to the "9" position, as explained under heading 8. When the differential reaches the end of its upward movement, the aliner 131 is moved into engagement with its segments 130 and 164, as explained under heading 1, and the levers 236, 237 and 240 are moved into engagement with the plates 210 and 211 to select the totalizer lines to be engaged during the operation, as explained under heading 7. Referring to Fig. 2, it will be seen that for this operation, all three totalizer lines will be engaged with the differential racks, to add the number into the "balance" totalizer, the individual totalizer for the "deposit" transaction key, and the grand totalizer for the third transaction bank. As soon as the levers 236, 237 and 240 complete their movement, the totalizers move into engagement with their differential racks, as explained under heading 7. The differential is then returned to its home position, the racks 114 rotating the totalizer wheels to enter the amount $25 thereon. When this return movement is nearly completed, the restoring cam 454, Fig. 8 becomes effective, restoring the machine to its former condition and bringing it to a stop, as explained under headings 14 to 16.

19. Subtracting operation

When an amount is set up on the keys 100 and one of the subtracting keys 135 or 137 is depressed, the operation of the machine, upon depression of the motor bar, will be identical to the adding operation just described, except that the "balance" totalizer will be shifted to its subtracting side and the number run thereon, as explained under headings 5 and 8.

TOTAL READING AND RESETTING

20. Reading and resetting operations—In general

Reading and resetting operations are performed by the same driving mechanism used in adding and subtracting operations, which is released for operation either by the depression of one of the transaction keys and one of the total keys 492, 493, 496, or 497, Fig. 2, or by the depression of one of the total keys 492-497 alone.

The total of the amounts entered by any transaction key in the third bank is read by depression of that transaction key and the total key 492, and is reset by depression of that transaction key and the total key 497.

The total of the amounts entered by any transaction key in the second bank is read by depression of that transaction key and the total key 493, and is reset by depression of that transaction key and the total key 496.

The total of the amounts entered by all the keys 140 is registered on the "grand" totalizer for the third bank, situated in the "0" position of the second bank. This amount is read by depression of the total key 493 alone, and is reset by depression of the key 496. The total of the amounts entered by all the keys 135 is registered on the "grand" totalizer for the second bank, situated in the "0" position in the third bank. This amount is read by depression of the total key 492 alone, and is reset by depression of the key 497. This method of obtaining the grand total of the amounts in one bank by a totalizer in the zero position of another bank is well known, as shown in the United States Patent No. 1,761,542, to B. M. Shipley, and will therefore not be further described here.

The amount registered on the "balance" totalizer is read by depression of the key 494 and is reset by depression of the key 495. For all reading and resetting operations, it is necessary for the machine to operate through two complete cycles, in a manner similar to that employed in the patents to Chryst, Fuller and Shipley referred to above. In the present machine the term "cycle" means one complete rotation of the main shaft 107.

21. Total keys and their interlocks with each other and with the transaction keys Referring to Figs. 3, 5, 6, 7, 9, 39, 41 and 52, the total keys 492—497 are slidably mounted in a frame 500, Fig. 3, and have pins 501 extending from their sides and overlying slots in the locking plates 502 and 503. A bar 504 is pivoted, at its ends to the plates 502 and 503, and near its middle to the stud 505 on the end of the arm 506, Fig. 9. A shaft 507 is journalled in the machine frame and has pinned to it the arm 506 and the cam lever 510. A spring 511 is fastened to the stud 505 and to the machine, and holds the parts in their upper position shown in Figs. 3, 5, 6, 7 and 9. The locking plates 502 and 503 are pivoted, at their lower ends, to the middle of the levers 512 and 513, pivoted on the rod 514. Links 515 and 516 are pivoted on the outer ends of the levers 512 and 513 respectively, and also to the arms 517 extending from the yoked bracket 520 and the arm 521 pinned to the shaft 522 respectively. The shaft 522 is journalled in the machine frame and has three ears 523, 524 and 525 secured to it in the planes of the blocking pawls 526, 527, and 530, respectively, Fig. 7. The yoked bracket 520 is pivoted on the shaft 522 and has fastened to it the yoked brackets 531 and 532 secured to each other and likewise pivoted on the shaft 522. Ears 533, 534 and 535 extend from the brackets 520 and 532, and lie in the planes of the blocking pawls 526, 527 and 530 respectively, and adjacent the ears 523, 524 and 525. The blocking pawls 526, 527 and 530 are widened as shown at 526', 527' and 530' (Fig. 7) to coact with both sets of ears.

The plates 502 and 503 are each provided with six slots 540 to 545 and 550 to 555, the slots 542, 543, 550 and 555 each moving their respective plates three increments when a stud 501 is moved into them. The slots 541, 544, 551 and 554 each move their respective plates two increments and the slots 540, 545, 552, and 553 each move their respective plates one increment. From this it is seen that for any total key depressed, the sum of the movements of the two plates 502 and 503 will be four increments, thus producing a uniform movement of two increments on the stud 505.

Referring to Figs. 7, 30 and 52, each of the three transaction banks has a cam plate 402 pivoted at its lower end to one of the blocking pawls 526, 527, 530, pivoted on stud 556 in their respective banks. When a transaction key is depressed, its stud 266 presses the respective plate 402 downward moving the corresponding pawl 526, 527 or 530 into the path of two of the ears 523, 533; 524, 534; or 525, 535 respectively. This prevents the depression of the total keys for the transaction banks other than the one in which the transaction key was depressed, as will now be explained.

In the machine as illustrated there are no keys in the first transaction bank adapted to move the cam plate 402 in that bank, Fig. 39, since the plate is cut away from the path of the studs 266 on the keys 132 and 133, but since it is optional whether or not other keys, which will move the plate 402, are placed in this bank, the interlocks will be described as though one or more of those keys were present. When such a key in the first bank is depressed, the pawl 526 moves into the paths of the ears 523 and 533. When one of the total keys 494 or 495 for the first bank is then depressed, the ear 523 is moved one step upward and the ear 533, is moved three steps upward where they lie adjacent the pawl 526, neither ear being blocked by the pawl in this movement. However, should an attempt be made to depress any other total key except a key 494 or 495, the plate 503 would be restricted in its movement farther than one step due to the ear 523 bearing against the pawl 526, and the key could, therefore, not be fully depressed, which is necessary to release the machine.

When a key in the second transaction bank is depressed, the pawl 527 moves into the paths of the ears 524 and 534. When one of the total keys 493 or 496 for the second bank is then depressed the ears 524 and 534 are both moved upward two steps, where they lie adjacent the pawl 527, neither being blocked by the pawl in this movement. However, should an attempt be made to depress either total key 494 or 495 for the first bank, its complete depression would be blocked by plate 502, which must be moved three steps before such a depression can be made. Likewise, should an attempt be made to depress either total key 492 or 497 for the third bank, its complete depression would be blocked by plate 503, which must be moved three steps before such a depression can be made.

When a key in the third transaction bank is depressed, the pawl 530 moves into the paths of the ears 525 and 535. When one of the total keys 492 or 497 for the third bank is then depressed, the ear 535 is moved one step upward and the ear 525 is moved three steps upward, where they lie adjacent the pawl 530, neither being blocked by the pawl, in this movement. However, should an attempt be made to depress any other total key, the plate 502 would be restricted in its movement farther than one step, due to the ear bearing against the pawl 530, and the key could therefore not be fully depressed.

When any total key is depressed, the upper surface of the plates 502 and 503 is moved under the studs 501 on the remaining keys, preventing a depression of any of them prior to the return of the depressed key to its normal position. The simultaneous depression of two total keys representing different banks is prevented by the plates 502 and 503, because of the different distances these plates must be moved before the keys can be fully depressed.

To prevent the simultaneous depression of both total keys for any one bank, a slide 557, Fig. 3, is provided. This slide is mounted for sliding movement on the headed studs 560 and 561, extending from the side of plate 502. The plate has four slots the edges 562, 563, 564, and 565 of which together with the upper and lower ends 566 and 567, form surfaces contacting with the studs 501, which extend into the plane of the plate. The plate and the slots are cut in such a manner that the distance between the surfaces 563 and 564 is greater than the distance between the studs 501 on the keys 494 and 495 for the first transaction bank, and so on for the keys 493 and 496 for the second bank, and for the keys 492 and 497 for the third bank. Thus when one of the keys, for instance key 496, is depressed, the plate 557 is moved upward so that the slot for the pin 501 on the key 493 is moved out of alinement with the pin, and the key cannot be depressed until the key 496 has returned to normal position.

The total keys are restored to normal position by the camming action of the slots in the plates 502 and 503, the spring 511 exerting a constant force upward on these plates. To prevent the restoration of these keys before the end of an operation, a bracket 568, Figs. 6 and 7, secured to the arm 569 and having a flange 570 is provided to cooperate with studs 571 extending from the side of the link 516. As soon as a total key is fully depressed, the arm 569 is swung clockwise a distance sufficient to move the flange 570 over one of the studs 571, holding the slide 503 and the depressed key from return movement. The arm 569 is returned to its former position at the end of the operation, allowing the spring 511 to return the depressed total key and plates 502 and 503, and the associated parts. The mechanism controlling the movement of the arm 569 will be described later.

22. *Machine release mechanism for total reading and resetting operations*

The machine is released for total reading and resetting operations either by the depression of one of the total keys alone, or by the depression of a transaction key and then one of the total keys. The first method of releasing will now be described.

When a total key is depressed and the lever 510, Figs. 9 and 37, is swung clockwise about its pivot on the shaft 507, it swings, with it, the rock arm 512, pivoted on the shaft 507, by contact with the stud 513 mounted thereon. This lowers the nose 574 from the path of the shoulder 575 on the lever 576, pivoted on the rod 577. Two arms 578 and 579, Figs. 29, 37, and 38, are pinned to the shaft 436 journalled in the machine frame, the arm 578 having a stud 581 secured to its end and lying within the bifurcation in the lower end of the lever 576. When the nose 574 is lowered, as just mentioned, a spring 582, fastened to the machine frame and to the arm 579, swings the arms 578 and 579 clockwise, and the lever 576 counter-clockwise until the shoulder 575 strikes the tooth 583 on the rock arm 572. This movement of the arms 578 and 579 raises the stud 581 on the arm 578 and the stud 584 on the arm 579. The stud 581 then rotates the lever 421, Figs. 34 and 38, the same as if the motor bar had been depressed, removing the block 426, Figs. 35 and 36, from the path of the stud 413, in the manner explained under heading 12. At the same time, the stud 584, Figs. 29 and 38 rocks counter-clockwise, the lever 585 pivoted on the rod 577, and also a stud 586, Figs. 28 and 29, secured to the lever 585, and resting against the hook 587, pivoted on the rod 577. The bellcrank 407, having a yoke 588 lying in the lower bifurcated end of the hook 587 is also rocked counter-clockwise, the same as if a transaction key had been depressed, removing the block 411, Figs. 30 and 31 from the path of the stud 413 in the manner explained under heading 12.

The removal of the blocks 411 and 426 from the path of the stud 413 allows the shaft 425 to be rotated by the spring 466, Fig. 8, to release and start the machine, in the manner explained under headings 12 and 13.

23. *Automatic positioning of the total plate*

Figure 11:
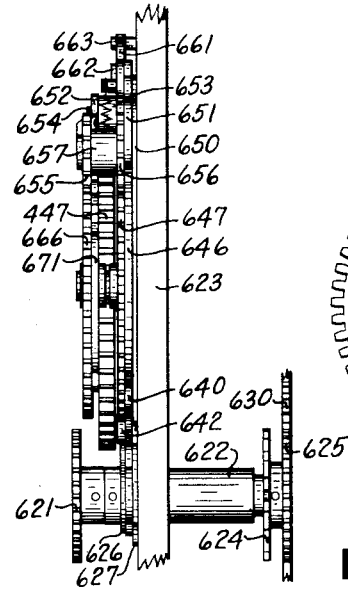
Fig. 11 is a back view and Figs. 12 and 13 are side elevations of parts of the controlling mechanism for total reading and resetting operations.

Cams 589 and 590, Fig. 3, are secured to the drive shaft 107 and cooperate with the rollers 591 and 592 on the actuator 593 to swing the actuator around its pivot on the stud 476. Two short links 594 and 595 are pivoted together at their lower ends and have a roller 596 mounted at the pivot point and lying within a slot 597 in the actuator 593. The links 594 and 595 are pivoted at their upper ends to the lower arms of the two converging levers 600 and 601, pivoted on the stud 602 and having upper arms 603 and 604, and ears 605 and 606. The arms 603 and 604 have flanges 607 and 610 extending at a right angle to the arms, and lying in a position to strike either the lower narrowed end 611, Fig. 9, of any depressed total key, or the stud 612 on lever 613. Two studs 614 and 615 extend from the arms 603 and 604, and lie in a position to strike the end of the front arm 616 of the setting lever 617, also pivoted on the stud 602. The rear arm 620 of the setting lever 617 has a rack meshed with the pinion 621 pinned to the shaft 622. The shaft extends through the frame plate 623, Fig. 11, and has an aligning wheel 624 and another pinion 625 secured on its other end. Cams 626 and 627, Figs. 11 and 12, also are secured to the shaft 622 and cooperate with mechanism to be later described. The pinion 625 meshes with the rack on the total plate 630, Fig. 17, pivoted about the rod 125 and the aligning wheel 624 cooperates with the aliner 632. The lever 224, pivoted at 225, is connected to the aliner 632 and imparts a vertical movement to it when the cam 223 rotates. A slot 633 in the upper end of the aliner 632 co-operates with the shaft 622 to guide the aliner in its vertical movement. A flange 634 is turned on the upper end of the aliner, and is moved into and out of the slots in the alining wheel 624 whenever the aliner is lowered or raised.

Referring to Fig. 9, when a total key is depressed, the cam lever 510 swings clockwise about its pivot at the shaft 507, moving the stud 635, on the upper end of the lever 613, into the lower end of the cam slot 636. This causes the lever 613 to swing clockwise about its pivot at 637, raising the stud 612 out of the path of the flanges 607 and 610, Fig. 3.

Considering now, that the total key 497 is depressed, the machine is immediately released, the stud 612 is raised, and the drive shaft 107 begins its rotation. The cam 223, Fig. 17, raises the aliner 632 to its upper position where the flange 634 is clear of the alining wheel 624 and holds it in this position for a short time, to permit a rotation of the shaft 622. The cam 589 (Fig. 3) then raises the actuator 593, spreading the upper ends of the links 594 and 595 and converging the arms 603 and 604. The arm 603 is stopped almost immediately by the narrow end of the key 497 lying in the path of the flange 607. The arm 604 continues downward, moving with it the arm 616, by its contact with the stud 615, until the cam 589 has moved the actuator to its highest point, at which time the arm 616 will lie approximately in line with key 497. This movement of the arm 604 while the arm 603 was idle was permitted by the roller 596 running to the end of the slot 597. The downward movement of the arm 616 raises the rear arm 620, causing a clockwise rotation of the pinion 621, the shaft 622, the alining wheel 624, Fig. 17, the pinion 625, and the cams 626 and 627, Figs. 11 and 12. This clockwise movement of the pinion 625 rotates the total plate counter-clockwise, to its position for resetting the amount registered on any totalizer in the line 122, Fig. 55, as will be later explained.

The cam 223, Fig. 17, then lowers the aliner 632 to the position shown in this figure, holding the total plate in its moved position. The arms 603 and 604, Fig. 3, then return to the position shown in that figure, being guided to their proper positions by the ears 605 and 606 striking the stationary stud 638.

During the second cycle of operation, the arms 603 and 604, and the aliner 632 are again operated as in the first cycle, this movement, however, amounting only to an idle operation, since the setting lever 617 was moved to its proper position during the first cycle.

The lever 617, the shaft 622, and the total plate 630 remain in their moved positions until the next succeeding operation of the machine, during the first part of which they will be moved to a position in line with another total key, if such is depressed, or will be moved to the position shown in Fig. 3 if an operation other than a total reading or resetting operation is begun, the stud 612 remaining in its lower position during such operations, and acting as a stop for the arms 603 and 604.

24. *Engaging of the cycle control for total reading and resetting operations*

To allow the machine to operate through two cycles instead of one, and to stop it at the end of the second cycle, the machine is provided with a special cycle control mechanism, which will be described under the next heading, and which is engaged for operation by the mechanism now to be described.

Figure 12:
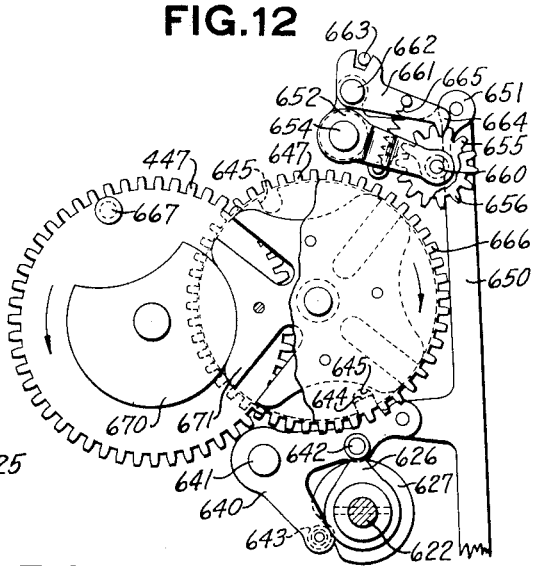

A bell-crank 640, Fig. 12, pivoted on the stud 641, has two rollers 642 and 643 cooperating with the cams 626 and 627 on the shaft 622. A finger 644 extends from the upper arm of the bell-crank 640 and lies within one of the two notches 645, Figs. 12 and 13, in the disc 646, secured to the gear 647. A link 650 is connected to the bell-crank and to the arm 651. An arm 652 is connected to the arm 651 by a sleeve 653, Figs. 11 and 46, the arms and sleeve being pivoted on the stud 654. Two pinions 655 and 656, connected by a sleeve 657, lie between the arms 651 and 652, and are supported on the rod 660 held by the arms. A detent 661 is pivoted on the stud 662 fastened to an upwardly extending portion of the arm 651, and has a notch in which extends the stud 663 secured to the machine fame. The nose 664 of the detent is normally held in mesh with the teeth of the pinion 656 by a spring 665 fastened to the detent and to the arm 651.

When the shaft 622 is rotated, following the depression of a total key, as explained under the previous heading, the cams 626 and 627 are rotated in one direction or the other, swinging the bell-crank 640 clockwise, removing the finger 644 from the notch 645 and lowering the link 650. This swings the arms 651 and 652 clockwise, lowering the pinions 655 and 656 into mesh with the gears 666 and 647. The clockwise movement of the arm 651 causes the stud 662 to move to the right, Fig. 12, swinging the detent 661 counter-clockwise about the stud 663 as a pivot, and removing the nose 664 from mesh with the pinion 656. The finger 644, the nose 664, and the Geneva gearing, to be described under the next heading, for the gear 666, maintain the gears 647 and 666 in proper alinement for meshing with the pinions 655 and 656. This meshing of the gears and pinions couples the machine drive to the gear 647 for a purpose to be explained under the next heading. Upon the first subsequent operation, other than a total reading or resetting operation, the cams 626 and 627 are returned to their former position during the first part of the operation, as described under the next preceding heading, restoring the parts to the position shown in Fig. 12.

25. *Cycle control and machine release restoring mechanism for total reading and resetting operations*

The stud 667, Fig. 12, the raised portion 670, and the plate 671 secured to the gear 666 form a Geneva gearing between the driving gear 447 and the gear 666, for intermittently driving the latter. The gear 447 rotates one revolution for each cycle of the machine, while the plate 671 and the gear 666 rotate but one-fourth a revolution. Thus during a total reading or resetting operation, the gear 447 rotates two revolutions while the gear 666 rotates only one-half a revolution.

Figure 13:
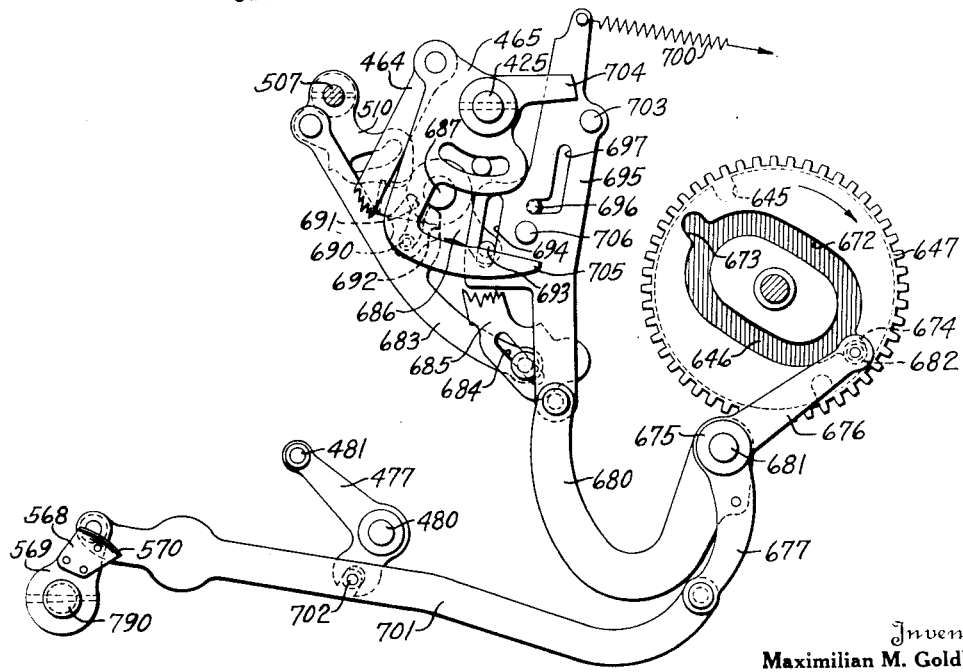

The gear 647 has a cam slot 672, Fig. 13, having two pockets 673 and 674. A bell-crank 675 having three arms 676, 677, and 680, is pivoted on the stationary stud 681, and has a roller 682 on the end of its arm 676. The roller 682 lies in one of the pockets 673, 674 at the end of each total reading or resetting operation, due to the gear 647 being driven by the gear 666, Fig. 12, which rotates only one-half a revolution for each total reading or resetting operation.

Figure 20:
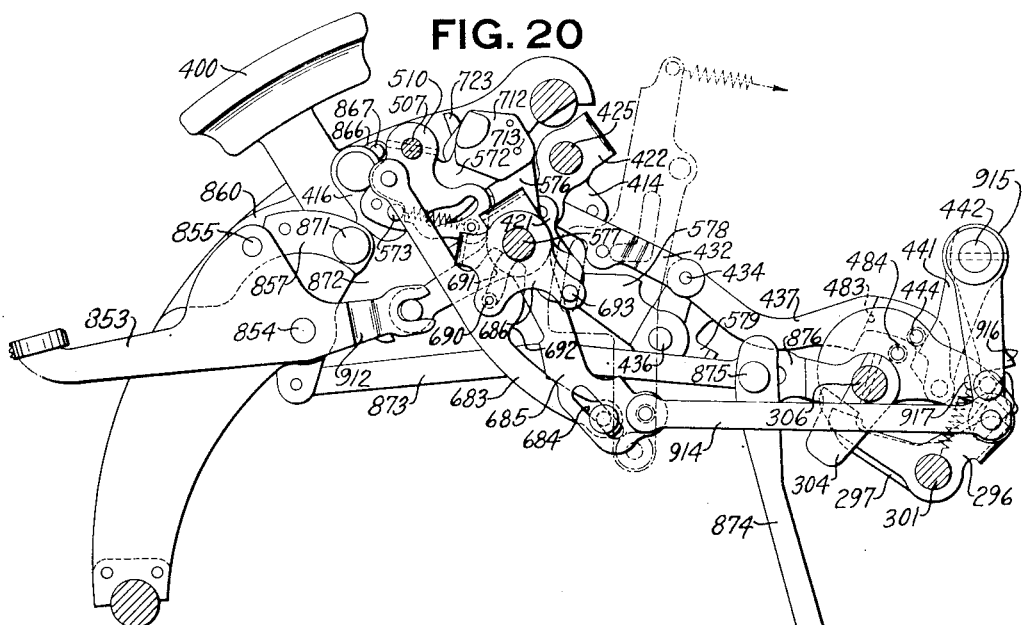
Fig. 20 is a side elevation of the repeat key and some of the parts controlled by it.

A link 683, Figs. 13 and 20, is pivoted, at its upper end, to the cam lever 510, and is mounted, at its lower end, for sliding movement in the slot 684 cut in the lower arm of the bell-crank 685. A bell-crank 686, pivoted on the stationary stud 687, has a stud 690 extending into a cam slot 691 cut in the ear 692 on the link 683, and also has a stud 693 extending into a slot 694 in the slide 695. This slide is pivoted, at its lower end, to the arm 680, and is guided in its movements by the stationary stud 696 extending into the slot 697. A spring 700, fastened to the top of the slide, keeps the upper end of the slide under constant tension to the right.

A link 701 is pivoted to the arm 677 and to the arm 569, and has a stud 702 lying within the notch in the lower arm of the bell-crank 477.

When a total key is being depressed, the cam lever 510 swings clockwise, lifting the link 683 and swinging, clockwise, the bell-crank 686. This moves the upper end of the slide 695 to the left against the tension of spring 700, and moves a stud 703 on the slide 695 under a finger 704 on the lever 465, and the stud 696 into the vertical portion of the slot 697. When the key reaches its fully depressed position, the shaft 425 and lever 465 are rotated clockwise, releasing the machine for operation, as explained under heading 22. The rotation of the lever 465 moves an arm 705, on the lever, from under a stud 706 on the slide 695, and moves the slide 695 downward, due to the contact of the finger 704 with the stud 703, and swings the bell-crank 675 counter-clockwise. This movement of the bell-crank moves the roller 682 out of the pocket 674 and moves the link 701 a short distance to the right, swinging the bell-crank 477 a short distance counter-clockwise and swinging the arm 569 a short distance clockwise. The swinging of the bell-crank 477 has no immediate effect on other mechanism, but the swinging of the arm 569 operates other parts which will be described later.

The machine then begins its operation, the gear 447, Fig. 12, being rotated in the direction of the arrow. Before the stud 667 reaches the plate 671, the shaft 622 and cams 626 and 627 are rotated, lowering the pinions 655 and 656 into mesh with the gears 666 and 647, and removing the nose 664 and the finger 644 from their alining positions, as explained under the previous heading. The stud 667 then moves into the slot in the plate 671 and rotates the gears 666 and 647 one-fourth a revolution. This moves the cam slot 672, Fig. 13, into a position where the roller 682 lies in one of the straight portions, which imparts a further counter-clockwise rotation to the bell-crank 675. This imparts an additional swing to the arm 569, the effect of which will be later described, and imparts an additional swing to the bell-crank 477 which swings the guide plate 474, Fig. 8, to the right, about its pivot on the stud 476. When the lever 465 received its clockwise movement to release the machine, the slide 464 was moved upward to the position where a notch 707, lying between the ear 473 and an ear 708, lay opposite a stationary stud 709. When the guide plate 474 is swung to the right, the slide 464 also is swung to the right, about its connection with the lever 465 as a pivot, causing the stud 709 to lie within the notch 707, and the ear 463 to be moved from under the stud 460 on the lever 456. Further rotation of the gear 447 causes the lever 456 to be swung counter-clockwise in its restoring movement, as explained under heading 14, but due to the ear 463 being moved from under the stud 460, the slide 464 does not receive its restoring movement, but is held stationary by the stud 709, and the machine is allowed to continue on a second cycle of operation.

When the stud 667, Fig. 12, rotates the gears 666 and 647 one-fourth a revolution on this second cycle, the cam slot 672, Fig. 13, moves to a position where the roller 682 lies opposite the pocket 673, the movement swinging the bell-crank 675 to the position it assumed just after the machine was released, and prior to the first movement of the gear 647. This moves the slide 695, the link 701, and the bell-crank 477 proportionately, removing the notch 707, Fig. 8, from around the stud 709, and replacing the ear 463 in the path of the stud 460.

Upon further rotation of the gear 447, the lever 456 is again actuated, this time moving the slide 464 downward, restoring the machine release mechanism and stopping the machine. This restoring movement causes the arm 705, Fig. 13, to be swung under the stud 706, raising the stud and the slide 695 to a position where the stud 696, lies at the junction of the vertical and horizontal portions of the slot 697. This moves the roller 682 into the pocket 673 and swings the bell-crank 477 and the arm 569 to their home positions shown in this figure. This movement of the arm 569 removes the flange 570 from between the studs 571, Fig. 7, allowing the springs 511, Fig. 6, and 700, Fig. 13, to return the depressed total key and the slides 502 and 503, Fig. 5, and the lever 510, Fig. 13, link 683, bellcrank 686 and slide 695, to their home positions shown in these figures.

The lever 576, Fig. 37, is returned to its home position, with the shoulder 575 behind the nose 574, as shown in this figure, by the restoring movement of the shaft 425. During this movement of the shaft, the link 432 is moved to the right, as explained under heading 15, causing the stud 710 to swing the arm 578 downward through contact with the cam surface on its upper edge. This swings the lever 576 clockwise, allowing the spring 711, fastened to the rock arm 572 and the lever 510, to return the rock arm to its home position. Upon the return clockwise movement of the shaft 425, as explained under heading 15, the lever 576 comes to rest on the nose 574.

26. *Non-repeat mechanism for total keys*

A non-repeat pawl 712, Figs. 20 and 22 to 26, is pivoted on the pin 713 to the lever 576, through the shoulder 575, Figs. 22 to 24 and 37. On the opposite side of the lever 576, the pin 713, along with the pin 714, holds a latch 715 rigid with the pawl 712. A spacing sleeve 716 holds the latch and pawl in their proper spaced relation. A stud 717 extends from the pawl 712, and lies in the plane of the rock arm 572 to operate in relation with the tooth 583, under certain conditions. A hook 720 is pivoted on the stud 721 extending from the side of the lever 576, and has a nose 722 and a tail 723. The nose is adapted to extend under a toe 724 on the latch 715, while the tail 723 lies in a position to strike the shaft 507, Fig. 22, when the machine is released. A spring 725, Fig. 26, is fastened to the pin 714 and to a stud 726 on the hook 720, and tensions the pawl 712 and the nose 724 downward, and the lower end of the hook 720 upward.

Figure 22:
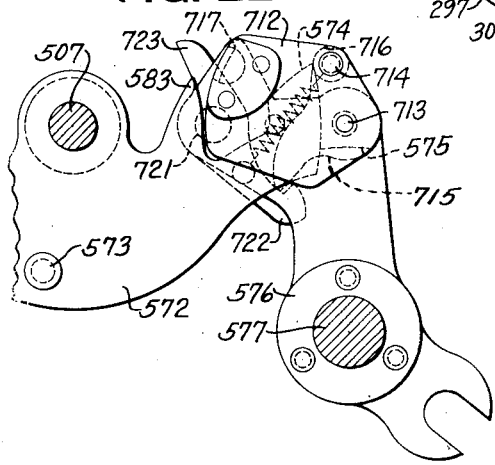
Fig. 22 is a side elevation of the non-repeat mechanism for the total keys shown in normal position.
Figure 23:
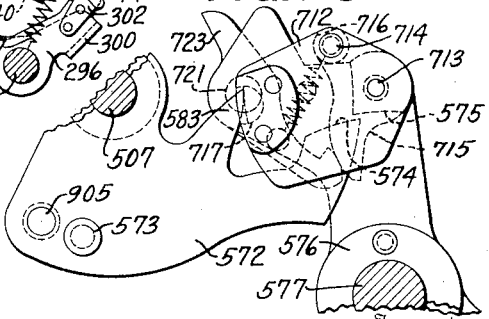
Fig. 23 is a side elevation of the non-repeat mechanism for the total keys, shown in the position it assumes when a total key is held depressed during a machine operation.

The parts are normally in the position shown in Figs. 22 and 37. When the rock arm 572 is lowered to release the machine, the lever 576 swings counter-clockwise until the shoulder 575 rests against the tooth 583. This movement causes the tail 723 to strike the shaft 507, moving the nose 722 from under the toe 724, Fig. 26, and allowing the spring 725 to lower the pawl 712 to a position where the sleeve 716 rests on the upper edge of the lever 576, as shown in Fig. 23. If, after the key is depressed, the operator removes his finger from it to allow it to be raised at the end of the operation, the nose 574 returns to the position shown in Fig. 22, when the lever 576 is swung clockwise, at the end of the operation, as explained under the preceding heading. This clockwise movement is sufficient to carry the sleeve 716 clear of the nose 574 while the sleeve is in its lower position. When the lever 576 is swung counter-clockwise, at the very end of the restoring movement, the sleeve 716 comes into contact with the nose 574, stopping its movement to the left, as viewed from Fig. 22, and upon continued movement of the lever 576, causes a lifting of the pawl 712, stud 717, and toe 724, Fig. 26. This lifting is sufficient to restore the toe 724 over the nose 722, so that the pawl 712 will be held in its upper position while travelling toward the shaft 507 at the beginning of the next operation, to allow the stud 717 to pass over the tooth 583.

If, however, after the key is depressed, the operator holds it in its depressed position while the restoring movement is taking place, the rock arm 572 is held in the position shown in Fig. 23. The clockwise movement of the lever 576 takes place as before, but on the return counter-clockwise movement, instead of the nose 574 striking the sleeve 716 to lift the pawl 712, it remains out of contact with the sleeve, and fails to return the pawl to its raised position. The stud 717 also remains in its lower position, where it strikes the tooth 583, as shown in Fig. 23, preventing further counter-clockwise movement of the lever 576, which is necessary to release the machine. Since the nose 574 now extends under the shoulder 575, it cannot be returned to its proper position until the lever 576, is moved. To accomplish this, the shaft 425, Fig. 8, is rotated by manipulation of the handle 485, in the manner explained under heading 17. This moves the link 432, Fig. 37, to the right, and swings the lever 576 clockwise, as in the ordinary restoring operation of this mechanism. Upon the release of the handle 485, the lever 576 swings counter-clockwise, restoring the pawl 712 to its raised position, with the toe 724 resting above the nose 722.

27. *Totalizer selection for total reading and resetting operations—Selection of totalizer line for engagement*

The link 226, Figs. 10 and 17, is pivoted at its lower end on a stud 727 on the end of a link 730, and has a stud 731 lying in the plane of the lug 732 extending downward from the machine frame. An end of the lever 224 extends between the links 226 and 730, and has a notch 733 therein, embracing the stud 727. The link 730 is pivoted at its opposite end to a bell-crank 734 pivoted, on its stud 735, to the machine frame. A roller 736 is mounted on the bell-crank 734, and rides in a cam slot 737, in the total plate 630.

During the first part of a reading or resetting operation, immediately after the totalizers employed in the previous operation are disengaged, the cam 223 swings the lever 224 counter-clockwise, pulling the link 226 downward, moving the studs 242 clear of the high spots on the discs 210 and 211, Figs. 2 and 17, and lowering the stud 731 to a position opposite the notch 740 in the lug 732. The total plate 630 is then moved one way or the other, depending upon whether a reading or a resetting key is depressed, swinging the bell-crank 734 counter-clockwise, by its connection with the cam slot 737, moving the link 730 to the right, and swinging the stud 727 out of the notch 733 and the stud 731 into the notch 740. The stud 731 remains in this position throughout the operation, and is not returned to its former position until the total plate is returned to its "add" position during a subsequent operation of the machine. This movement of the stud 731 insures that the studs 233, 234, and 235 will remain stationary throughout the operation, making the movement of the levers 236, 237, and 240 entirely dependent upon the movement of the studs 242.

Figure 18:
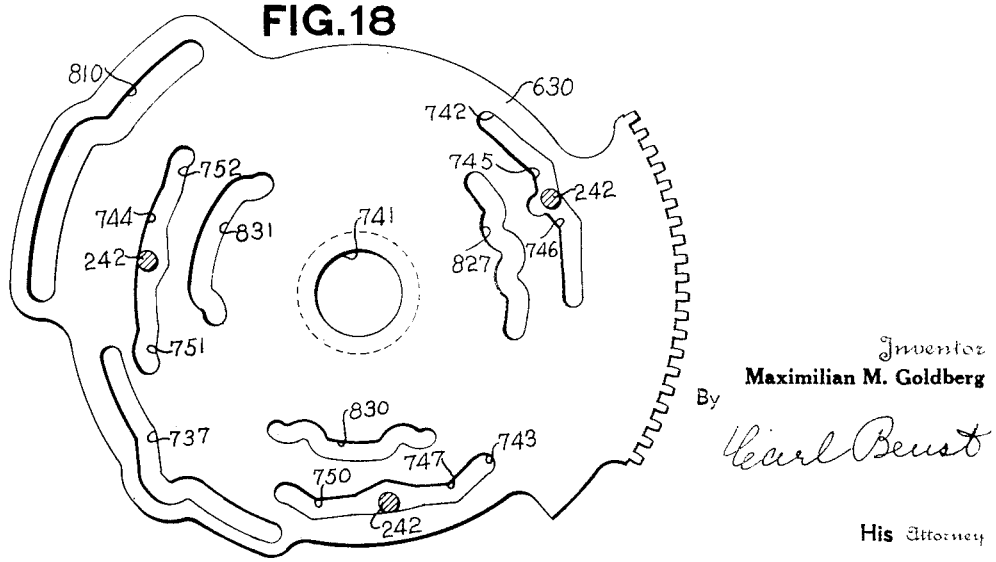
Fig. 18 is a detail side elevation of the total plate.

The movement of the total plate, just described, causes one of the studs 242 to be held in a position farther away from the hub 741, Fig. 18, than that shown in the figure, due to the configuration of the slots 742, 743, and 744 through which the studs 242 extend. If the total key 404, Fig. 2, was depressed, the stud 242 in the slot 742, controlling the engaging of the "balance" totalizer, would rest on the hump 745, the movement of the stud 242 causing the link 245, Fig. 17, to be swung to the right, the stud 243 moving from the recess 247, into the slot 250, and into engagement with hook 251, as shown in Figs. 14 and 17. If the total key 495 was depressed, the stud 242 would rest on the hump 746, and the stud 243 would again lie in the position shown in Figs. 14 and 17. Likewise, when the total keys for the second and third transaction banks are depressed, the studs 242 lying in the slots 743 and 744, Fig. 18, are moved away from the hub 741 by the humps 747, 750, 751 and 752, to select totalizer lines 121 and 122, Fig. 55, for engagement.

Many of the details of this selecting mechanism are shown in the United States Patent No. 1,619,796, to which reference may be made for a more detailed description.

28. Totalizer selection for total reading and resetting operations—Automatic selection of adding or subtracting side of the "balance" totalizer An arm 753, Fig. 44, is secured to the end of the shaft 383, to which is also secured the rocker 382, Fig. 52, the reciprocating movement of which has already been explained under heading 10. A line 754 is pivoted to the stud 755 on the end of the arm 753, and holds one end of a spring 756, secured at its other end to the machine frame. The spring and link hold the rocker 382 and arm 753 against accidental displacement, when lying in either of their positions, the movement of the rocker and arm being limited in both directions by the stationary studs 757 and 760.

A link 761 is pivoted on the stud 755 and to the upper end of a lever 762 pivoted on the rod 272. An arm 763 is pivoted on the rod 272 and is connected to the lever 762 by a yoke 164, Fig. 46. The upper end of the arm 763 is flattened, and lies in a position where it may be swung under a stud 765, Figs. 39 and 43, on a plate 766, pivoted, on the stud 767, to the lever 190.

Figure 43:
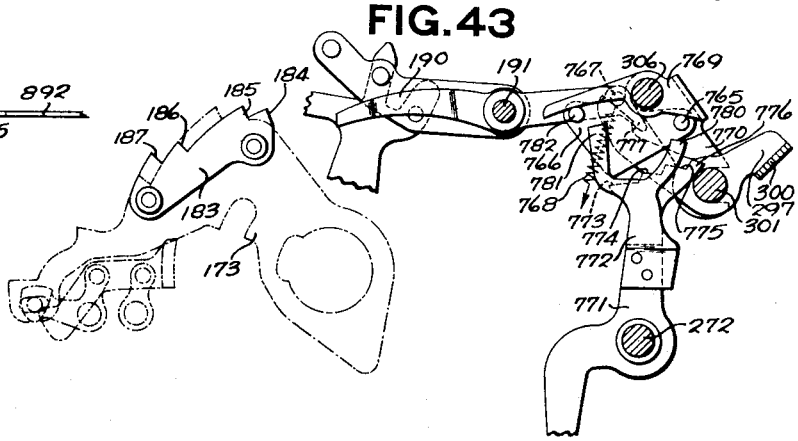
Fig. 43 is a detail view of certain parts of the totalizer selecting mechanism shown in Fig. 39.

The plate 766 is tensioned downward by a spring 768, but is normally held in its elevated position, shown in Fig. 43, by the lever 297 bearing against the stud 767, and is held in its proper pivoted position by the studs 765 and 782 striking the bottom edge of a yoked bracket 769, Figs. 43 and 46, supported on the shaft 306, and held stationary by its arm 770 embracing the rod 301.

A layer 771 is pivoted on the rod 272, and has an arm 772 rigidly secured to it. The upper end of the lever 771 is widened and has four steps 773, 774, 775, and 776, all lying in a position to stop the movement of the lever 190 by contact with its nose 777, when the levers 771 and 190 are swung about their pivots. The arm 772 has two prongs 780 and 781, the prong 780 lying under the stud 765 when the lever 771 is in home position as shown in Fig. 43, and the prong 781 lying under a stud 782 on the plate 766, when the lever 771 is rotated one step counter-clockwise. A link 783, Figs. 6 and 39, is pivoted to the lower end of the lever 771, and to an arm 784 secured to the shaft 522.

During adding and subtracting operations, when the latch 304, Fig. 39, is lifted, and the bell-cranks 296 and 297 are rotated, the spring 768, Fig. 43, pulls the plate 766 and the rear end of the lever 190 downward. The stud 765 strikes the prong 780, causing the plate 766 to pivot on the stud 767, the stud 782 dropping along the side of the prong 781. This downward movement is arrested by the nose 777 resting on the step 773, at which time the front end of the lever 190 is entirely out of the path of the plate 183. This allows the lever 188, Fig. 39, to cooperate with a shoulder on the arm 173 to determine in what position the arm is to stop, as explained under heading 8.

When either of the total keys 494, or 495, Fig. 5, for the "balance" totalizer is depressed, the locking plate 503, Fig. 6, is moved downward one step, moving the link 783 one step to the right, and swinging the arm 772 and the upper end of lever 771 one step to the left. This places the prong 781 under the stud 782, and moves the prong 780 from under the stud 765. If the "balance" totalizer is not overdrawn, the arm 763 lies in the position shown in Figs. 39 and 44, out of the path of the stud 765, Fig. 43, and upon the subsequent downward movement of the plate 766, the stud 765 is allowed to move down beside the prong 780, out of the path of the arm 763 during 774, the stud 782 being held elevated by the prong 781 is moved under stud 782 by depression of lies in the path of the shoulder 187 on the plate 183, and, upon actuation of the arm 173, arrests its movement in the "7" position, as explained under heading 3, causing a shifting of the "balance" totalizer to its adding position, as explained under heading 5.

If, during a subtracting operation, the "balance" totalizer is overdrawn, the rocker 382, Fig. 52, is moved to its position counter-clockwise of that shown in the figure, as explained under heading 11, and the arm 753, Fig. 44, is moved to a similar position, resting against the stud 757, causing the arm 763 to move under the stud 765, Figs. 39 and 43, which is held elevated, by the prong 780 until the nose 777 rests on the step subtract operations as above described. If either of the total keys 494 or 495 is depressed for a subsequent operation with the totalizer in this state, the downward movement of the plate 766 is arrested by the prong 781 and arm 763. The prong 781 during this movement. The lever 190 now either of these total keys as above described. Then when the stud 782 strikes prong 781 and stud 765 strikes arm 763 the lever 190 is stopped in the path of the shoulder 184. The movement of the arm 173 is now arrested in the "2" position, causing a shifting of the "balance" totalizer to its subtracting side, as explained under heading 5.

The steps 775 and 776 are used when the total keys for the second and third transaction banks are depressed and stop the arm 173 in its "6" and "3" positions, respectively, for purposes of column selection in the printing mechanism. During these operations the balance totalizer is not engaged with the actuators, although it is shifted by cam 200 (Fig. 51) into either a neutral or a subtract position.

Figures 15, 16:
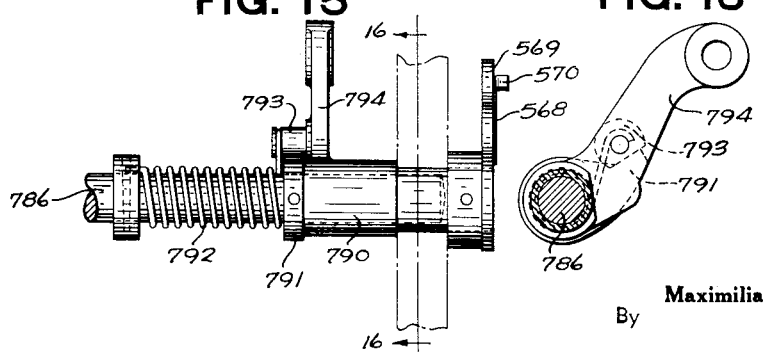
Fig. 15 is a detail front elevation of a shaft shown in Fig. 14.
Fig. 16 is a sectional side view taken on the line 16—16 of Fig. 15.

During total reading and resetting operations involving the "balance" totalizer, since no transaction key is depressed, the zero stop pawl 195, Fig. 39, must be withdrawn by other means, to permit the actuation of the arm 173. For this purpose a tappet 785 is pinned to the zero stop throw-out shaft 786, and normally rests on a tail 787 of the pawl 195. The shaft 786, Figs. 15 and 16, is journalled in the sleeve 790, in turn journalled in the machine frame. A tappet 791, pinned to the shaft 786, is tensioned, by a spring 792, against a stud 793 projecting from an arm 794 formed on the sleeve 790. The arm 569 is secured on the other end of the sleeve. By this arrangement, a rotation may be imparted to the shaft either by movement of the arm 569, or by a clockwise rotation, Fig. 16, of the shaft 786 while the arm 569 is held stationary When a total key is depressed, the machine release mechanism pulls the link 701, Fig. 13, to the right, as explained under heading 25, swinging the arm 569 a short distance clockwise. This rotates the sleeve 790, Figs. 15 and 16, and the shaft 786, correspondingly, causing the tappet 785 to press down on the tail 787 and withdraw the pawl 195 from the path of the arm 173.

29. Totalizer selection for total reading and resetting operations—lateral shifting of totalizers for second and third transaction banks When it is desired to read or reset the individual total registered by any key in the second and third transaction banks, the desired transaction key and one of the corresponding total keys are depressed. The depression of the total key releases the machine, causing the differential mechanism in the transaction bank of the depressed key to shift the totalizer line under its control to the position determined by the depressed key, in the same manner as described under headings Nos. 3 and 5.

30. Control of amount key banks during total reading and resetting operations Two arms 795, one of which is shown in Fig. 55, are pinned to the shaft 786, at each end of the amount key banks, and have a rod 796 extending between them and in front of the interlock pawl 797 for each amount key bank. When the rod 796 is in its home position shown in Fig. 55, the amount keys may be depressed, since the lower end of the pawl 797, which received a positive movement whenever a key is depressed, will move under the rod 796 without obstruction, but when a clockwise movement is given the arm 795, the rod 796 moves in the path of the lower end of the pawl 797, preventing its movement and the consequent depression of an amount key. This arrangement of parts is well known in the art, as shown by the United States Patent No. 1,230,864, to W. A. Chryst, but its operation is changed, as will now be described. As explained under headings 22 and 25, when a total key is depressed, the slide 695, Fig. 13, is moved to the left, placing the stud 703 under the finger 704, so that movement of finger 704 effects a movement of the slide 695, the bell-crank 675, the link 701, the arm 569, and the shaft 786, Fig. 55, before the machine is released for operation. If, before the total key is depressed, it is attempted to mismanipulate the machine by depressing an amount key, the lower end of the pawl 797 will extend under the rod 796, preventing lowering of rod 796 and the rotation of the shaft 425, Fig. 13, and the consequent release of the machine as explained hereinafter. It would then be necessary to restore the release mechanism by manipulation of the handle 485, as explained under headings 17 and 25.

When the machine is properly released by a total key, the first movement of the bell-crank 675, explained under heading No. 25, which is just sufficient to move the roller 682 into the slot 672, is also just sufficient to lower the rod 796, Fig. 55, into contact with a tail 800 on the zero stop pawl 103 of each amount bank. In this position the rod lies in front of the lower end of the pawl 797, and prevents the depression of an amount key after the machine is released. The one-fourth of a rotation given the gear 647, Fig. 13, near the end of the first cycle, rotates the shaft 786 an additional distance, causing the rod 796 to press downward on the tail 800, Fig. 55, withdrawing the pawl 103 in each amount bank. This withdrawal takes place, however, after the differential mechanism has completed its upward movement for the first cycle, the latches 115 all having been disengaged in the zero position. The rod 796 is held in this position until the latter part of the second cycle, allowing the amount differential mechanisms to travel upward unmolested by the pawls 103 during the second cycle. The last two movements given the bell-crank 675, Fig. 13, return the arms 795, Fig. 55, and rod 796 to their home positions shown in this figure, as explained under heading 25.

31. Totalizer engaging mechanism for total reading and resetting operations

A bell-crank 801, Fig. 14, is pivoted on a stationary stud 802, and has cam slots 803 and 804 at its upper and lower ends. An arm 805 is likewise pivoted on the stud 802, and has a straight slot 806 in its upper end, and a roller 807 extending in the cam slot 810, in the total plate 630. A link 811 is pivoted to the arm 794, and has a headed stud 812 on its other end, extending through the slots 803 and 806. A roller 813 is mounted on the bell-crank 801, and extends into the slot 814 in the link 221. Two notches 815 and 816, in the link 221 cooperate with two studs 817 and 820, in the spider 222, to oscillate the spider and engage and disengage whatever totalizer line has been connected therewith. An aliner 821 is pivoted on a stationary stud 822, and has a roller 823 extending in the slot 804, and a stud 824 cooperating with notches 825 and 826 in the spider 222.

When one of the total reading keys 492, 493, 494, Fig. 2, is depressed, the arm 569 is immediately swung clockwise, as explained under heading 25, lowering the arm 794 and the link 811 until the stud 812 rests in the lower end of the straight portion of the slot 803. Immediately thereafter, presuming the previous operation to be one of adding or subtracting, the cam 217 actuates the bell-crank 220, moving the link 221 to the left and the spider 222 counter-clockwise to the position shown in Fig. 14, disengaging any totalizer lines engaged during such previous operation. The total plate 630 then moves a distance clockwise, as explained under heading 23. Shortly thereafter, the cam 252 pulls the link 221 to the right, rotating the spider clockwise and engaging whatever totalizer was selected by the mechanism described under heading 27. The arm 569 then receives its second clockwise movement, pulling the stud 812 to the bottom of slots 803 and 806, and causing the bell-crank 801 to swing clockwise to its middle position. Through its connection with the roller 813, the link 221 is lowered to its middle position, where it is disconnected from the spider 222. This movement of the bell-crank 801 also causes the aliner 821 to rotate counter-clockwise, moving the stud 824 into the notch 826 now in line therewith, to hold the spider 222 stationary while it is disengaged from the link 221. At the beginning of the second cycle, the cam 217 moves the link 221 to the left, while disengaged from the spider 222, and then returns it by a movement to the right, completing an idle operation. The arm 569 then receives its first counter-clockwise movement, swinging the bell-crank 801 counter-clockwise, re-engaging the notch 815 with the stud 817, and disengaging the stud 824 from the notch 826. The arm then receives its second counterclockwise movement, restoring the stud 812 to the top of the slots 803 and 806, completing the operation.

When one of the total resetting keys 495, 496, 497, is depressed, the arm 569 is immediately swung clockwise, lowering the stud 812 to the lower end of the straight portion of the slot 803. The cam 217 then moves the link 221 to the left, to the position shown in Fig. 14, returning any totalizers engaged during the previous operation. The operations thus far are identical with the reading operation just described. The total plate 630 is then rotated counter-clockwise, moving its slot 810 downward, and swinging the arm 805, the link 811, and the bell-crank 801 to the right placing the latter in its middle position. This lowers the link 221 to its middle position and engages the stud 824 in the notch 825. The cam 252 then pulls the link 221 to the right, on an idle movement. The arm 569 then receives its second clockwise movement, pulling the stud to the bottom of slots 803 and 806, and thereby lowering the link 221 to its lower position, where the notch 816 engages the stud 820, and disengages the stud 824 from the notch 825. At the beginning of the second cycle, the cam 217 moves the link 221 to the left, rotating the spider 222 clockwise and engaging the selected totalizer. After an interval, the cam 252 pulls the link to the right, disengaging the totalizer. The arm 569 then receives its two counter-clockwise movements, raising the stud to the top of the slots 803 and 806, returning the bell-crank 801 and link 221 to their middle positions, and engaging the stud 824 with the notch 825.

An adding or subtracting operation performed after a resetting operation is conducted a little differently during the first part of the operation. Inasmuch as the totalizer line engaged during the resetting operation is disengaged, the link 221 makes an idle movement to the left at the beginning of the operation. The total plate 630 then moves clockwise to the position shown in Fig. 14, and by the cam slot 810, moves the link 811, the arm 805, the bell-crank 801, the link 221, and the aliner 821 to the position shown in the figure, where the link 221 is coupled with the spider 222 to engage the totalizers selected for the adding or subtracting operation.

32. Selection of reset shaft and operation of reset spider

Figure 56:
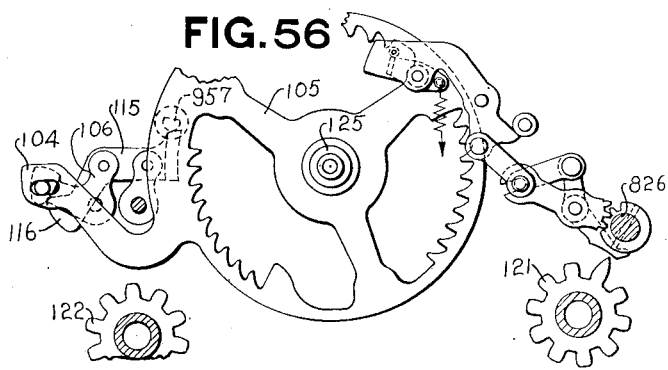
Fig. 56 is a detail view of the resetting mechanism shown in Fig. 55.

The particular reset shaft 826, Fig. 56, to be employed during a reading or resetting operation is selected by the slots 827, 830 and 831, Fig. 18, when the total plate 630 is positioned during such an operation, in the same manner as shown and described in the United States Patent No. 1,619,796, to B. M. Shipley. The mechanisms for rotating the shaft 826 and for arresting the movement of the reset spider 105 when its corresponding totalizer wheel is returned to zero by the differential rack 114, Fig. 55, are likewise shown and described in the Shipley patent.

33. Total reading operation

Assuming it is desired to read the total amount of certified checks registered by the machine, the "certified check" key 135, Fig. 2, is depressed, withdrawing the zero stop pawl 832, Fig. 41, in the second transaction bank, as explained under heading 1. The total key 493, Fig. 2, is then depressed, releasing the machine for operation as explained under headings 22 and 25, and moving the stud 812, Fig. 14, to the lower end of the straight portion of the slot 803, as explained under heading 31. The machine then starts its operation, first disengaging any totalizers engaged during the previous operation, as explained under heading 31. Next, the aliners 131, Figs. 52, and 632, Fig. 17, are rocked out, and part of the totalizer line selecting mechanism is actuated by the cam 223, as explained under headings 3, 23 and 27. The differential mechanism for the second transaction bank then moves up, shifting its totalizer line to the position determined by the depressed key 135, as explained under headings 3 and 5, and at the same time the total plate 630, Fig. 14, is positioned in accordance with the depressed total key 493, as explained under heading 23. The movement of the plate selects the proper totalizer line for engagement and the proper reset shaft for rotation, as explained under headings 27 and 32. The aliners 131 and 632 are then moved into engagement, holding the totalizer shifting mechanism and the total plate in their moved positions. The selected totalizer is then engaged and the reset shaft 826, Fig. 56, is rocked to operative position as explained under headings 31 and 32. The cam 672, Fig. 13, then moves the slide 464, Fig. 8, out of operative relation with the lever 456, and lowers the arm 794, Fig. 14, disengaging the link 221 from the spider 222, as explained under headings 25 and 31, and withdrawing the zero stop pawls in the amount key banks, as explained under heading 30. At the same time, the transaction differential mechanism returns to its lower position, completing its operative movement. The lever 456 then executes an idle movement, as explained under heading 25, completing the first cycle of operation.

At the beginning of the second cycle, the link 221 is given an idle movement to the left, Fig. 14, as explained under heading 31. This is followed by the aliners 131 and 632 again moving out, the latter performing no function during this cycle, as explained under headings 3 and 23. The amount differential racks 114, Fig. 55, then rotate clockwise, returning the totalizer to zero, as explained under heading 32, and at the same time, the transaction differential mechanism moves upon its idle operation. The aliner 131 now rocks in, retaining the new setting of the segments 127, Fig. 55, for both the amount and transaction banks, and at the same time the aliner 632 returns from its idle operation. The link 221, Fig. 14, is next moved to the right, and this is followed by the cam 672, Fig. 13, engaging the link 221 with the spider 222, and moving the slide 464 into operative relation with the lever 456. At the same time, the transaction differential completes its idle operation, and the differential racks 114, Fig. 55, rotate counter-clockwise, while the totalizer is still engaged, returning the former setting to the wheels thereof. The lever 456, Fig. 8, then stops the machine and restores certain of the parts to their home positions, as explained under headings 14, 15, 16 and 25, completing the operation.

34. Total resetting operation

If it is desired to reset the balance totalizer, the total key 495, Fig. 2, is depressed, releasing the machine for operation, as explained under headings 22 and 25, withdrawing the pawl 195, Fig. 39, as explained under heading 28, and moving the stud 812, Fig. 14, to the lower end of the straight portion of the slot 803, as explained under heading 31. The machine then starts its operation, first disengaging any totalizers engaged during the previous operation, as explained under heading 31. Next, the aliners 131, Fig. 52, and 632, Fig. 17, are rocked out, and part of the totalizer line selecting mechanism is actuated by the cam 223, as explained under headings 3, 23, and 27. Assuming that the balance totalizer is overdrawn, the differential for the first transaction bank will be stopped in the "2" position, shifting the balance totalizer to its subtracting side, as explained under heading 28. At the same time, the total plate 639, Fig. 14, is positioned in accordance with the depressed total key 495, as explained under heading 23. The movement of the plate selects the proper totalizer line for engagement and the proper reset shaft for rotation, as explained under headings 27 and 32, and also disengages the link 221 from the spider 222, as explained under heading 31. The aliners 131 and 632 are then moved into engagement, holding the totalizer shifting mechanism and the total plate in their moved positions, the link 221 being then moved idly to the right. The cam 672, Fig. 13, then moves the slide 464, Fig. 8, out of cooperation with the stud 460 on lever 456, withdraws the zero stop pawls 103, Fig. 55, in the amount key banks and engages the lever 221, Fig. 14, on its lower stud, as explained under headings 25, 30, and 31. At the same time, the differential for the first transaction bank returns to home position. The lever 456, Fig. 8, then executes an idle movement, as explained under heading 25, completing the first cycle.

At the beginning of the second cycle, the balance totalizer is engaged by movement of the link 221, Fig. 14, to the left, the selected reset shaft being rocked into operative position at the same time. The aliner 131, Fig. 52, is then moved out and the cam 223, Fig. 17, moves the aliner 632 up, on its idle movement. The racks 114, Fig. 55, then rotate clockwise, returning the totalizer to zero, as explained under heading 32, and at the same time, the differential in the first transaction bank moves up on its idle operation. The aliner 131, Fig. 52, now rocks in, retaining the new setting of the segments 127, Fig. 55, for both the amount and transaction banks, and at the same time, the aliner 632, Fig. 17, returns from its idle operation. The link 221, Fig. 14, is now moved to the right, disengaging the totalizer from the amount racks 114, Fig. 55. The cam 672, Fig. 13, then disengages the link 221, Fig. 17, from the spider 22 and returns the slide 460, Fig. 8, into operative relation with the lever 456. At the same time the transaction differential returns from its idle operation and the amount racks 114, return home, disengaged from the totalizer, and leaving it in its zero position. The lever 456, Fig. 8, then completes the operation by stopping the machine and returning certain of the parts to their home positions as explained under headings 14, 15, 16 and 25.

35. Adding or subtracting operation after a total resetting operation

Since the totalizer engaged during a resetting operation is disengaged at the end, unlike adding, subtracting and reading operations, the link 221, Fig. 14, is moved idly to the left at the beginning of an adding or subtracting operation which follows a resetting operation. The aliners 131 and 632, Figs. 52 and 17, then move out, followed by the amount and transaction differentials beginning their upward movement. At this time, the total plate 639, Fig. 14, is moved to its middle position, causing the bell crank 801 to be moved by the cam slot 810, and moving the link 221 into engagement with the stud 817 on the spider 222. The link 221 is then pulled to the right, engaging the selected totalizer lines, and the machine proceeds as in an ordinary adding or subtracting operation.

36. Visual indication of negative total

Figure 40:
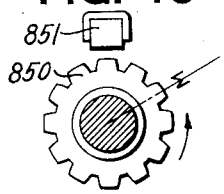
Fig. 40 is a front elevation of the printing element shown in Fig. 39, used for indicating an overdraft, showing its position in reference to the hammer.

The segment 833, Fig. 39, set by the differential for the first transaction bank, moves a rack 834, Fig. 60, through the pinions 835 and 836, and the shaft 837. The rack 834 rotates a gear 840 and a plate 841, the plate having a high spot 842 adapted to lie under a roller 843 when the differential in the first transaction bank stops in its "2" position. The roller 843 is mounted on an arm 844 pivoted on a stationary stud 845, and is adapted to cooperate with a nose 846 on a bell crank 847, whenever the roller 843 is cammed upward by the high spot 842. A printing wheel 850, Figs. 39 and 40, situated to the left of the highest order numeral printing wheel, is controlled by movement of the rack 834, and carries an "M" on its periphery. A movement of the first transaction differential to the "2" position causes the "M" on this wheel to be situated under the printing hammer 851, as will be understood from Fig. 40.

The zero elimination mechanism and its crippling means shown in Figs. 60 and 61 is fully shown and described in the United States Patent No. 1,619,796 to B. M. Shipley, and will therefore not be described here.

When a total reading or resetting operation is initiated while the balance totalizer is overdrawn, the arm 173, Fig. 39, is stopped in the "2" position, as explained under heading 28. This moves the printing wheel 850 to its "2" position where it will print the "M", signifying that the number printed is a negative one, an illustration of which is given in Fig. 64. The negative state of this number is further brought to the operator's attention by the presence of zeros to the left of the highest significant figure printed. This is caused by the high spot 842 raising the arm 844 to the position where it holds the bell crank 847 in elevated position. This holds up the remaining bell cranks 852, Fig. 61, for all orders to the left of the one having the highest significant figure, preventing the printing wheels in these orders from being moved to their blank position, as described in the United States Patent No. 1,619,796.

REPEATING

37. Automatic selection of totalizer to receive repeated amount

Figure 42:
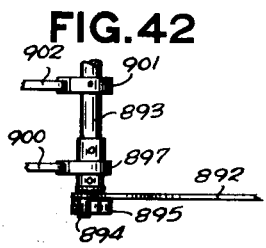
Fig. 42 is a detail plan view of parts shown in Fig. 41.

A repeat key 853, Figs. 20 and 37, is pivoted on a stationary stud 854 and has a stud 855 lying in a notch 856 in a link 857. A lever 860 is pivoted on a stationary stud 861 and has a slot 862 in which rides a stud 863, secured to the link 857 and extending through a slot 864, Fig. 34, in the support 865. A reversible arm 866, Fig. 37, also is pivoted on the stud 861, and has a stud 867 lying over a tail of the lever 860 and tensioned downward by a spring 870. This tensions the lever 860 clockwise, and holds the link 857 in engagement with the key 853. The link 857 is pivoted on a stud 871 secured to a bell crank 872 also pivoted on the stud 854. A link 873 is pivoted to the bell crank 872 and is also pivoted to another link 874 by a long stud 875. An arm 876, pinned to the shaft 306, lies between the links 873 and 874, and has a notch 877 lying opposite the stud 875. The link 874 is pivoted at its lower end to a yoked lever 880, Fig. 20, pivoted on a shaft 881, and having a rocker 882, Figs. 20 and 41, pivoted to its arm 883 by means of stud 884. The rocker 882 pivots on its stud 884 and is restricted in this movement by its stud 885 lying in the cut out portion 886 of the arm 883. A front flange 887 and a rear flange 890 extend from the rocker 882 (Fig. 41), and are adapted to cooperate with the widened end of the lower arm 891 of the lever 762. A pitman 892 is pivoted to the stud 885 on the rocker 882, and is bifurcated at its other end to slide on a shaft 893. A stud 894 on the upper prong of the bifurcation lies in front of a tappet 895 pinned to the shaft 893, and a stud 896 on the lower prong of the bifurcation lies behind a bell crank 897, pivoted on the shaft 893, and having an arm lying under the tail 900 of the zero stop pawl 832 in the second transaction bank. Another tappet 901, Figs. 42 and 44, also is pinned to the shaft 893, and lies under the tail 902 of the zero stop pawl 142 in the third transaction bank.

When it is desired to enter into one of the totalizers manually selected under control of keys 136 and 141, Fig. 2, the amount entered during the previous operation, the proper totalizer will be automatically selected, in accordance with the algebraic state of the number, upon depression of the repeat key 853, by the mechanism just described. When the key is depressed, the link 857 is pulled to the left, rotating counter-clockwise the bell crank 872 and moving the link 873 to the right until the stud 875 lies within the notch 877. Subsequent upward movement of the arm 876 will then lift the link 874 and the arm 883, and will cause the stud 885 and the pitman 892 to move to the right or left. If the balance totalizer is not overdrawn, the arm 753, Fig. 44, will be lying in the position shown, as explained under heading 28, and the arm 891, Fig. 41, will be in its forward position. The upward movement of the arm 883 will then cause the flange 887 to strike the widened end of the arm 891 and swing the rocker 882 counter-clockwise. This moves the pitman 892 forward, lifting the bell crank 897 and the tail 900, and withdrawing the zero stop pawl 832. The differential for the second transaction bank is now free to swing upward until it is stopped in its "9" position by a stationary stud, as explained under heading 3. The amount will then be registered in the "new balance+" totalizer.

If the balance totalizer is overdrawn when the operation takes place, the arm 753 will be in its forward position, resting against the stud 757, and the arm 891 will be in its rear position. The upward movement of the arm 883 will then cause the flange 890 to strike the widened end of the arm 891 and swing the rocker 882 clockwise. This moves the pitman 892 to the rear, swinging the tappets 895 and 901 clockwise, and raising the tail 902 to withdraw the zero stop pawl 142. The differential for the third transaction bank is now free to swing upward until it is stopped in its "9" position, as in the former case. The amount will then be registered in the "new balance—" totalizer.

38. *Manual selection of totalizer to receive repeated amount*

When it is desired to use a manual, rather than an automatic selection of the totalizer to receive the repeated amount, it is only necessary to swing the arm 866, Fig. 37, counter-clockwise about the stud 861, until the stud 867 again rests on the lever 860. The spring 870 will now depress the lower end of the lever 860, moving the stud 863 downward into the vertical portion of the slot 864, Fig. 34, and disconnecting the notch 856, Fig. 37, from the stud 855. The lowering of the link 857 locks the bell crank 872 and the link 873 in the position shown in the figure, where the stud 875 is disconnected from the arm 876, and allows the depression of the repeat key 853 as usual. Now, the link 874 will not be raised by the arm 876 during the operation, and the rocker 882 and its associated parts will not function to remove one of the zero stop pawls 832, 142. It is now necessary to depress one of the keys 135, 136, 140, 141, to select the proper totalizer, and, as will later appear, to release the machine for operation.

39. *Machine release mechanism for repeating operations*

When using the automatic totalizer selection, it is only necessary to depress the repeat key 853 to release the machine for a repeat operation. This swings the bell crank 872, Fig. 37, counter-clockwise, causing its tooth 904 to rotate the rock arm 572 by striking its stud 905. This lowers the nose 574 below the shoulder 575 and releases the machine in the same manner as explained under heading 22.

When the manual selection of the totalizer is used, depression of the transaction key 135, 136, 140, or 141 removes the block 411, Fig. 31, from the stud 413, as explained under heading 12, and upon the subsequent depression of the repeat key 853, Fig. 34, its roller 906 mounted on stud 855 lowers the lever 416 the same as if the motor bar 400 had been depressed, removing the block 426, Figs. 35 and 36, from the stud 413, as also described under heading 12. The removal of these two blocks 411 and 426 allows the shaft 425 to rotate and release the machine in the manner explained under the aforementioned heading.

The release mechanism is restored as in other operations.

40. *Interlocks with the repeat key*

An arcuate surface 907, Fig. 37, and a cut out portion 910 are provided on the bell crank 872 to cooperate with a stud 911 on lever 510, to act as an interlock between the repeat and total keys. If the repeat key is depressed first, the surface 907 moves in front of the stud 911 and prevents the subsequent depression of a total key, the movement of the lever 510 to the left being necessary to the depression of the key, as can be seen from heading 21. If a total key is depressed first, the stud 911 moves in the cut out portion 910, and prevents counter-clockwise movement of the bell crank 872, and depression of the repeat key.

A bifurcated arm 912, Fig. 20, connects the repeat key with the bell crank 685, pivoted on the rod 577. When the repeat key is depressed, the lower arm of the bell crank 685 swings the link 683 to the left, raising the stud 690, rotating the bell crank 686, and moving the slide 695, Fig. 13, to the left. When the repeat key is fully depressed, the machine releases, the finger 704 pressing the slide 695 downward and rotating the shaft 786, Fig. 55, to prevent the subsequent depression of an amount key, as explained under heading 30.

If an amount key is depressed first, and the repeat key then depressed, the rotation of shaft 425 and the attendant releasing of the machine is prevented in the manner also described under heading 30.

It will be noted that although the slide 695, bell crank 675, link 701, bell crank 477, arm 569 and shaft 786 are given their first step of movement in repeating operations the same as in total reading and resetting operations, they do not receive their second step of movement by the cam 672, since the pinions 655, 656, Fig. 12, do not connect the gear 647, Fig. 13, with the gear 666, Fig. 12, for rotation during the repeating operations. This first step of movement was given only for the purpose of interlocking the repeat and amount keys, and affects the operation in no other way.

A link 914, Fig. 20, is pivoted to the bell crank 685 and to an arm 915 pinned to the shaft 442. An arm 916 also is pinned to the shaft 442, and cooperates with a stud 917 on the latch 304, Figs. 20 and 46.

When the repeat key is depressed, the link 914 is moved to the left, swinging the arms 915 and 916 to the left, the lower end of arm 916 moving over and past the stud 917. Thus, when the machine is released for any operation other than a repeat operation, the consequent swinging of the latch 304 counter-clockwise, raises the stud 917 in front of the arm 916 and prevents a subsequent depression of the repeat key.

When the repeat key is depressed on an ordinary repeating operation, the arm 916 passes over the stud 917, the latter rising behind the arm when the latch 304 is moved at the end of the depression. This retains the arm 916 and likewise the repeat key in their moved positions until the latch 304 is returned at the end of the operation.

41. Control of amount differentials during repeating operations

Two arms 920 and 921, Figs. 52, 55 and 59, are pinned to the shaft 442 and are connected, by pin-and-slot connections, to the cam levers 922 and 923 pivoted on the rod 301. Two brackets 924 and 925 are pivoted on the rod 272, the bracket 925 having a bar 926 secured to the bracket at its two arms, and offset from the bracket. An arm 927 on the bracket 924 carries a roller 930 operating in the cam slot 931 in the lever 922 and the bar 926 carries a roller 932 operating in a cam slot 933 in the lever 923. Two guides 934 and 935, Figs. 52 to 55 and 59, are pivoted on studs 936 and 937 on the brackets 924 and 925, and are slidably mounted on the shaft 306. Two arms 940 and 941 are pinned to the shaft 306 and have slotted ends to receive studs 942 and 943 on the upper arms of the guides 934 and 935. A series of aliners 944, one for each amount bank, are rigidly mounted on two rods 945 and 946, the rod 945 being pivoted, at its ends, in the brackets 924 and 925, and the rod 946 being slidably held in slots 947 and 950 in the guides 934 and 935. The amount differentials each have a segment 951, Figs. 27 and 55, pivoted on the rod 125, and each segment has a nose 952, a shoulder 953, and a block 954. A lever 955 pivoted on a stud 956 on each differential rack 114, is spring pressed clockwise to the position shown, and cooperates with the blocks 954. A stud 957 is secured to each reset spider 105 and cooperates with the noses 952.

A link 960, Figs. 57 and 59, is pivoted to the lever 923 and to one end of a cam slide 961. The other end of the cam slide is slidably mounted on the shaft 786, and has a cam surface 962 cooperating with a roller 963 on an arm 964 pinned to the shaft 786. A slot 965 in the cam slide 961 is adapted to be lowered upon a stud 966 on a lever 967 pivoted on the rod 272. A link 970 connects the lever 967 to an actuator 971, pivoted on the rod 972 and controlled, in its movements, by two cams 973 and 974 secured to the drive shaft 107.

Considering an adding operation, the shaft 306, Figs. 52, 55 and 59, is rocked clockwise, as explained under heading 1, raising the arms 940 and 941, the upper ends of the guides 934 and 935, and the forward ends of the aliners 944 sufficient to disengage the aliners from the segments 951, Figs. 27 and 55. Considering now only one of the differentials, the rack 114 and spider 105 begin to rotate, the lever 955 strikes the block 954 and the stud 957 is a step closer to the nose 952, when the mechanism reaches its "0" position. Assuming the differential is to travel to its "5" position, the lever 955 will be swung counter-clockwise against its spring tension, upon further movement of the rack 114, due to its shoulder 953 being held by the inertia of the beam 124 and its associated parts 126, 127, 130, etc. The stud 957 is now almost against the nose 952, and the beam 124 is against the under side of the rod 125. Further movement of the rack 114 causes the beam 124 to travel around the rod 125 as a center, lowering its rear end, and carrying with it its associated parts, the segment 951 being carried around by the lever 955. When the spider 105 reaches its "5" position, it is arrested at once, as explained under heading 1, the rack 114 and segment continuing until the latch 115 is entirely disengaged. This relative movement between the spider 105 and the rack 114 leaves a gap between the stud 957 and the nose 952, in their final upward positions. The shaft 306 is now rotated to its former position, lowering the aliner 944 in one of the notches in the segment 951 to hold it in its adjusted position. The differential then returns home without the segment 951.

Depression of the repeat key swings the arm 915, Fig. 20, to the left, as explained under the previous heading, and likewise swings arms 920 and 921, Figs. 52 and 55, to the left. This lowers the cam slots 931, 933, and swings the rollers 930, 932 and the brackets 924, 925 to the left, moving the guides 934, 935 upward and to the left, and disengaging the studs 942, 943 from the arms 940, 941. The resultant movement of the brackets 924, 925 and the guides 934, 935 moves the aliners 944 to the left and slightly upward, moving the segments 951 a short distance to the left, the aliners still remaining engaged with the segments. This movement of the segments compensates for the relative movement made between the spider 105 and the rack 114, when the differential reached its highest position in the adding example just given.

The counter-clockwise movement of the lever 923, Fig. 57, also lowered the slide 961 over the stud 966, so that when the machine starts, the link 970 is pulled down and the link 961 and cam 962 are pulled to the right. This supplements the preliminary rotation of shaft 786, explained under heading 40, sufficiently to withdraw the zero stop pawls 103, Fig. 55, in the amount banks.

The differentials now move up for the repeating operation and the arms 940, 941 swing idly upward. Referring to the differential previously moved to the "5" position, when the spider 105, Fig. 27, reaches its "5" position, the stud 957 strikes the nose 952, arresting the movement of the spider and lever 106, Fig. 55, and disengaging the latch 115. The differential and slide 961 then return home, the number set up on the differential being entered in the selected totalizer as in other operations, and the shaft returning home by aid of the spring 192, Fig. 15, and by the restoring mechanism. At the end of the operation the repeat key is released, allowing the alining mechanism to return home.

It is to be understood that altho this repeating movement is shown after an adding operation, the mechanism will function the same after any other operation performed by the machine.

42. Repeating operation using automatic selection of the totalizer

Assuming the balance totalizer has just been reset, the number taken therefrom being negative, and it is desired to enter this number in a separate totalizer intended to accumulate only negative amounts, it is necessary to depress only the repeat key, the number being automatically entered in the "new balance—" totalizer ordinarily controlled by key 141 in the third transaction bank.

While the repeat key 853, Fig. 37, is being depressed, the segments 951, Fig. 27, are moved forward, the studs 942, 943, Figs. 52 and 55, are disengaged from the arms 940, 941, and the slide 961, Fig. 57, is engaged with stud 966, as explained under heading 41. Also the link 857, Fig. 37, is moved to the left, releasing the machine, as explained under heading 39, and moving the stud 875 into operative relation with the arm 876, as explained under heading 37. The movement of these parts also operates the interlocks to prevent a mismanipulation of the machine as explained under heading 40. As soon as the machine starts, the balance totalizer, engaged during the previous operation, is disengaged from the amount racks 114, Fig. 55, and at the same time the zero stop pawls 103 for the amount banks are withdrawn, as explained under heading 41. The shaft 306, Fig. 20, is then rotated, pulling the link 874 upward and withdrawing the zero stop pawls 142, Fig. 52 in the third transaction bank, as explained under heading 37. The differential in the third transaction bank then moves up until stopped in the "9" position by the stud 196, Fig. 52, shifting the rear totalizer line to its proper position. At the same time the amount differentials move up until their studs 957, Fig. 27, strike the noses 952, as explained under heading 41. The shaft 306 is then returned to its former position and this is followed by the rear totalizer line moving into engagement with the amount racks 114. The differentials then move down to home position, entering the set up amount on the totalizer, and at the same time the slide 961 returns home. The machine release mechanism is then restored as in other operations.

43. Repeating operation using manual selection of the totalizer

For this kind of operation, the machine must first be adjusted in the manner explained under heading 38. To release the machine, the desired transaction key and the repeat key are depressed, as explained under heading 39. The usual repeating operation is performed except that the transaction differentials are controlled by the depressed transaction key instead of by the mechanism explained under heading 37, and which is now idle, as explained under heading 38.

44. In general printing

The printing mechanism, illustrated for use with the above described accounting machine, is adapted to prepare statement sheets, that is, statements of accounts, for presentation to the depositors of banks. A facsimile of such a statement sheet is illustrated in Fig. 64 of the drawings, and it will be noted by reference thereto, that printed data appear in a plurality of columns. In the first column, reading from left to right, is printed the date. To the left of the date column is a column of preprinted figures representing the line number. The amounts of the checks are printed in the two columns to the right of the date column. When entering or listing checks, the amount of the first check is printed on the selected line in the first column to the right of the date column. This column is hereinafter referred to as "column 2". If a number of checks are to be listed consequently, the amount of the second check is printed on the same line as the first check listed, but in the next column to the right, hereinafter referred to as "column 3". If a third check now is listed without an intervening operation, the amount of the latter check will be printed in column 2, directly below the entry of the first check. Thus the amounts of the checks may be automatically printed alternately in two or more columns, and the impressions spaced apart vertically by feeding the statement sheet after the impression is made in the righthand check column, that is, column 3.

The amounts of the deposits are printed in column 4 and the date is printed simultaneously in columns 1 and 6, when a total taking operation is made, but is printed in column 6 only when the balance is brought forward to a new sheet.

Normally the statement sheet is not inserted in the machine when an old balance is picked up. Consequently all of the platens are disabled under the control of a slip feeler.

45. Printing platens

There are six platens 970 (Figs. 66A and 67,) provided in the illustrative embodiment of the present invention. These platens are similar in construction and mode of operation to the platens disclosed in the patents to B. M. Shipley, Numbers 1,747,397 and 1,761,542, issued February 18, 1930, and June 3, 1930, respectively. Each of the platens 970 is supported in a formed head 971, carried on an arm 972, pivotally supported on a rod 973, extending between a printer back frame 974 (Figs. 66 and 66A) and a printer front frame 975.

The platens 970 are normally held in raised position by a series of bell cranks 976 pivoted on the rod 973 and having individual springs 977 attached to the downwardly extending arms thereof. The springs 977 press toes 978 on the bell cranks 976 against a retracting bail 979 pivotally supported on the rod 973. A stud 980 on each of the platen arms 972 rests on its associated bell crank 976, thus holding the platens in raised position.

A headed stud 981 (Fig. 67) on the lower end of a lever 982 supporting one end of the bail 979 normally is embraced by the vertical portion of an angular slot 983 in a link 984 having its left-hand end (Fig. 68) pivotally connected to a bell crank 985 supported on a rod 986 extending between the printer frames 974 and 975.

A tappet 987 on a disk 990 secured to a printer drive shaft 991 journaled in the printer frames, as said shaft 991 rotates counter-clockwise, strikes a roller 992 on the bell crank 985, rocking the bell crank clockwise, drawing the link 984 toward the left as viewed in Figs. 67 and 68. This leftward movement of the link 984 rotates the bail 979 and consequently the bell cranks 976 clockwise against the tension of the springs 977. As the bell crank 976 rotates clockwise the platen arms 972 rotate clockwise therewith, due to the weight of the platens and platen arms keeping the studs 980 in contact with the bell cranks 976.

When the tappet 987 (Fig. 68) passes the roller 992 and the end of the bell crank arm which carries the roller, the springs 977 rock their respective bell cranks 976 counter-clockwise, throwing the platens sharply into contact with the usual groups of type wheels 994 (Figs. 102 and 103) to take the impressions therefrom on the previously inserted statement sheet.

The counter-clockwise rotation of the bell cranks 976 (Fig. 67), by the springs 977, carries the bail 979 therewith, drawing the link 984 toward the right, and rocking the bell crank 985 (Fig. 68) also counter-clockwise until the arm of said bell crank strikes, and is arrested by, the periphery of the disk 990. This arrests the movement of the bell cranks 976 shortly before the platens 970 come into contact with their type wheel groups, the momentum of the platen arms being sufficient to accomplish the impression.

The link 984 (Fig. 67) may be raised over the stud 981 to render ineffective the retracting movement of said link and the bell crank 985 under the control of the slip feeler 993 (Fig. 65), only a fragment of which is illustrated herein. This feeler and the platen disabling device are substantially the same as analagous mechanism fully disclosed in the above mentioned Shipley patent, to which reference may be had for a complete description of the slip feeler mechanism.

The type wheels, indicated at 994 in Figs. 102 and 103, are mounted in groups on a rod 995. Impressions are made from these groups of type wheels on the statement sheets. Another type wheel line (not shown), just like the line illustrated herein, is provided, from which to take impressions on the usual audit strip 996 (Fig. 65) adapted to be unwound from a supply roll 997 and wound on a receiving roll 998. The audit strip operating mechanism and all of the devices appurtenant thereto are fully disclosed in the above mentioned patents to Shipley.

The type wheels 994 are arranged in groups as indicated in Fig. 102, from which groups several platens 970 take impressions in the several columns on the statement sheet. These groups of type wheels are identified as follows, from front to rear (Fig. 102). The date is printed from the front group. The second, third and fourth groups print in the check columns and the deposit column, respectively. The fifth group prints in the transaction column, the sixth group in the date column and the last group prints in the balance column on the statement sheet. The platens are correspondingly arranged with the exception of the balance platen, which is arranged simultaneously to print from the balance type wheels and the adjacent date type wheels.

46. Platen selection

Although the platen retracting bail 979 operates with each rotation of the printer drive shaft 991, only certain of the platens are selected for operation at each operation of the machine. This selection is accomplished under the control of the differential in the first transaction bank. The platen selecting mechanism is similar to that disclosed in the Shipley Patent No. 1,747,397; and includes a series of selector disks 997 (Figs. 66A and 67) fast on the shaft 837, which shaft, as set forth above, under heading No. 36, is rotated by the first transaction differential. The peripheries of the disks 997 are provided with recesses as at 998. Cooperating with each of the disks is a stud 999 carried on one arm of a lever 1000 pivoted on a shaft 1001 supported in the printer frames. A stud 1002 on the other arm of the lever 1000 is embraced by a slot in one arm of a bell crank 1003 pivotally supported on a rod 1004. The other arm of the bell crank 1003 cooperates with a stud 1005 projecting from the end of the platen arm 972.

The recesses 998 (Fig. 67) are so located about the peripheries of the disks 997 that when the shaft 837 is rotated to a certain point by the first transaction differential, only those bell cranks 1003 whose associated studs 999 enter recesses 998 will permit their associated platens to function. If an unbroken portion of the periphery of a disk 997 is positioned opposite a stud 999 the bell crank 1003 retains the platen associated therewith in normal position when the bail 979 functions to rock the bell crank 976 clockwise.

The levers 1000 are urged to rock clockwise by springs 1006 and, before the disk 997 and shaft 837 may rotate, it is essential that all of the levers 1000 rock counter-clockwise to raise the studs 999 out of the recesses 998. This counter-clockwise movement is effected by a bail 1007 carried by a plurality of arms 1010 (see also Fig. 66A) secured to the shaft 1001. A link 1012 connects an arm 1011, also secured to the shaft 1001, to one arm of a bell crank 1013 (Fig. 69) pivoted on the rod 986. The other arm of the bell crank 1013 carries an anti-friction roller 1014 projecting into a cam groove 1015 in a cam 1016 secured on the printer drive shaft 991.

The configuration of the cam groove 1015 is such that early in the operation it rocks the bell crank 1013 counter-clockwise thrusting the link 1012 toward the right (Figs. 67 and 69). The link 1012 rocks the arm 1011, shaft 1001 and arms 1010 counter-clockwise, carrying the bail 1007 therewith. The bail 1007 extending above all of the levers 1000 rocks said levers also counter-clockwise removing the studs 999 from the recesses in the disks 997, which movement, by the studs 1002 rocks the bell cranks 1003 clockwise, each bell crank 1003, coming into contact with the stud 1005 on its associated platen arm 972, rocks said arm slightly counter-clockwise to raise the stud 980 a slight distance above the bell crank 976.

The differentials are now operated, the differential associated with the first transaction bank rotating the shaft 837 and the disk 997 in a manner well known in the art, according to the setting of the controls described above. After the differentials are adjusted, the cam 1016 restores the bail 1007 to the position shown in Fig. 67, allowing the springs 1006 to rock clockwise such levers 1000 opposite whose studs 999 recesses 998 have been positioned.

47. Control platens on check listing operations

On check listing operations the second and third platens (Fig. 66A) are further controlled to print the amounts of the checks listed alternately in the second and third columns. This mechanism includes a platen selector shaft 1017 (Figs. 66A, 67 and 70 to 85 inclusive), journaled in the printer frame 975 and in a bracket 1018 secured to the frame 974 (Fig. 66A). Two fingers 1019 (Figs. 66A and 67), one associated with the lever 1000 for the second platen and one for the fifth platen, are secured to the shaft 1017. Also a finger 1020 associated with the lever 1000 for the third platen is secured to the shaft 1017.

The shaft 1017 and the fingers 1019 and 1020 have three positions, namely, a neutral position (Fig. 67), a position counter-clockwise from neutral, in which position the fingers 1019 are positioned beneath studs 1021 on the levers 1000 for the second and fifth platens, and a position clockwise from neutral, wherein the finger 1020 rests beneath the stud 1021 on the lever 1000 for the third platen. When the fingers 1019 or the finger 1020 rests beneath the studs 1021 of their respective levers 1000, said levers are restrained against clockwise movement by the springs 1006, thus holding the bell crank 1003 in position to retain the platen arm 972 in normal position, preventing operation of the particular platen.

The platen selector shaft 1017 is set at each operation of the machine under the control of the first transaction differential by one of two mechanisms. One of these mechanisms operates when the first transaction differential (Fig. 39) is stopped in the zero position, to set the shaft 1017 to one of its two effective positions. The other device for setting the shaft 1017 is operated when the first transaction differential stops at any position other than its "zero" position.

It is here noted that the first transaction differential is controlled to stop in its zero position by the keys 135 in the second transaction bank except the "total checks" keys, and that these keys are used when listing checks. It is also noted that it is only desired to set the control shaft 1017 to one of its effective positions when listing checks. On all other operations, selection of the platens resides in the disks 997.

The mechanism for rocking the shaft 1017 to one of its effective positions on check listing operations, includes a lever 1022 (Fig. 70) secured on the shaft 1017 and having a pair of pins 1023 and 1024 projecting laterally therefrom. A U-shaped, or pronged member 1025, pivotally carried on an arm 1026, swung on a rod 1027 and joined by a yoke 1030 to an arm 1031 also swung on the rod 1027 is adapted to cooperate with the pins 1023 and 1024 to rock the lever 1022 and consequently the shaft 1017. The pronged member 1025 straddles and is guided by a pair of pins 1032 projecting from a disk 1033 (Fig. 71) loosely mounted on the shaft 1017. The disk 1033 is adapted to be set to one of two positions, by mechanism to be described later, and a spring-operated aliner arm 1034 carries a stud 1035 cooperating with one of a pair of notches 1036 in the periphery of the disk 1033 yieldingly to hold said disk in its set position. The disk 1033 is set to one of its two positions at or near the end of each operation to control the platen selection at the next succeeding operation.

Figure 75:
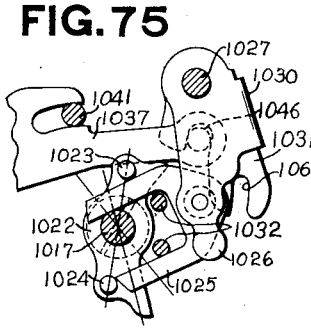
Figure 76:
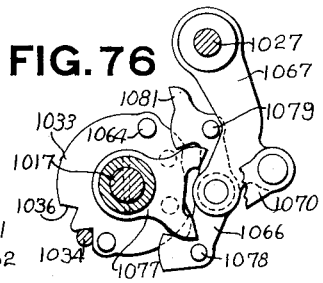
Figure 77:
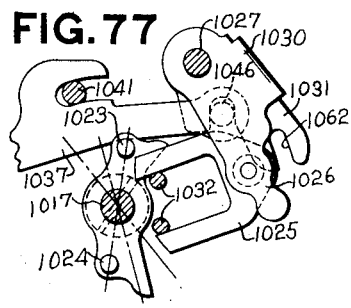

With the disk 1033 standing at the position in which it is illustrated in Fig. 71, the pins 1032 aline the lower prong of the member 1025 with the pin 1024 so that when the arms 1026 and 1031 are rocked clockwise the lower prong engages the pin 1024 and rocks the lever 1022 and the shaft 1017 clockwise to the position shown in Fig. 75. When the disk 1033 is rocked counter-clockwise to the position shown in Fig. 80, the pins 1032 rock the U-shaped member 1025 clockwise, bringing the upper prong of the member 1025 into alinement with the pin 1023 on the lever 1022. Now when the arm 1026 is rocked clockwise the upper prong of the member 1025 strikes the pin 1023 and rocks the lever 1022 and shaft 1017 counter-clockwise past neutral position to the position shown in Figs. 81, 82 and 83. In this position the fingers 1019 (Fig. 67) are positioned to restrain the platens for the second and fifth columns in their retracted positions, allowing the platen for the third column to operate. Only the disks 997 for the second, third and fifth columns have recesses in their zero positions, therefore all other platens are disabled and the platens for the second, third and fifth columns are under the control of the shaft 1017. The means for operating the arms 1026 and 1031 to selectively set the shaft 1017 will now be described.

One end of a link 1037 (Fig. 70) is pivotally supported by an arm 1038 mounted on a rod 1039 supported in the frames 974 and 975. A slot 1040 in the link 1037 embraces a stud 1041 pivotally coupling a link 1042 and one arm of a bell crank 1043. The bell crank 1043 is pivoted on the rod 1001 and carries a pair of rollers 1044 cooperating with a cam plate, which cam plate 1045 is fast on the shaft 837.

The link 1037, at its righthand end, carries a stud 1046 (Fig. 78) projecting on both sides of the link. The stud 1046 is adapted to be shifted into either a slot 1047 in the arm 1031 or a vertical portion of slot 1050 in an arm 1051, pivoted on the rod 1027. The particular slot 1047 or 1050 in which the stud 1046 rests is determined by the cams 1045 secured to the shaft 837 which is in turn set by the first transaction differential.

Figure 78:
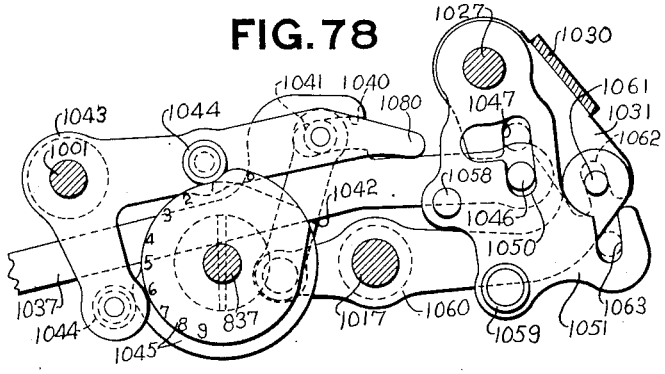

The cams 1045 are so shaped that when standing in any position except the zero position, the bell crank 1043, link 1037 and the stud 1046 occupy the positions in which they appear in Figs. 70 and 78, the stud 1046 cooperating with the slot 1050 in the arm 1051. If, however, the cams 1045 are rotated counter-clockwise to the zero position under the influence of the first transaction differential, they rock the bell crank 1043 counter-clockwise, raising the link 1037, thus shifting the stud 1046 from the operating portion to the idle portion of slot 1050 and into cooperative relation with the slot 1047 in the arm 1031. Later in the operation the link 1037 is drawn toward the left (Fig. 70) rocking the yoked arms 1031 and 1026 clockwise, thrusting the pronged member 1025 over the studs 1032 to rock the lever 1022 and shaft 1017. As stated above, the direction of movement of the shaft 1017 depends upon the position of the disk 1033. The mechanism for positioning the disk 1033 will be described later.

The mechanism for reciprocally operating the link 1037 includes a cam groove 1052 (Fig. 70) in the face of the cam 1053 secured to the shaft 986. A roller 1054 on a pitman 1055 projects into the cam groove 1052. The righthand end of the pitman 1055 is pivotally connected to the link 1037 at the point of connection of said link and the arm 1038. In order to drive the shaft 986 and the cam 1053 a gear 1056 (Fig. 66) secured on the printer drive shaft 991 meshes with a gear 1057 fast on the shaft 986. One counter-clockwise rotation of the shaft 991 and the gear 1056 drives the gear 1057, and consequently the shaft 986 one clockwise (Fig. 70) rotation at each operation of the machine.

At the proper time, after the differentials are set to position the cams 1045, the cam groove 1052 (Fig. 70) draws the pitman 1055 and the link 1037 leftward, the stud 1046 rocking the arms 1026 and 1031, or the arm 1051, depending upon the position at which the first transaction differential is stopped, clockwise a predetermined distance. Assuming that the first transaction differential stops at zero, the shaft 837 (Fig. 78) is rotated by this differential and the cams 1045 rotate counter-clockwise one step of movement from the position in which they are shown in Figs. 70 and 78, at which movement the cams 1045 rock the bell crank 1043 counter-clockwise. The bell crank 1043 by the stud 1041, rocks the link 1037 counter-clockwise, raising the stud 1046 from the lower part of the slot 1050 in the arm 1051 and into the slot 1047 in the arm 1031.

Now, when the link 1037 is drawn leftward, the stud 1046 (Fig. 78) rocks the arm 1031 and through the yoke 1030, the arm 1026, clockwise thrusting the pronged member 1025 toward the left. When this occurs, one of the prongs, depending upon the position of the disk 1033, strikes its stud 1023 or 1024 and rocks the lever 1022 and shaft 1017 correspondingly.

If, however, the first transaction differential stops at any position other than the zero position, that is, at any one of its positions from 1 to 9 inclusive, the cams 1045 (Fig. 78) rotate clockwise from zero position to one of the positions 1 to 9, rocking the bell crank 1043 clockwise. This lowers the link 1037, positioning the stud 1046 in the slot 1050 in the arm 1051. When the link 1037 is drawn toward the left under this condition a stud 1058 and a roller 1059, both being mounted on the arm 1051 cooperates with the arms of the lever 1022 to rock said lever and the shaft 1017 to neutral position.

The stud 1046 (Fig. 78), as explained above, rests either in the slot 1047 in the arm 1031, or in the slot 1050 in the arm 1051, and it is necessary to aline the particular arm 1031 or 1051 not coupled by the stud 1046 to the link 1037, against movement. This is accomplished by rocking an aliner lever 1060 (Figs. 70 and 78) pivoted on the shaft 1017 and having one of its arms connected to the lower end of the coupling link 1042. The other arm of the lever 1060 carries a stud 1061 projecting from both sides of the arm, and which stud is adapted to cooperate with a slot 1062 in the arm 1031 or with a slot 1063 in the arm 1051.

When the shaft 837 and the cams 1045 (Fig. 78) stand in any position other than the zero position, the bell crank 1043 assumes the position in which it is shown in Fig. 78, with the stud 1046 engaged with the slot 1050 to operate the arm 1051. In this position the bell crank 1043, due to the coupling link 1042, positions the lever 1060 as shown in this figure, with the stud 1061 in the slot 1062 in the arm 1031. Since the operating link 1037 is now coupled to the arm 1051, the arm 1031 and consequently the arm 1026, are held against movement by the stud 1061.

When the shaft 837 and the cams 1045 are rotated counter-clockwise from the position in which these parts appear in Fig. 78, to the zero position, the cams 1045 rock the bell crank 1043 counter-clockwise, shifting the stud 1046 into the slot 1047 in the arm 1031, and at the same time, by the link 1042, rock the lever 1060 clockwise, carrying the alining stud 1061 out of the slot 1062 and into the slot 1063 in the arm 1051 to aline this arm against movement while the arm 1031 is being actuated to set the shaft 1017.

It was set forth above that the shaft 1017 is rocked to its effective positions under the control of the disk 1033. This disk is set to either one of its two positions under the control of the shaft 1017 and it is set at a certain one of its positions under the control of the first transaction differential. The mechanism for setting the disk 1033 now will be described.

Two pins 1064 and 1065 (Figs. 71, 74, 76, 80, 82 and 85) mounted diametrically opposite each other in the disk 1033, project across the planes of feet formed on the ends of a floating lever 1066 pivotally carried on the lower end of an arm 1067 depending from the rod 1027. To actuate the disk 1033 a link 1070 (Fig. 71) connects the arm 1067 to one arm of the bell crank 1071 mounted on a shaft 1072, journaled in the printer frames. The other arm of the bell crank 1071 carries a roller 1073 projecting into a cam groove 1074 in the face of the cam 1053.

Early in the operation the cam groove 1074 rocks the bell crank 1071 counter-clockwise thrusting the link 1070 toward the right. This swings the arm 1067 counter-clockwise carrying the lever 1066 away from the pins 1064 and 1065. When the link 1070 is moved toward the right, a projection 1075 on the upper edge of said link comes into contact with a stud 1076 on the aliner arm 1034, thus positively holding the disk 1033 against movement while the arms 1026 and 1031, or the arm 1051 is actuated to set the shaft 1017.

The effective positions of the shaft 1017 determine the position to which the disk 1033 is to be moved. It will be remembered that the shaft 1017 has three positions. An arm 1077 (Figs. 71, 74, 76, 80, 82 and 85) secured to the shaft 1017 also has three positions corresponding to the three positions of the shaft 1017. When, for instance, the arm 1022 and the shaft 1017 are rocked clockwise from the neutral position shown in Fig. 72, to the position in which these parts appear in Fig. 75, the arm 1077 is rocked from its neutral position (Fig. 76) to the position shown in Fig. 80.

Now when the cam groove 1074 draws the links 1070 leftward, rocking the arm 1067 clockwise, a stud 1078 in the lower arm of the lever 1066 comes into contact with the arm 1077 and continued movement of the arm 1067 rocks the lever 1066 counter-clockwise about its pivot. The upper foot of the lever 1066 is thereby rocked into contact with the pin 1064 rocking the disk 1033 counter-clockwise to the position shown in Fig. 80, the pins 1032 on said disk assuming the position indicated in Fig. 79.

Figure 79:
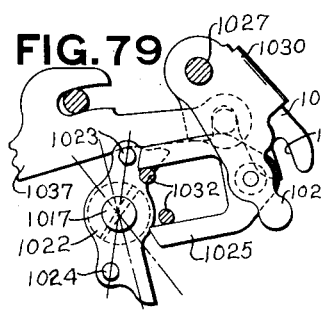

The pronged member 1025 now occupies the position shown in Fig. 79, and when the arms 1026 and 1031 are operated, at the following operation of the machine, the upper prong of the member 1025 strikes the pin 1023, rocking the lever 1022 and the arm 1077 counter-clockwise to the position shown in Figs. 84 and 85, respectively. In this position of the shaft 1017, as set forth above, the fingers 1019 (Fig. 67) are in position to cooperate with studs 1021 in columns 2 and 5. At the same time the lever 1022 is rocked counter-clockwise, the shaft 1017 and the arm 1077 are rocked in the same direction from the position shown in Fig. 82 to the position shown in Fig. 85.

When the arm 1067 is again rocked clockwise near the end of the operation, the pin 1079 in the upper arm of the floating lever 1066, causes this lever, upon continued clockwise rotation of the arm 1067, to rock clockwise about its pivot. At this action the lower foot of the lever 1066 comes into contact with the pin 1065 and rocks the disk 1033 clockwise to the position in which it appears in Fig. 85. In this position of the disk, the pins 1032 thereon have been lowered, carrying the pronged member 1025 to the position shown in Fig. 84, with the lower prong of said member in line with the pin 1024 on the lever 1022.

Figure 80:
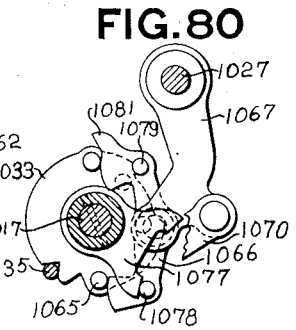
Figure 92:
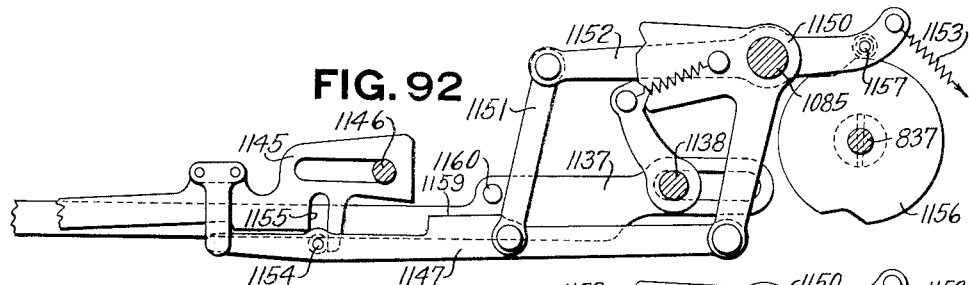
Figure 93:
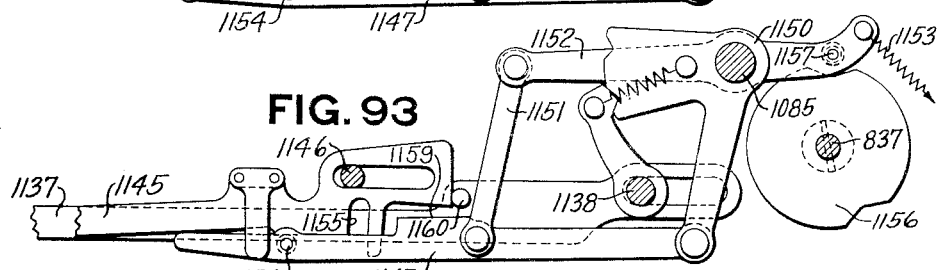

Now, upon operation of the arms 1026 and 1031, the member 1025 acting through the pin 1024 rocks the lever 1022, the shaft 1017 and the arm 1077 clockwise to the position in which these parts appear in Figs. 79 and 80, respectively. In this position of the shaft 1017 the finger 1020 is in position to prevent the operation of the platen to print in column 3.

Thus when listing checks, the impressions are made alternately in column 2 and column 3, the transaction printing in column 5 simultaneously with the printing of the amount in column 2. If several check listing operations are made consecutively the above described mechanism functions to control the platens to print first in column 2 and then in column 3, after which the statement sheet is fed and the next impression made in column 2 on the next blank line. This sequence continues so long as checks are being listed under the control of keys 135, except the "total checks" key or until the sequence is interrupted by another kind of operation, for instance, a total-taking operation or an operation involving a deposit. In fact any operation other than a check listing operation will interrupt the sequence of printing alternately in the second and third columns and cause the impression to be made in another column.

If a deposit key 140 (Fig. 2) is depressed following a check listing operation and the machine again is operated the shaft 1017 (Fig. 67) and the fingers 1019 and 1020 are set to neutral. The platens are then under the control of the disks 997, which disks determine that the deposit platen is to function to print the amount of the deposit in the deposit column. Also if the total keys 492 and 497 inclusive (Fig. 2) are depressed, the platens again are placed under the control of the disks 997, which selects the balance and date platens for operation.

The shaft 1017 is set to neutral position by the action of the arm 1051 (Fig. 70) when the first transaction differential is resting in a position other than the zero position, rotating the cams 1045 away from zero position. As above described, this rocks the bell crank 1043 (Fig. 78) clockwise, coupling the link 1037 to the arm 1051. The arm 1051 is then rocked clockwise to set the lever 1022 and shaft 1017 to neutral position. The link 1037 remains coupled to the arm 1051 until the first transaction differential again is set to its zero position. During the time the cams 1045 are out of their zero positions the arms 1026 and 1031 are held against movement. Consequently the pronged member 1025 does not function to displace the lever 1022 and shaft 1017 from their neutral positions.

At the first check-listing operation, following a deposit or a total-taking, read, or reset operation, the amount of the check always is printed in the second column, regardless of the column in which the last previous check was printed. Let it be assumed that the amount of the last check listed was printed in column 3 and that the check-listing operations were then interrupted by entering a deposit the amount of the deposit being printed in column 4. Another check now is to be listed and the amount thereof printed in column 2.

In order automatically to select the platen for the second column, the shaft 1017, which now stands at neutral, must be rocked clockwise to its position shown in Fig. 75. To do this it is necessary first to rock the disk 1033 clockwise to bring the lower prong of the member 1025 into cooperative relation with the pin 1024 on the lever 1022. But since the shaft 1017 stands in its neutral position the pins 1078 and 1079 (Fig. 76) upon clockwise movement of the arm 1067 straddle the arm 1077, and in the absence of other controls the lever 1066 would not function to position the disk 1033. Another control is therefore provided to block movement of the upper arm of the lever 1066 thus causing the lower arm of said lever to contact the pin 1065 thus rocking the disk 1033 clockwise for the purpose set forth above.

This mechanism includes a projecting finger 1080 (Figs. 70, 71, 74 and 78) on the end of the horizontal arm of the bell crank 1043. On total-taking and deposit operations, it will be remembered, that the bell crank 1043 is rocked clockwise as the cams 1045 are rotated out of zero position by the first transaction differential, lowering the finger 1080 into the path of a projection 1081 on the upper arm of the floating lever 1066.

Near the end of the deposit or total-taking operation, when the arm 1067 is rocked clockwise, carrying the lever 1066 therewith, the projection 1081 strikes the finger 1080, accomplishing the same purpose as does the pin 1079 when said pin strikes the arm 1077, that is, it rocks the lever 1066 clockwise about its pivot. At this movement the lower foot of the lever 1066 engages the pin 1065 in the disk 1033 and rocks this disk clockwise, the pins 1032 lowering the pronged member 1025.

At the next succeeding check-listing operation the first transaction differential rotates the cam 1045 to zero, rocking the bell crank 1043 counter-clockwise. This couples the link 1037 to the arm 1031, so that when this arm is operated the yoked arm 1026 thrusts the member 1025 to the left, rocking the lever 1022, the shaft 1017, and the selector fingers 1019 and 1020 (Fig. 67) clockwise to the position wherein the platen for printing in the second column is selected.

If after a check is listed in column 2, a deposit is made or a total is taken, the same operation occurs, that is, the bell crank 1043 is rocked clockwise, coupling the link 1037 to the arm 1051 and positioning the finger 1080 in the path of the lever 1066. The arm 1051 restores the shaft 1017 to neutral and the lever 1066 sets the disk 1033 to lower the pronged member 1025 so that at the next succeeding operation the shaft 1017 is rocked to select the No. 2 platen.

48. Statement sheet feed mechanism

Mechanism is provided to feed the statement sheet. This mechanism, however, does not function to feed the sheet at each operation, but operates under the control of the first transaction differential and the platen selector shaft 1017 to feed the statement sheet on certain operations only. For instance, when making up a statement sheet the old balance is first picked up and a deposit is then entered, the deposit being printed in column 4, after which any check or checks drawn to the particular account are listed, at the same time the amounts of the checks are subtracted from the balance standing on the balance totalizer. After all of the checks are listed, the balance is taken, the amount of this balance being printed in the balance column, which is, in the instant case, column 7.

When entering or listing a series of checks, the amount of the first check listed automatically is printed in column 2. The amount of the next check is printed in column 3 on the same line. The third consecutive check listed is printed in column 2, as described above, but the statement sheet is fed just before the amount of this check is printed.

If a deposit is entered following the entry of a deposit the statement sheet is fed just before the second deposit is printed.

Figure 65:
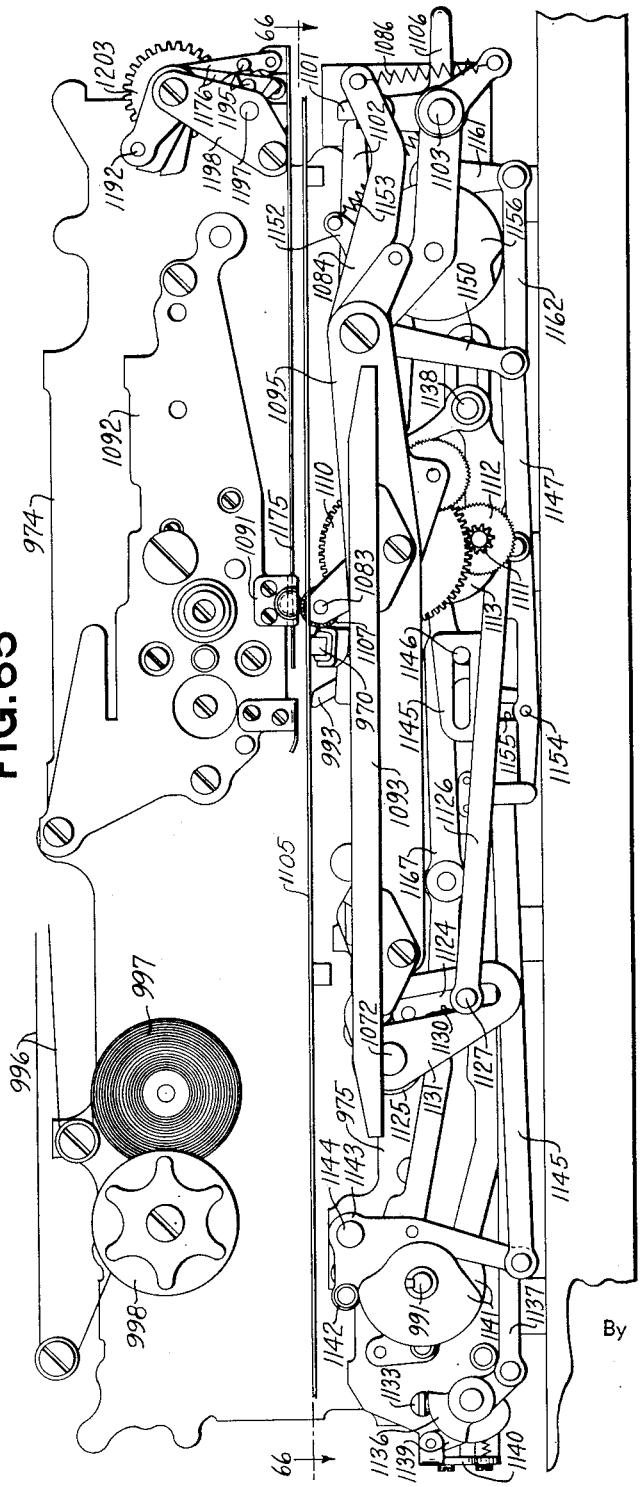
Fig. 65 is a view in front elevation of the printing mechanism.
Figure 72:
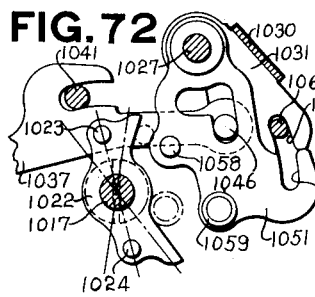
Figure 73:
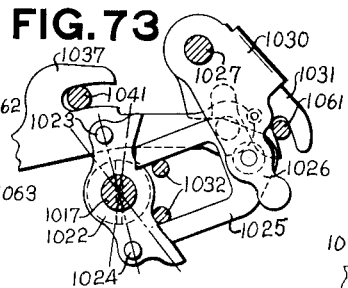
Figure 74:
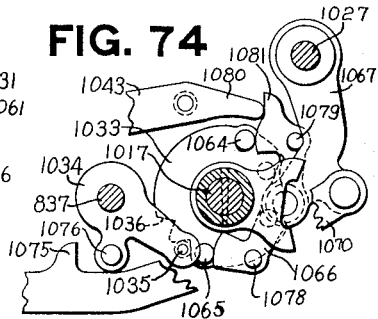

The feed mechanism includes a pair of knurled feed rollers 1082 (Figs. 66A, 87 and 91) formed integrally with a shaft 1083, rotatably mounted in a pair of levers 1084. These levers are mounted on a shaft 1085 journaled in the printer frames 974 and 975. Springs 1086, one attached to each of the levers 1084, tend to press the rollers 1082 against knurled rollers 1087 mounted on a shaft 1090, supported in the printer back frame 974 and in a bracket 1091, secured to a suitably supported printer plate 1092 (Fig. 65.)

The tension of the rollers 1082 pressing against the rollers 1087, created by the springs 1086, may be released manually by operation of a tension release bar 1093 (Figs. 1, 65, and 66A) mounted on studs 1094 projecting from a lever 1095 having its hub clutched to the shaft 1085. The studs 1094 project through clearance openings in the machine cabinet (see Fig. 1), the lever 1095 being located just inside this cabinet and the bar 1093 being just outside the cabinet in the front of the machine. A retaining cap screw 1096 (Fig. 66A) holds the lever 1095 on the end of the shaft 1085.

Arms 1097 (Figs. 66A, 87 and 91), one secured to the shaft 1085 alongside each of the levers 1084, carry studs 1098 projecting beneath the spring arms of the lever 1084. Operation of the bar 1093 rocks the lever 1095, the shaft 1085, and the arms 1097 counter-clockwise, the studs 1098 carrying the levers 1084 therewith, thus removing the rollers 1082 from contact with the rollers 1087. The counter-clockwise movement of the shaft 1085 and consequently of the arms 1097 and levers 1084 is limited by an arm 1099 secured to the shaft 1085 striking the shaft 1039.

When the bar 1093 is operated, rocking the shaft 1085 counter-clockwise, a spring 1100 (Fig. 91) rocks a shouldered retainer arm 1101 beneath the right hand end of a lever 1102 secured to the shaft 1085 to restrain the feed rollers 1082 in their retracted positions. After the statement sheet, indicated at 1104 (Fig. 87) is placed in printing position on a table 1105 (Fig. 65) suitably supported in the printer, tension is reestablished by releasing the levers 1084 to the action of their springs 1086. This is accomplished manually by rocking clockwise a handle 1106 integral with the retaining arm 1101, which handle projects through an opening in the right hand side of the cabinet (see Fig. 1). As soon as the lever 1102 escapes the retaining arm 1101, the springs 1086 rock their respective levers 1084 clockwise, creating a tension or pressure on the statement sheet 1104 between the sets of rollers 1082 and 1087.

The retaining arm 1101 may also be rocked mechanically, as is hereinafter described, releasing levers 1084 to the influence of their springs should the operator neglect to do so prior to the beginning of the operation.

The statement sheet 1104 is fed from right to left (Fig. 87) and in order to accomplish this movement it is necessary to rotate the feed rollers 1082 counter-clockwise, as viewed in this figure. To this end a pinion 1107 (see also Fig. 66A) secured to the shaft 1083 meshes with a gear 1110 rotatably mounted on a stud projecting inwardly from the forward lever 1084. A pinion 1111 secured to the side of a ratchet 1112 meshes with the gear 1110. The pinion 1111 and the ratchet 1112 are rotatably mounted on a stud carried by a drive arm 1113 pivotally carried on the stud supporting the gear 1110. A spring-pressed dog 1114 carried by the arm 1113 permits counter-clockwise rotation of the ratchet 1112 but prevents clockwise rotation thereof.

To advance the statement sheet, the arm 1113 is rocked first clockwise and then counterclockwise to normal. The clockwise movement of the arm 1113 carries the pinion 1111 and the ratchet 1112 therewith, tending to rotate the pinion clockwise, due to its engagement with the gear 1110. Since the dog 1114, holds the ratchet 1112 and pinion 1111 against clockwise rotation, the clockwise movement of the arm 1113 results in a clockwise rotation of the gear 1110, which gear rotates the pinion 1107 and the feed rollers counter-clockwise for the purpose of feeding the statement sheets.

To prevent reverse movement of the feed rollers 1082, a pinion 1115 having a ratchet 1116 secured thereto, is mounted on a stud projecting from the lever 1084 and meshes with the gear 1110. A spring-pressed dog 1117 carried by the lever 1084 cooperates with the ratchet 1116 to prevent clockwise rotation of said ratchet and the pinion 1115.

When the gear 1110 is rotated clockwise, as above described, the pinion 1115 of the ratchet 1116 rotates counter-clockwise, but when the arm 1113 is rocked counter-clockwise to normal, the dog 1117, by preventing clockwise rotation of the pinion 1115 prevents counter-clockwise rotation of the gear 1110, thus preventing retrograde or reverse rotation of the feed rollers.

The drive arm 1113 is actuated by a cam 1118 (Figs. 66, 87 and 89) secured to the printer drive shaft 991. A cam groove 1119 in the face of the cam 1118 embraces an anti-friction roller (not shown) carried on the end of a coupling stud 1120 slidably mounted in a pitman 1121 and in a slotted arm 1122. The purpose of the arm 1122 is to withdraw the stud 1120 from the cam groove 1119 thus disabling the mechanism for feeding the statement. The mechanism for operating this stud and for controlling the operation is described later.

The pitman 1121, at its right hand end, is pivotally coupled to an arm 1123 (Fig. 89) fast on the shaft 1072. A link 1124 (Fig. 87) connects an arm 1125 loosely mounted on the shaft 1072 to the left hand end of a link 1126, the connecting stud 1127 for the links 1124 and 1126 passing through a long slot 1130 in an arm 1131 fast on the shaft 1072. The right hand end of the link 1126 is connected to the drive arm 1113.

When the cam groove 1119 draws the pitman 1121 leftward, said pitman rocks the arm 1123, shaft 1072 and the arm 1131 clockwise. This draws the link 1126 toward the left, actuating the statement sheet feed mechanism, as above described. The cam groove 1119 restores the parts to normal near the end of each operation.

A sleeve 1132 (Fig. 90) connects the arm 1125 to a sector 1133 having a concentric slot 1134 therein. This slot 1134 embraces a stud 1135 projecting from the frame 975. The sector is adjustably rotatable about the shaft 1072 and a nut 1136 is provided on the stud 1135 to lock the sector in its adjusted position.

The structure just described, located intermediate the cam 1118 and the feed drive arm 1113, forms a convenient means for adjusting or varying the length of feed imparted to the statement sheet. Obviously, rotation of the sector 1133, by the sleeve 1132, arm 1125 and link 1124, raises or lowers the stud 1127 in the slot 1130 in the arm 1131, thereby varying the extent of travel of this stud, the link 1126 and the feed drive arm 1113.

A spring 1128 retains the feed mechanism in its rightmost position when the stud 1120 is withdrawn from the cam groove 1119.

49. Control of statement sheet feed by first transaction differential

It was stated above that the stud 1120 (Figs. 66, 87 and 89) may be either in or out of cooperative relation with the cam groove 1119 to determine if the statement sheet is to be fed or not. On operations other than check listing operations this control resides in the first transaction differential and includes the following described mechanism:

The arm 1122 (Figs. 66, 87 and 89), which controls the stud 1120, is secured on a shaft 1133 slidably mounted in the printer frames 974 and 975. At its forward end (Fig. 66) the shaft 1133 carries a stud 1134 projecting downwardly into a cam groove 1135 in a drum cam 1136 rotatably mounted on a stud projecting from the frame 975. The cam 1136 is pivotally connected to a long link 1137 having its right hand end slidably mounted on a stud 1138 projecting from the frame 975.

The link 1137 has two positions, that shown in Fig. 88 and the position wherein the link is shifted toward the left from the position shown in Fig. 88. With the link 1137 in its right hand position (Fig. 88) the shaft 1133 (Fig. 66) is held in its forward position by the cam groove 1135, holding the stud 1120 out of the cam groove 1119 (Fig. 87). In this position the feed mechanism is disabled. When, however, the link 1137 is shifted toward the left, it rocks the cam 1136 clockwise, the cam groove 1135 sliding the shaft 1133 inwardly, enters the stud 1120 into the cam groove 1119 (Fig. 87). In this position the feed mechanism will function to feed the statement sheet.

A spring-pressed aliner 1139 (Fig. 88) supported on a bracket 1140 secured to the end of the printer frame 975 holds cam 1136 in the position in which it is set.

The mechanism for operating the link 1137 includes a pair of cams 1141 secured to the printer drive shaft 991. These cams cooperate with rollers 1142 on the bell crank 1143 mounted to swing on a stud 1144 projecting from the frame 975. The downwardly extending arm of the bell crank 1143 is connected to a link 1145 having its right hand end slidably mounted on a stud 1146 projecting from the frame 975.

A coupling is provided to couple the link 1145 to the link 1137 whereby the link 1145 may draw the link 1137 toward the left to adjust the cam 1136. This coupling includes a coupling link 1147 (Figs. 88 and 92 to 96 inclusive) having its right hand end pivotally supported on the downwardly extending arm of a bell crank 1150, pivoted on the shaft 1085. A link 1151 connects the coupling link 1147 to a lever 1152, also pivoted on the shaft 1085.

A spring 1153 constantly urges the lever 1152 clockwise to enter a stud 1154 on the coupling 1147 in a slot 1155 in the lower edge of the link 1145, but, as viewed in Fig. 88, is prevented from doing so by a stud 1157 on the lever 1152 resting on the periphery of a disk 1156 secured to the shaft 837, which shaft is set by the first transaction differential.

So long as the disk is stopped in its "0" position or its "2" to "8" inclusive position, the lever 1152 is prevented from rocking clockwise. However, if the disk 1156 is set to either its "1" or "9" position, a recess in the periphery of the said disk is presented to the stud 1157. The lever 1152 is still held against clockwise movement, however, since, just before the differentials are adjusted, the cams 1141 (Fig. 88) thrust the link 1145 toward the right, positioning a face 1158 on the lower edge of the link 1145 above the stud 1154. The parts are now in the position shown in Fig. 93.

The cams 1141 now, near the end of the operation, draw the link 1145 leftward to its normal position. As the link 1145 arrives at its normal position, the slot 1155 registers with the stud 1154 and the spring 1153 rocks the lever 1152 clockwise. This movement, by the link 1151, raises the coupler 1147 until a face 1159 on the upper edge thereof strikes a stud 1160 in the link 1137.

Figure 94:
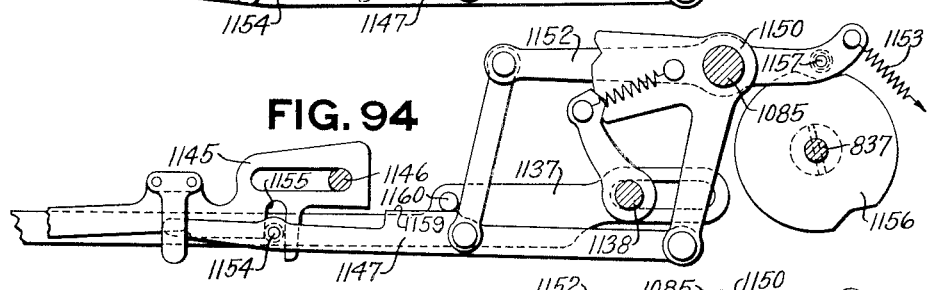
Figure 95:
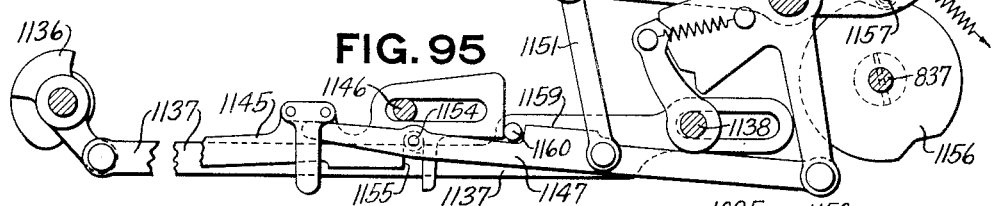
Figure 96:
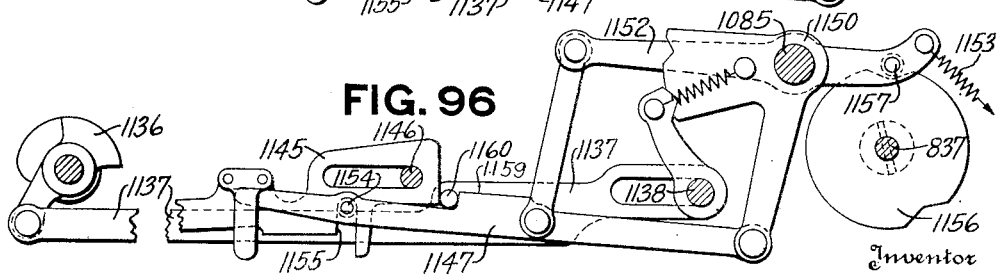

The parts are now, at the end of the operation, in the position shown in Fig. 94, and, whereas the statement sheet has not been fed at the operation just described, a condition has been set up whereby the statement sheet will be fed at the next operation just before the impression occurs, providing that a condition, to be described later, is not set to determine that a feed is not to occur.

Assuming that, at the next operation, the first transaction differential is arrested in the same position, that is, in the "1" position, the recess in the disk 1156 remains under the stud 1157. Just before the differential is adjusted, the link 1145 is thrust toward the right, and, since the stud 1154 is now resting in the slot 1155, the coupler 1147 is thrust toward the right therewith. As soon as the shoulder formed by the face 1159 passes to the right of the stud 1160, the spring 1153 rocks the lever 1152 farther clockwise, raising the coupling link 1147 to the position shown in Fig. 95.

Now, when the cams 1141 draw the link 1145 toward the left, due to the connection 1154 and 1155, it draws the coupling link 1147 therewith and this link draws the link 1137 also toward the left, rocking the cam 1136 clockwise. The parts are now in the position shown in Fig. 96.

The clockwise movement of the cam 1136 thrusts the shaft 1133 inwardly, carrying the arm 1122 therewith, and thrusts the stud 1120 into the cam groove 1119. At this time the cam 1118 has completed about one-half of its rotation and immediately after the stud 1120 is thrust into the groove 1119 said groove draws the pitman 1121 toward the left to feed the statement sheet, as described above.

It was mentioned above that the retaining arm 1101 (Fig. 91) is rocked from under the lever 1102 automatically should the operator forget to do so manually. This is accomplished by the link 1145 on its travel toward the right. As the link nears the end of its movement the right hand end thereof strikes a slide 1148 having its right hand end pivotally connected to the arm 1101. The left hand end of the slide 1148 is mounted on a stud 1149 projecting from the other arm of the lever 1102. As the link 1145 continues its rightward movement it shoves the slide 1148 toward the right therewith rocking the arm 1101 to establish tension between the rollers 1082 and 1087.

50. Control of the feed by the platen selector shaft

It was stated above that when listing a series of checks it is desired to print the first check in column 2, the second check in column 3 on the same line, the third check in column 2 on the next line, etc. In order to accomplish this alternate printing it is necessary to control the feed mechanism from the platen selector shaft 1017, which shaft, as above described, controls the selection of platens when listing checks. This control of the feed is done in the following described manner:

The shaft 1017 extends to the front of the printer frame 975 and an arm 1161 (Figs. 88 and 97 to 101 inclusive) secured to the forward end of said shaft, pivotally carries the right hand end of a link 1162. A link 1163 connects the other end of the link 1162 to one arm of a lever 1164, pivoted on the shaft 1085. A spring 1165 constantly urges the lever 1164 in a clockwise direction but is normally prevented from rocking the lever 1164 by a finger 1166 carried by one arm of a long lever 1167 pivoted on a stud projecting from the frame 975. The lever 1167 carries a roller 1170, cooperating with a cam 1171 secured on the shaft 991, which cam normally holds the lever 1167 in the position shown in Fig. 97, in which position the finger 1166 rests above a stud 1172 in the link 1163 to restrain the lever 1164 against the action of the spring 1165.

It will be remembered that the shaft 837 is positioned by the first transaction differential to its zero position on check-listing operations. In this position a disk 1173 fast on said shaft presents a recess in the periphery of said disk to a stud 1174 in the lever 1164.

Assuming that the last operation was either a total taking or a deposit operation, the shaft 1017 is left standing at its neutral position at the end of said operation. The first check-listing operation is then made, at which operation the shaft 1017 is rocked clockwise to select the "2" and "5" platens. This thrusts the link 1162 toward the left (see Fig. 98). Also the link 1145 is moved to the right to insure that the link 1137 is in its right hand position to disable the feed.

The cam 1171 now permits the spring 1165 to rock the lever 1164 clockwise to raise the link 1162, but at this time the stud 1160 rests above the link 1162, restraining said link against upward movement. The link 1145 is then restored leftward to normal position, and near the end of the operation, the cam 1171 rocks the lever 1167 clockwise, lowering the link 1162.

At the next or second check-listing operation the lever 1022 and shaft 1017 are rocked to the position shown in Fig. 81, in order to select the third platen. This movement rocks the shaft counter-clockwise from the position shown in Fig. 98 to that shown in Fig. 100. This carries the end of the link 1162 to the right of the stud 1160. Now when the cam 1171 permits the spring 1165 to rock the lever 1164 clockwise, the stud 1160 does not obstruct the upward movement of the link 1162, which now assumes the position shown in Fig. 101. The link 1145 receives its regular excursion, but since the link 1137 is in its right hand position this movement is idle.

Near the end of the operation the cam 1171 rocks the lever 1167 to lower the link 1163 and the link 1162.

The statement sheet has not yet been fed. Consequently the first and second checks were entered on the same line, but in columns 2 and 3 respectively. When entering the third check the second column is selected and it becomes necessary to feed the statement sheet in order to avoid printing over the impression of the first check.

At the beginning of the operation, whereat the third consecutive check is listed, the shaft 1017, the arm 1161, and the link 1162 are in the positions shown in Fig. 100. The link 1145 moves toward the right at the beginning of the operation. Shortly thereafter the cam 1171 permits the spring 1165 again to rock the lever 1164 clockwise, raising the link 1162 to the position shown in Fig. 101. Now when the shaft 1017 is rocked clockwise to select No. 2 platen, the link 1162 is thrust leftward, the end of said link abutting the stud 1160 carries the link 1137 therewith. The leftward movement of the links 1162 and 1145 coincide exactly. This rocks the cam 1136 clockwise to render the feed mechanism effective. The sheet therefore is fed and the third impression made in column 2 on the next line.

At the end of the third consecutive check-listing operation the parts occupy the position shown in Fig. 99. At the next or fourth consecutive check-listing operation the shaft 1017 is rocked counter-clockwise to select the platen for column 3. This draws the link 1162 toward the right, but just before this occurs the link 1145 thrusts the link 1137 toward the right, positioning the stud 1160 above the link 1162 to restrain the latter in its ineffective position. The statement sheet is not fed at the fourth operation. Therefore, an impression is made in the third column on the same line with the previously entered check.

51. Blur shields

In order to protect the statement sheet against blurring or smudging when an adjacent platen is operated, each group of type wheels is provided with an individual blur shield 1175 (Fig. 102) having its right-hand end pivotally supported on one arm of a bell crank 1176 mounted on a stud 1177 projecting from the printer frame 974. At their left-hand ends Fig. 102) the shields 1175 are slidably supported on a flat bail 1178 carried by a stud 1179 projecting from the frame 974. The shields 1175 are guided by studs 1180 in the bail 1178 projecting through slots in the shields.

The bail 1178 is further supported by a pair of levers 1181 pivoted on the stud 1179. These levers carry studs 1182, which are embraced by notched ears 1183 projecting upwardly from the bail 1178. Studs 1184 on the other arms of the levers 1181 are embraced by slots 1185 in arms 1186 pivoted on a stud 1187 projecting from the frame 974. The arms 1186 are joined by a yoke 1190.

The purpose of the above described construction is to adjust the distance of the blur shields from the type wheels by simultaneously rocking the levers 1181, which is accomplished by rocking the yoked arms 1186 in any suitable manner.

At an operation of the machine, the shields 1175 are first shifted toward the right and are then selectively shifted leftward to effective positions by individual springs 1191. The means for withdrawing the shields 1175 includes a bail 1192 carried in arms 1193 mounted on the stud 1177. At the proper time near the beginning of the operation, the bail 1192 is rocked counter-clockwise, (Fig. 103) to the position indicated in Fig. 104, picking up the bell-cranks 1176 and carrying said bell-cranks counter-clockwise therewith. This draws the shields 1175 toward the right.

To rock the bail 1192 a link 1194 connects said bail with the bell-crank 1010, previously described, mounted on the shaft 1001, the bell-crank 1010, being connected by a link 1012, as above described, to the bell-crank 1013 mounted on the shaft 986.

Early in the operation the cam groove 1015 rocks the bail 1007 (see Fig. 67) counter-clockwise to raise the studs 999 out of the recesses in the disks 997 in order to permit platen selection. This movement of the shaft 1001 and of the bell-crank 1010 is made use of in order to draw the shields 1175 toward the right to permit selection thereof. When the bell-crank 1010-1011 rocks counter-clockwise, the link 1194 rocks the bail 1192 in the same direction, which bail picks up all of the bell-cranks 1176 and rocks them counter-clockwise.

Each of the bell-cranks 1176 carries a stud 1195 projecting laterally from the downwardly extending arms thereof. Cooperating with the stud 1195 is a series of selectors 1196 mounted on a shaft 1197 supported in the frame 974 and having its forward end mounted in a bracket 1198 supported by the stud 1177 and by a stud 1199 also extending forwardly from the frame 974. One side of the shaft 1197 is flattened and the selectors 1196 fit snugly over said shaft so that rotation of the shaft is transmitted to the selectors. The selectors 1196 are spaced apart longitudinally on the shaft 1197 by spacers 1200.

Each of the selectors 1196 has radial projections 1201 differentially spaced around the shaft 1197 and said shaft is adapted to be rotated differentially by the first transaction differential to bring certain of the projections 1201 into the path of the corresponding studs 1195 to block leftward movement of the blur shield 1175 associated therewith.

To rotate the shaft 1197, a gear 1202 secured to the inner end thereof meshes with a gear 1203 rotatably mounted on the stud 1177. The gear 1203 is connected by a hub 1204 to a gear 1205, also rotatably mounted on the stud 1177. The gear 1205 meshes with a segment lever 1206, mounted on a stud 1207 in the frame 974, the opposite end of which lever 1206 meshes with a gear 1210 secured on the shaft 837. This shaft, as set forth above, is rotated by the first transaction differential and, through the train of gears just described, differentially rotates the shaft 1197 and the selectors 1196 correspondingly.

The projections 1201 are so arranged that when the shaft 837 is rotated, setting the platen selecting disks 997 (Fig. 67) to select a particular platen or platens, the selectors 1196 are positioned to restrain the corresponding blur shields in their right-hand or ineffective positions.

Mechanism is also provided to control the selection of the blur shields on check-listing operations when, as stated above, the first transaction differential stops at its zero position. This mechanism includes an arm 1211 (Fig. 105) pivoted on the shaft 1197 and having a projection 1212 thereon. The arm 1211 is joined by a yoke 1213 to an arm 1214 also mounted on the shaft 1197. A link 1215 connects the arm 1214 to an arm 1216 secured to the platen selector shaft 1017. Two arms 1217 and 1218 also mounted on the shaft 1197 and embracing the yoke 1213 are provided with projections 1219 and 1220, respectively.

The projection 1212 (Fig. 105) on the arm 1211 cooperates with the stud 1195 on the bell-crank 1176 to control the selection of the blur shield for the second column, and the projection 1219 and 1220 on the arms 1217 and 1218 cooperate with the studs 1195 on the bell-cranks 1176 to control the selection of the shields for the third and fifth columns respectively.

When the shaft 1197 is set at zero, as it is on check-listing operations, the projections 1201 on the selectors 1196 are presented to the studs 1195 on the bell-cranks 1176 for all columns except columns 2, 3 and 5. Therefore the blur shields for columns 1, 4, 6 and 7 are rendered effective on check-listing operations, whereas the shields for columns 2 and 5 or column 3 are selected under control of the projections 1212, 1219 and 1220 on the arms 1211, 1217 and 1218, respectively, on check-listing operations.

Also, on all operations other than check-listing operations the shaft 1017 is set at neutral, as set forth above, wherefore none of the arms 1211, 1217 and 1218 are effective, the selection of the blur shields, at such operations residing in the shaft 1197 and the selectors 1196, as set under the control of the first transaction differential.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

I claim:

1. In a machine of the class described, a totalizer, an overdraft device therefor, a selecting device cooperating therewith, a plurality of differentials each having a movable stop cooperating therewith, a reciprocable member forming a part of the selecting device and having the direction of its initial movement controlled by other parts of the selecting device, a driving means causing movement of the reciprocable member in a direction determined by the selecting device, and means enabling the movement of the reciprocable member to withdraw one of the stops from cooperative relation with its differential.

2. In a machine of the class described, in combination with two zero stops, a link movable to two positions, means, actuated by the link, to retract one zero stop when the link is moved to one position, and to retract the other zero stop when it is moved to the other position, and two differential mechanisms cooperating with said zero stops to be selectively released for operation by the selective retraction of said stops.

3. In a machine of the class described having a source of power to enable its operation, the combination of a balance totalizer operable to perform addition and subtraction; overdraft mechanism associated with said balance totalizer and operable whenever the sign of the amount in the totalizer changes; and, a propelling means for said overdraft mechanism, the means including a cam driven from said source of power, a driven lever normally having an idle movement, and a means adapted to be tripped by said balance totalizer to obstruct the idle movement of the lever.

4. In a machine of the class described, in combination with an algebraic totalizer, an overdraft mechanism including a means to add a fugitive unit, control means for said means, a device to positively drive the control means, and a second means to secure an idle movement of the driving device when the totalizer remains in its normal or its overdrawn condition, and to secure a driving movement when the totalizer changes from one condition to the other.

5. In a machine of the class described, in combination with an algebraic totalizer, an overdraft mechanism including a means to add a fugitive unit, the means including a driven lever, a rack, and a latch, the latch, when not tripped, holding the rack against movement by the driven lever, and when tripped, releasing the rack for movement by the driven lever.

6. In a machine of the class described, a driven lever, one end thereof having a rack connected thereto, said rack being normally held against movement, the lever swinging idly about the connection with the rack during each normal operation of the machine; and a latching means, tripped whenever an overdraft occurs, to release the rack for movement, and to obstruct the movement of the idly swinging lever.

7. In a machine of the class described, a shiftable totalizer, an overdraft device therefore including a member extending along the totalizer and receiving an initial movement in either one of two directions whenever the totalizer wheel of highest denomination passes through zero, and means to control the movement of a transfer element in the units denomination by a movement of the member.

8. In a machine of the class described, a shiftable totalizer, an overdraft device having two members shiftable with the totalizer and movable initially in two other directions, a transfer element, and means actuated by one of the members to shift the element in one direction when the two members are moved in one direction, and actuated by the other member to shift the element in the same direction when the two members are moved in the other direction.

9. In a machine of the class described, a rod having wheels and other elements rotatably mounted thereon; differential actuators for driving the wheels; machine driving means; additional means for driving said other elements, and normally inoperative by the machine driving means; means controlled by the wheels to render the drive for the elements operative by the machine driving means; fugitive unit entering means; and means operated by said elements for controlling the operation of the fugitive unit entering means.

10. In a machine of the class described, a rocker mounted on a shaft and adapted to be swung to one of two positions, a pitman slidably mounted on the shaft and having a camming engagement with the rocker, whereby movement of the rocker in either direction compels initial movement by the pitman in one direction, means operated by the pitman when it is moved and means, controlled by a totalizer, to shift the rocker.

11. In a machine of the class described, an add and subtract totalizer, racks to engage the totalizer to enter numbers thereon, a differential arm, the movement of which determines whether the totalizer is to add or subtract, a stop, and means to release the stop to enable the differential arm to move, the means including two movable fingers, and a spanning lever controlled by the two fingers and adapted to be actuated by either.

12. In a machine of the class described, a normally restrained arm, means to free the arm for movement, the means including two fingers, a lever having two arms, each arm cooperating with a finger, and a member connected to the lever, the above parts being so connected and supported that a movement of either finger will free the arm.

13. In a machine of the class described, a totalizer, a mechanism to condition the totalizer to add or subtract, two stop members, means on the conditioning mechanism, cooperating with the stop members, to restrict the movement of the conditioning mechanism unless both stop members are moved, and a single means controlling movement of both stop members.

14. In a machine of the class described, a totalizer, a state controlling mechanism including a stop member and fingers cooperating therewith, means to position the fingers, means to normally hold the stop member out of cooperation with the fingers, and a machine release means to enable cooperation between the stop member and the fingers.

15. In a machine of the class described, a totalizer, a state controlling mechanism including an arm, stop members cooperating therewith to limit the movement thereof, a pivoted member holding the stop members normally in the path of the arm, and means to release the stop members for movement tending to remove them from the path of the arm.

16. In a machine of the class described, a totalizer, a state controlling mechanism including an arm, a stop member cooperating therewith to limit the movement thereof, fingers adapted to cooperate with the stop member to govern the extent of its movement, means to normally hold the stop member in the path of movement of the arm, and means to release the stop member for movement, the extent of which is determined by the fingers.

17. In a machine of the class described, a total-taking mechanism including a row of keys, a setting lever, and two converging levers, adapted to position the setting lever under the stem of a depressed key.

18. In a machine of the class described, a row of keys, two converging levers, a setting lever, a total plate, means to move the converging levers toward a common point, determined by a depressed key, means, including the converging levers, to position the setting lever, and means propelled by the setting lever to position the total plate.

19. In a machine of the class described, a row of keys, two converging levers, a setting lever, a total plate, means to actuate the converging levers to move the setting lever to a position determined by a depressed key, and means moved by the setting lever to position the total plate.

20. In a machine of the class described, a row of keys, two converging levers, a total plate, means to enable both converging levers to be moved into contact with any depressed key, and means to position the total plate when the levers are so moved.

21. In a machine of the class described, a row of keys, two converging levers, means to enable both converging levers to be moved into contact with any depressed key, and a setting lever, positioned under the depressed key by the movement of the converging levers.

22. In a machine of the class described, a total key, a total plate, means to position the plate after depression of the key, a control for a total-taking operation, and means, operated upon movement of the positioning means to couple the control with the machine drive.

23. In a machine of the class described, a total key, a total plate, means to position the plate after depression of the key, a control for a total-taking operation, an idler gear adapted to transmit movement from the machine drive to the control, and means to automatically engage the idler gear for operation.

24. In a machine of the class described, in combination with a key, a non-repeat device including a pawl having a cocked and a released position and a lever having a normal and a released position, the pawl being pivoted on the lever and normally held in cocked position, means to move the lever and to release the pawl from its cocked position when the machine is operated, means to return the lever to its normal position, and means on the pawl to hold the lever against return to its released position, when the key is held depressed during a machine operation.

25. In a machine of the class described, in combination with a pawl having a cocked and a released position, and a lever having a normal and a released position, a member having a tooth and a nose, means to cause the nose to move the pawl to its cocked position and to hold the lever in its normal position when the member is in one position, and means to cause the tooth to hold the lever against return to its released position when the member is in another position.

26. In a machine of the class described, a lever adapted to restrict the movement of a totalizer shifting mechanism, a member adapted to hold one end of the lever in elevated position, and means rocked at the beginning of a machine operation to free the member and allow the end of the lever to be lowered a predetermined distance.

27. In a machine of the class described, a lever adapted to restrict the movement of a differential arm, a member adapted to hold one end of the lever in elevated position, a finger, a latch for the member, and means to move the latch to free the member, so that the lever can be lowered a distance determined by the position of the finger.

28. In a machine of the class described, in combination with a shiftable add and subtract totalizer, means including an arm, the extent of movement of which arm controls the shifting of the totalizer, a member for stopping the arm in different positions, means, operated by a key, to control the movement of the stop member, machine release means, and means operated by the machine release means to render the control means effective to control the movement of the stop member.

29. In a machine of the class described, in combination with a shiftable add and subtract totalizer and a means to take a total therefrom, means including an arm adapted to control the shifting of the totalizer by being moved different amounts, and means to automatically position a stop member to stop the arm in the proper position, in accordance with the state of the totalizer, during a total-taking operation.

30. In a machine of the class described, a member moved by the depression of a total key, a plate having two studs, means on the member to hold one of the studs in elevated position when the machine is performing an adding or a subtracting operation, and additional means on the member to hold the other stud in elevated position when the machine is performing a total-taking operation.

31. In a machine of the class described, having a balance totalizer operable to perform adding and subtracting operations, and overdraft mechanism controlled by said totalizer, the combination of a member moved by the depression of a total key, a plate having two studs, means on the member to hold one stud in elevated position during a total-taking operation, and means controlled by said overdraft mechanism to hold the other stud in elevated position during a total-taking operation, if the totalizer is in an overdrawn condition.

32. In a machine of the class described, in combination with a totalizer, a stud having a path of travel during a total-taking operation, an arm adapted to be moved into the path of the stud when an overdraft occurs in the totalizer, and means to hold the stud out of cooperation with the arm during adding and subtracting operations of the machine.

33. In a machine of the class described, a totalizer having an overdraft device in connection therewith, zero elimination mechanism, and means controlled by the overdraft device to disable the zero elimination mechanism.

34. In a machine of the class described, a totalizer having an overdraft device in connection therewith, a movable member, having the extent of its movement restricted by the overdraft device, zero elimination devices, and means operated by the movable member to disable the zero elimination devices when an overdraft has occurred in the totalizer.

35. In a machine of the class described, in combination with a totalizer having an overdraft mechanism, amount type racks, a special type rack, zero elimination mechanism for the amount type racks, and means controlled and operated by the special type rack and the overdraft mechanism to disable the zero elimination mechanism.

36. In a machine of the class described, a totalizer, an overdraft device in connection therewith, a special type rack, means set by the overdraft device to restrict the movement of the special type rack, amount type racks having zero elimination devices in connection therewith, and means operated by the special type rack when its movement is restricted by the overdraft device, to disable the zero elimination devices.

37. In a machine of the class described, in combination with an algebraic totalizer, means to print the total registered thereon, means normally eliminating the zeros to the left of the significant figures, and means controlled by the totalizer to enable the printing of zeros to the left of the significant figures in the total.

38. In a machine of the class described, a notched sector, an aliner, means operating through the aliner to give the sector an increment of rotation, and another means operated by the machine drive to move the aliner into and out of engagement with the sector.

39. In a machine of the class described, a notched sector, an aliner, means operated by the machine drive to move the aliner into and out of engagement with the sector, and a manually operated means to move the aliner into and out of engagement with the sector, and at the same time impart, to the sector, an increment of rotation.

40. In a machine of the class described, a notched sector, means operated by the machine drive to move the sector from one position to another, in both clockwise and counterclockwise directions, and a key-controlled aliner adapted to hold the sector in its adjusted position.

41. In a machine of the class described, a notched sector, means operated by the machine drive to move, positively, the sector from one position to another, in both clockwise and counterclockwise directions, and an aliner adapted to give the sector an increment of rotation when operated.

42. In a machine of the class described, in combination with an element of a repeat mechanism, an aliner, means operated by the machine drive to move the aliner into and out of engagement with the element when the machine is operated, and means operated upon the depression of a key to disable the first mentioned means, and to give the element an increment of rotation through movement of the aliner.

43. In a machine of the class described, a repeat mechanism including a sector, means to give the sector an increment of rotation upon the depression of a key, and a means coupled to the first means to engage a cam slide with the machine drive, to withdraw zero stop pawls during the operation of the machine.

44. In a machine of the class described, the combination of groups of type wheels, platens to take impressions from each group, means to select the platens, a shield between each group and its platen, means to remove all of said shields, and means under the control of the platen selecting means to prevent the return of the shields corresponding to the platen selected for operation.

45. In a machine of the class described, a totalizer, means associated with its units order to add a unit thereto, and adapted to be tripped for operation, means operated by positive movement, directly through the machine drive, to trip the first means during an operation in which the totalizer wheel of highest denomination passes through zero, and means operated by the totalizer wheel of highest denomination for enabling the tripping means to be operated by the machine drive.

46. A calculating machine having a motor-operated driving means, a registering mechanism capable of addition or subtraction and of accumulating positive or negative totals, addition-subtraction controlling means for conditioning said registering mechanism for addition or subtraction, printing mechanism operable to print the exact amount in said registering mechanism, a "fugitive 1" mechanism for entering a "fugitive 1" in said register, total-taking means free to condition certain elements of said machine for total-taking at all times when said machine is not being operated, and mechanism governed by said registering mechanism and conditioned by said total-taking means, as the latter is conditioned for total-taking with the addition-subtraction controlling means in either addition or subtraction position acting to cause said motor driving means to automatically operate the machine and to cause said machine to automatically take from said registering mechanism and print either a positive or a true negative total depending upon the character of the total in said registering mechanism.

47. In a calculating machine having actuators and a registering mechanism adapted to engage one another in one relation for addition and the taking of positive totals and in another relation for subtraction and the taking of negative totals, the combination of a "fugitive 1" mechanism operable to insert a "fugitive 1" in said registering mechanism, means settable by a single manipulative member for conditioning certain elements of said machine to take from said registering mechanism directly and print the exact total in said registering mechanism, a setting member adapted to assume either of two positions, means actuated by said "fugitive 1" mechanism for moving said setting member from one position to the other whenever the "fugitive 1" mechanism is actuated to insert a "fugitive 1" in the registering mechanism, and means controlled by said setting member and conditioned by movement of said single manipulative member when the latter is set for total-taking, acting to automatically determine the addition or subtraction relation of the engagement between said registering mechanism and actuators as the machine is operated.

48. In a calculating machine having actuators and a registering mechanism adapted to engage one another in one relation for addition and the taking of positive totals and in another relation for subtraction and the taking of negative totals, the combination of a "fugitive 1" mechanism operable to insert a "fugitive 1" in said registering mechanism, a depressible total key, means controlled by said key for conditioning certain elements of said machine to take from said registering mechanism directly and print the exact total in said registering mechanism, a setting member adapted to assume either of two positions, means actuated by said "fugitive 1" mechanism for moving said setting member from one position to the other whenever the said "fugitive 1" mechanism is operated to insert a "fugitive 1" in the registering mechanism, and means controlled by said setting member and conditioned by depression of the total key, acting to automatically determine the addition or subtraction relation of the engagement between said registering mechanism and actuators as the machine is operated.

49. In a calculating machine having a motor-operated driving means, actuators, and a registering mechanism adapted to engage said actuators in one relation for addition and the taking of positive totals and in another relation for subtraction and the taking of negative totals, the combination of a "fugitive 1" mechanism operable to insert a "fugitive 1" in said registering mechanism, a single manipulative member operable to condition certain elements of the machine to take from said registering mechanism directly and print the exact total therein and to connect said driving means to the machine to drive the latter through a total-taking operation, a setting member adapted to assume either of two positions, means actuated by the "fugitive 1" mechanism for moving said setting member from one position to the other whenever said mechanism is operated to insert a "fugitive 1" in the registering mechanism, and means controlled by said setting member and conditioned by movement of said single manipulative member when the latter is set for total-taking, acting to automatically determine the addition or subtraction relation of the engagement between said registering mechanism and actuators as the machine is operated.

50. In a calculating machine having a motor-operated driving means, actuators, and a registering mechanism adapted to engage said actuators in one relation for addition and the taking of positive totals and in another relation for subtraction and the taking of negative totals, the combination of a "fugitive 1" mechanism operable to insert a "fugitive 1" in said registering mechanism, a depressible total key, means actuated by the depression of said key for releasing the motor-operated driving means to drive the machine through a total-taking operation, means controlled by the depression of said key for conditioning certain elements of said machine to take from said registering mechanism directly and print the exact total in said registering mechanism, a setting member adapted to assume either of two positions, means actuated by the "fugitive 1" mechanism, whenever it is operated to insert a "fugitive 1" in the registering mechanism, for moving said setting member from one position to the other, and means controlled by said setting member and conditioned by the depression of said total key, acting to automatically determine the addition or subtraction relation of the engagement between said registering mechanism and actuators as the machine is operated.

51. In a machine of the class described, the combination of a totalizer adapted for additions and subtractions, differential actuators for said totalizer, means for coupling said actuators and totalizer positively for addition and taking positive totals and negatively for subtraction and taking negative totals, a "fugitive 1" mechanism operable for inserting a "fugitive 1" in said totalizer, means actuated by a totalizer wheel of highest order for operating said "fugitive 1" mechanism, means for preventing the operation of said "fugitive 1" mechanism when the totalizer exceeds its capacity either positively or negatively, a setting member adapted to assume either of two positions, means actuated by said "fugitive 1" mechanism, whenever it is operated, for controlling the adjustment of said setting member to a different position, a single manipulative member operable to condition certain elements of the machine to take a total from said totalizer, and means controlled by said single manipulative member and said setting member for determining the coupling of said actuators and totalizer positively or negatively for total-taking.

52. In a machine of the class described, a balance totalizer operable to perform addition and subtraction; a plurality of other totalizers; a member settable to two positions under control of the balance totalizer in accordance with the positive or negative total therein; means for selecting said other totalizers for operation including a pair of feelers engageable with the member for causing the selection of one of said other totalizers when one of said feelers engages the member when the member is set in one position and the selection of another of said other totalizers when the other of said feelers engages the member when the member is set in its other position; and an operating member for moving the feelers into engaging relation with said settable member.

53. In a machine of the class described, a balance totalizer for receiving positive and negative entries; a plurality of groups of other totalizers; a plurality of stops, one related to each group of said other totalizers; differentially operable selecting means for said other totalizers, released by said stops; an element settable under control of said balance totalizer in accordance with the positive or negative totals therein; means shiftable under control of said element for selectively controlling the operation of the stops to control the operation of the differential mechanism to select one of said other totalizers for operation when the total in the balance totalizer is positive and to control the operation of the differential mechanism to select another of said other totalizers for operation when the total in the balance totalizer is negative.

54. In a machine of the class described, a balance totalizer having an adding and a subtracting wheel in each of a plurality of orders; means for entering amounts in said totalizer; mechanism for entering a unit in the wheels in the lowest order of the totalizer; means tripped by the highest order wheels whenever they pass between their 0 and 9 positions and tending to release said mechanism for operation, including a pair of arms settable in accordance with whether the totalizer is to add or subtract and an element shiftable to either of two positions to control the effectiveness of the mechanism, said element being shifted by one or the other of said arms only during an operation in which the sign of the amount in the balance totalizer has changed and said mechanism being operable only in an operation during which the element is shifted whereby the mechanism is inoperative to enter a unit when the capacity of the totalizer is exceeded.

55. In a machine of the class described, a balance totalizer operable to perform adding and subtracting operations; and overdraft mechanism controlled thereby and having means to enter a "fugitive one" in the lowest order of said totalizer, said mechanism including a three-armed pivoted lever which is shiftable to control the operation of the "fugitive one" entering means to enter a unit in the lowest order and means selectively engageable with two arms of said lever to shift said lever, the third arm of said lever coacting with a detent to retain the lever in its shifted positions.

56. In a machine of the class described, a totalizer; and overdraft mechanism cooperating therewith and including a member operated by the totalizer each time the highest order of the totalizer passes through zero and shiftable when the totalizer is set for addition or subtraction, an element actuated by said member whenever the sign of the amount in the totalizer changes, said element when actuated by said member being moved to a position where the member is ineffective to operate it until the member has been shifted and the sign of the amount changes so that an overdraft occurs with the member in its shifted position, a means to retain the element in its set positions, and a means to enter a "fugitive one" in the lowest order of said totalizer and conditioned for operation only when the element is actuated, whereby the "fugitive one" is inserted only upon a change of sign of the amount in the .totalizer and is not operated upon the amount exceeding the capacity of the totalizer.

57. In a machine of the class described, a totalizer comprising accumulator elements in a plurality of orders; means associated with the units order accumulating elements to enter a unit therein; means to condition said last mentioned means for operation; normally inoperative mechanism for operating said conditioning means, and driving means therefor; and means operated by the accumulator elements of the highest order, whenever the sign of the amount on the accumulator changes and the elements pass between their 0 and 9 positions, to render the normally inoperative mechanism operable by its driving means.

58. In a machine of the class described, a totalizer adapted for addition and subtraction and the taking of positive totals and negative totals; differential actuators for said totalizer; differentially operable means to establish a cooperative relation between the totalizer and actuators for adding and subtracting and for taking positive and negative totals; a pair of separately operable pawls for controlling the differential operation of said means, one of said pawls cooperating with the means to control its operation in adding and subtracting operations, and the other of said pawls cooperating with the means to control its operation in positive and negative total taking operations; and means to control the operation of said pawls.

59. In a machine of the class described, a totalizer; means for positioning said totalizer to receive positive and negative entries; a stop settable to a plurality of positions for controlling the operation of said positioning means; manipulative devices for controlling the position of the stop; means normally retaining the stop out of control of said manipulative devices; machine release means; and means operable by the machine release means to release the stop to the control of the manipulative devices when the machine is released for operation and for restoring the stop to its normal position when the machine release means is restored to its normal position.

60. In a calculating machine, actuator racks and a balance totalizer adapted to engage one another in one relation for addition and the taking of positive totals and in another relation for subtracting and the taking of negative totals; differential mechanism to selectively cause the engagement of the totalizer and actuator racks in said adding or subtracting relation; a member set under control of the totalizer in an item-entering operation in accordance with the positive or negative total in said totalizer, and operative in a total taking operation to control the extent of movement of the differential mechanism to cause engagement of the totalizer and racks in adding relation when the total in the totalizer is positive and to cause the engagement of the totalizer and the racks in subtracting relation when the total in the totalizer is negative; disabling means for rendering the member ineffective to control the differential mechanism in adding and subtracting operations; means to condition the machine for taking totals; and means operated by the conditioning means to move the disabling means in a total taking operation so that the member will be effective to control the engaging relation between the totalizer and the racks.

61. In a machine of the class described, a balance totalizer having adding and subtracting elements in each denominational order; actuators therefor; means to shift the elements to cause the adding elements to engage the actuators in adding and positive total operations and the subtracting elements to engage the actuators in subtracting and negative total operations; a control element settable to a plurality of positions to control the operation of the shifting means; means set under control of the balance totalizer in an item-entering operation, in accordance with the positive or negative total in said balance totalizer and operative only in a total taking operation for controlling the positioning of the control element; disabling means normally rendering the control element ineffective and preventing the element from being controlled by the means set under control of the totalizer; a total key; and means operated by the total key for rendering the disabling means ineffective in a total taking operation so that the element may be set under control of the totalizer to cause the shifting means to cause the adding elements to engage the actuators when the total is positive and the subtracting elements to engage the actuators when the total is negative.

62. In a machine of the class described, a manipulative device; a total plate settable to control certain parts of the machine in total taking operations; a cycle controller operable to control the cycling of the machine in total taking operations; a main driving mechanism; means for coupling said cycle controller to said main driving mechanism; and means driven by said main driving mechanism and controlled by said device for setting said total plate to cause a total taking operation and for operating said coupling means to couple said cycle controller to the main driving mechanism for operation thereby in a total taking operation.

63. In a machine of the class described, the combination of printing platens; operating means therefor; primary means for selectively rendering effective said operating means for said platens, settable to a certain position to render potentially effective the operating means for a certain plurality of platens; and auxiliary means controlled by said primary means and rendered operable as long as the primary means is set in said certain position, for rendering effective the operating means for individual platens of said certain plurality of platens in a predetermined order at successive operations of the machine while said primary means remains in said certain set position.

64. In a machine of the class described, the combination of a pair of platens; operating devices therefor; means for selectively rendering said operative devices effective during predetermined operations of the machine, including a shiftable element having means thereon operable to render effective the operating device for one of said platens during an initial operation of the machine and to thereafter render effective the operating devices for the platens alternately in successive operations; and means to shift the element during successive operations of the machine in which the first-mentioned means is effective, to enable the element to render the devices alternately effective.

65. In a machine of the class described, the combination of platens operable to cause an impression to be made on record material; operating devices therefor means settable to selectively render said devices effective additional means for selectively rendering certain of said devices effective, rendered operable when the settable means is set to certain of its positions, for controlling the operation of the devices while the settable means remains in said certain of its positions; record material feeding means; and means controlled by said additional means to control the operation of the feeding means whereby the feeding of the record material is correlated with the platen selection and operation.

66. In a machine of the class described, the combination of a plurality of totalizers; differential actuators for said totalizers; mechanism to establish a cooperative relation between one of said totalizers and said actuators; mechanism to establish a cooperative relation between another of said totalizers and said actuators; means, including a rockable element, and a link connected to the element to be movable in one direction to render one of said mechanisms operable and movable in an opposite direction to render the other mechanism operable; and means variously cooperating with the rockable element for determining the direction of movement of the link.

67. In a machine of the class described, the combination of a differential mechanism; printing platens; operating devices for said platens; mechanism for selectively rendering said devices effective, including differentially settable means and auxiliary means for further controlling the operation of selected devices rendered operable by the differentially settable means when it is set to a certain position; and normally inoperative means rendered operable by the differentially settable means, when set to said position, and set under control of the auxiliary means in one operation to control the operation of the auxiliary means in the next operation.

68. In a machine of the class described, the combination of printing platens; means to operate the platens; means to select the platens for operation, including differentially settable means and shiftable means rendered effective under control of said differentially settable means when the differentially settable means is in certain of its positions; and shifting means set under control of the shiftable means in one operation and operable to shift the shiftable means in the next operation to thereby control the selection of platens by the shiftable means during successive operations of the machine when the shiftable means is effective.

69. In a machine of the class described, the combination of printing platens; means to operate the platens; means to render the operating means selectively effective including a plurality of differentially settable selector discs; a rockable shaft having selecting means thereon; control means positionable with the selector discs; means cooperable with the control means for rendering the selecting means on the shaft effective when the selector discs occupy certain of their differential positions; and means cooperable with the means which renders the selecting means on the shaft effective and with an element on the shaft, to be positioned thereby during one operation and to control the rocking of the shaft in the next operation when the selecting means on the rock shaft is effective.

70. In a machine adapted to print on record material, the combination of printing platens; means to operate the platens; means to selectively render the operating means effective to operate the platens, including a differentially settable means and a shaft which is rockable when the differentially settable means is in certain of its positions; means rendered effective by the differentially settable means to rock the shaft; record material feeding means; and means, operated by the shaft as it is rocked, to control the operation of the feeding means in operations in which the shaft is rocked.

71. In a machine adapted to print on record material, the combination of means to feed the record material; printing platens; means to operate the printing platens; means to selectively render said operating means effective to operate certain platens, including differentially settable means and a shaft which is rocked when said differentially settable means is in certain of its positions; means settable in one operation, under control of a member on the shaft, for controlling the rocking of the shaft in the next operation; and means operated by the shaft, when it is rocked, for controlling the operation of the feeding means.

72. In a machine adapted to print on record material, the combination of record material feeding means; printing platens; operating devices for said platens; means variously settable to selectively render said devices effective during an operation; means controlled by the first-mentioned means for controlling the operation of the record material feeding means; and means set under control of the first-mentioned means during an operation for automatically changing the setting of said means during the next ensuing operation to vary its effectiveness on the devices during the next ensuing operation and operable to control the operation of the feeding means to correlate the operation of the platens and the feeding of the record material therefor.

73. In a machine of the class described, the combination of a balance totalizer operable to perform addition and subtraction; a plurality of other totalizers; differential mechanism for entering amounts in said totalizers; means to control the operation of the differential mechanism and the balance totalizer to take totals therefrom; total retaining means set by the differential mechanism to retain the total taken from the balance totalizer during said total taking operation; a manipulative device; means operated by said device to initiate an operation of said machine and to control certain parts of said machine to cause the retaining means to control the operation of the differential mechanism to cause entry of the total into one of said other totalizers; and means controlled by the balance totalizer in accordance with whether a negative or positive total was standing on said totalizer before said total taking operation and automatically operable in each operation initiated by said device, to select one of said other totalizers to receive the total if the total taken from said first-mentioned totalizer is positive and to select another of said other totalizers to receive the total if the total taken from said first-mentioned totalizer is negative.

74. In a machine of the class described, the combination of a balance totalizer operable to perform addition and subtraction; overdraft mechanism controlled by the highest order of said totalizer and operable whenever the sign of the total in said balance totalizer changes; an arm shifted, to predetermined positions to represent the sign of the amount in the balance totalizer, by the overdraft mechanism when the overdraft mechanism is operated under control of said balance totalizer; a plurality of other totalizers; actuators for said totalizers; devices for causing one or another of said other totalizers to engage said actuators to receive an entry; a sensing member normally out of engagement with the shifted arm; means for moving the member into engagement with the shifted arm and variably shifting the member by the arm, upon engagement therewith in accordance with the position of the arm; a pair of stop elements engageable with and disengageable from said devices to variously limit their operation to control the selective operation of said devices; and connections between said sensing member and said stop elements to transmit the shifting of the member to the stop elements so that one or the other of said elements is disengaged from said devices.

75. In a machine of the class described, the combination of differential mechanisms each including a stop element normally lying in effective position; a totalizer; means controlled by said totalizer and settable in accordance with whether there is a positive or negative total therein; and means controlled by the last-mentioned means to cause the selective withdrawal of one or the other of the stop elements depending upon whether the total is positive or negative, and including a rockable member moved into engagement with the settable means after it has been set to either of its positions and rocked by the settable means to either of two positions, and means enabling the rockable member to withdraw the stop elements so that the rocking of the member will cause the selective withdrawal of the stop elements.

76. In a machine of the class described, a machine driving means; a plurality of differential mechanism; a separate stop restraining the movement of each differential mechanism and movable into and out of restraining position; a balance totalizer operable to perform addition and subtraction; control means variably set under control of said balance totalizer in accordance with whether the total in said balance totalizer is positive or negative; and means controlled by said control means and operating automatically, through the machine driving means, to remove one or another of the stops from its restraining position depending upon the sign of the total in said balance totalizer.

77. In a machine of the class described, having a plurality of zero stops, the combination of a balance totalizer operable to perform addition and subtraction; "fugitive one" entering mechanism associated with said totalizer; means controlled by said balance totalizer to cause the operation of the "fugitive one" entering mechanism whenever the sign of the total changes; means settable by said control means, to one position when the total is positive and to another position when the total is negative; and means controlled by said settable means to move one of said zero stops when the member is in said one position and to move another of said zero stops when the member is in said other position.

78. In a machine of the class described, having a balance totalizer operable to perform addition and subtraction, differential mechanism, and amount storing means cooperable with said differential mechanism, the combination of a plurality of other totalizers; means, positioned under control of said balance totalizer during an entering operation in that totalizer and in accordance with the sign of the amount in said balance totalizer, for controlling the selection of said other totalizers; means to control the operation of the balance totalizer, the differential mechanism, and the storing means to clear an amount from the balance totalizer and store it on the storing means, the positioned means being unaffected by the clearing of the balance totalizer; totalizer selecting means controlled by said positioned means to select one of said other totalizers to receive said amount if it is positive and to select another of said other totalizers to receive said amount if it is negative; and means, operable after the clearing operation, to control the operation of the differential mechanism, the storing means, and the totalizer selecting means to cause the amount to be entered into the selected one of said other totalizers depending upon the sign of the amount.

79. In a machine of the class described having a plurality of zero stops, the combination of a balance totalizer operable to perform addition and subtraction; overdraft mechanism controlled by said totalizer in accordance with the sign of the amount in said totalizer; means to actuate the overdraft mechanism in either of two directions depending upon the sign of the amount in said totalizer; means thrown to one set position when the overdraft mechanism is actuated in one direction and to another set position when the overdraft mechanism is operated in the other direction; a machine driving means; and means selectively controlled by said thrown means and operated by said machine driving means to shift one of said zero stops if the amount in the totalizer is positive and to shift another of said zero stops if the amount in the totalizer is negative.

80. In a machine of the class described having a plurality of keys, the combination of a stop lever; a bell crank cooperating with the lever to maintain the lever in a normal position; means acting on the bell crank to release it and the lever for movement when one of said keys is depressed; two fingers, either of which may cooperate with the lever to limit the movement thereof to stopping positions when the lever is released by the bell crank; and means differentially stopped by said lever.

81. In a machine of the class described, the combination of a balance totalizer operable to perform addition and subtraction; differential amount entering mechanism; a plurality of other totalizers; mechanism for engaging each of said other totalizers with the differential mechanism; a plurality of control elements; means controlled by said control elements to selectively render the engaging means for said other totalizers effective; a member settable to either of two positions under control of said balance totalizer, said member occupying one of said positions when the total in the balance totalizer is positive and occupying the other of said positions when the total in the balance totalizer is negative; and means cooperable with said member for causing the selective operation of the control elements to thereby control the means for selectively rendering the engaging mechanism effective so as to enable one of said other totalizers to engage the differential mechanism when the member is set in said one position and to enable another of said other totalizers to engage the differential mechanism when the member is set in said other position.

82. In a machine of the class described, the combination of a totalizer operable to perform addition and subtraction; means to shift the totalizer to enable it to perform addition and subtraction; means associated with the units denominational order of said totalizer to enter a unit therein; control means for said unit entering means, said control means including a pair of elements shifted with the totalizer when the totalizer is shifted to enable it to perform addition and subtraction; a member shiftable to a plurality of positions to control the operation of the unit entering means; and operating means for said elements, controlled by the totalizer, for causing one or the other of said elements to operate the member in operations in which the sign of the amount in the totalizer changes, the relative position of the member and the elements determining which of the elements will operate the member.

83. In a machine of the class described, the combination of a totalizer having adding and subtracting wheels in each of a plurality of orders; means for entering amounts in said totalizer; means to enter a "fugitive unit" in the lowest order of said totalizer; means to condition the totalizer for addition and subtraction operations; and mechanism operated under control of the totalizer for controlling the operation of the "fugitive unit" entering means, said mechanism including a rockable member operable to control the operation of the "fugitive unit" entering means, a detent for retaining the rockable member in rocked position, a pair of elements settable to one position by the totalizer conditioning means when the totalizer is conditioned for addition and to another position when the totalizer is conditioned for subtraction and operable when in said positions to rock the member during an operation in which the sign of the amount on the totalizer changes, and means controlled by the totalizer for operating the elements to rock the member.

84. In a machine of the class described, the combination of an add-subtract totalizer having accumulating elements in a plurality of denominational orders; means to enter a "fugitive one" in the lowest order of said totalizer; mechanism settable to one position in adding operations and another position in subtracting operations and rendered operable, when in said positions, by the highest order accumulator elements each time they pass between their 0 and 9 positions; a rockable element rocked in one direction by said mechanism when the mechanism is operated in adding position and rocked in another direction by said mechanism when the mechanism is operated in subtracting position; means operated by the element to condition the "fugitive one" entering means for operation each time the element is rocked; and means to retain the element in its rocked positions; said element being mounted relatively to said mechanism so that the element, when rocked by the mechanism when the mechanism is in one position, is moved out of cooperative relation with the mechanism and retained in said positon until the mechanism is set to its other position.

85. In a machine of the class described, the combination of an add-subtract totalizer; a member settable to one position in adding operations and to another position in subtracting operations; means to set the member in said positions; means rendered effective by the totalizer each time the highest order of the totalizer passes through zero and operable to operate the member when said member occupies either of said set positions; an element having two projections located thereon so that one of said projections is engageable by said member in each of its set positions to rock the element when the member is operated; means to retain the element in the position to which it has been rocked; said member, when it operates and engages one of said projections to rock the element, moves that projection from the path of movement of the member in which position it is retained by the retaining means until the member is set to its other set position and operates to engage the other projection to rock the element, to thereby prevent repeated operation of the element due to the successive operations of the member in the same set position; means to enter a unit in the lowest order of said totalizer; and means operated by the element, when it is rocked, for conditioning said unit entering means for operation.

86. In a machine of the class described, the combination of a plurality of totalizers; differential actuating means for said totalizers; amount retaining sectors settable by said actuating means to represent amounts and retained in set position at the end of an operation; a first manipulative device; means rendered effective by said device to control the operation of one of said totalizers, the actuating means, and the retaining sectors to take a total from said one totalizer and set the sectors to represent the total; a member set to a plurality of positions under control of said one totalizer; means for selectively establishing a cooperative relation between other of said totalizers and the actuating means, including an element cooperable with the member to control the selective operation of the establishing means; operating means for the establishing means; a second manipulative device; and means controlled by the second manipulative device, in an operation immediately succeeding a total taking operation, to control the operation of the actuating means under control of the sectors and to couple the establishing means to its operating means to cause the selective entry of the total taken from said one totalizer into one or another of said other totalizers as determined by the cooperation of said element and said member.

87. In a machine of the class described, the combination of a balance totalizer operable to perform addition and subtraction; mechanism controlled by the highest order of said balance totalizer and actuated when the sign of the amount in said totalizer changes to enter a unit in the lowest order of said balance totalizer; a member settable by said mechanism to one position when the total is positive and to another position when the total is negative; a plurality of other totalizers; differential actuators for said totalizers; devices for selectively causing one or another of said other totalizers to engage said actuators for the entry of amounts; a rockable sensing element; means for moving the element into engagement with said member and rocking it in one direction by engagement with the member when the member is in said one position, and rocking it in another direction by engagement with the member when the member is in said other position; and connections between said sensing element and said engaging devices whereby the sensing element causes the selective operation of said engaging devices to cause one or another of said other totalizers to receive an entry depending upon the position of the member.

88. In a machine of the class described, the combination of a balance totalizer operable to perform addition and subtraction; means to enter a unit in the lowest order of said balance totalizer; means controlled by the balance totalizer to condition said unit entering means for operation during the operation in which the sign of the total in said balance totalizer changes; a plurality of other totalizers normally inoperative to receive amounts; differential actuators for said totalizers; an element settable to a predetermined position by said unit entering means conditioning means when the total in said balance totalizer is positive and to another predetermined position when the total in said balance totalizer is negative, said element remaining in its set positions until the sign of the total changes; mechanism to establish a cooperative relation between one of said other totalizers and said actuators; mechanism to establish a cooperative relation between another of said other totalizers and said actuators; means controlled by said settable means to cause one of said mechanisms to operate to prepare its totalizer for operation when the total is positive and to cause the other of said mechanisms to operate to prepare its totalizer for operation when the total is negative; and means to render the last-named means operative.

89. In a machine of the class described, actuating mechanism; a plurality of totalizers; overdraft mechanism cooperating with one of the totalizers; two differentials controlling the alinement of other of the totalizers with the actuating mechanism; and means controlled by the overdraft mechanism to free one or the other differential for movement to aline one or another of the other totalizers with the actuating mechanism.

90. In a machine of the class described, a member having initial movement in two directions; a shaft having a lever secured thereto; a second lever loosely mounted thereon; means whereby initial movement of the member in one direction will move the shaft and the one lever secured thereto, and initial movement in the other direction will move the other lever which is loosely mounted on the shaft; a pair of differentials; a pair of zero stops, one for each differential, normally restraining its movement; and connections whereby the one lever will withdraw one zero stop when moved, and the other lever the other zero stop.

91. In a machine of the class described, a machine drive; a totalizer including a rod having totalizer wheels rotatably mounted thereon; differential mechanism for rotating the totalizer wheels, and actuated by the machine drive; a unit entering mechanism associated with the units order; and members rotatably mounted on the rod, and driven directly by the machine drive, to cause actuation of the unit entering mechanism.

92. In a machine of the class described, a key; an automatic totalizer selecting mechanism; normally ineffective operating means for said mechanism; means to couple the selecting mechanism to its operating means; means, connected to said coupling means and engageable with the key to connect the key with said coupling means, and disengageable from said key to disconnect the coupling means from said key; and means controlling the connection of said coupling means and key including a member connected to said connecting means and a spring-urged reversible arm engaging said member to bias the member to cause the engagement of the connecting means and the key when the arm is in one position and to bias the member to cause the disengagement of the connecting means from the key when the arm is in another position.

93. In a machine of the class described, including a plurality of totalizers, differential actuators therefor, machine driving means, machine release means movable to set the driving means in operation, means normally blocking said machine release means from releasing movement, and amount retaining means, normally controlled by the differential actuators to be set thereby to positions corresponding to the amount represented by the differential positions of the actuators, and to be retained in said set positions at the end of the operation, the combination of totalizer selecting mechanism; control means for said totalizer selecting mechanism; means for coupling said control means to the machine driving means for operation; means to render said amount retaining means effective to control advance of the actuators; means for withdrawing the blocking means for said machine releasing means; a repeat key; and connections actuated by depression of said repeat key, for withdrawing said blocking means, actuating said coupling means, and operating said means for rendering the amount retaining means effective.

94. In a machine of the class described, the combination of printing platens; operating devices therefor; means, variously settable to selectively render said devices effective during an operation; and means, set by the last-named means during an operation, for automatically changing the setting of said means, during the next ensuing operation, to vary its effectiveness on the devices during the next ensuing operation.

95. In a machine of the class described, the combination of a plurality of groups of type wheels; printing platens to take impressions therefrom; blur shields lying normally in effective positions between the type wheels and the platens; means to select the platens to be operated; means to shift the shields to and from effective position; and means, operated by the platen selecting means, to control the shifting means whereby the shield corresponding to the selected platen is removed from effective position.

96. In a machine of the class described, a balance totalizer operable to perform addition and subtraction; a normally inoperative totalizer for accumulating positive balances; a normally inoperative totalizer for accumulating negative balances; differential actuators for said totalizers; means to establish a cooperative relation between the positive balance accumulating totalizer and the actuators; means to establish a cooperative relation between the negative balance accumulating totalizer and the actuators; means settable to a plurality of positions under control of the balance totalizer and in accordance with whether the total therein is positive or negative; and means including a rockable element moved into engagement with the settable means and rocked in one direction upon engagement with the settable means when the settable means is in one of its positions to selectively cause the operation of one of the establishing means whereby positive balances will be automatically accumulated in the positive balance accumulating totalizer, and rocked in another direction upon engagement with the settable means when the settable means is in another of its positions to cause the operation of the other establishing means whereby the negative balances will be automatically accumulated in the negative balance accumulating totalizer.

97. In a machine of the class described, the combination of a balance totalizer operable to receive positive or negative entries; a plurality of other totalizers; differential actuators for entering amounts in said totalizers; separate engaging means for each of said totalizers; operating means for said engaging means; a plurality of elements each operable to control the coupling of a different one of said engaging means with the operating means; a plurality of means, each operable to set a different one of said elements in position to cause the engaging means for a different one of said other totalizers to be coupled to the operating means to cause engagement of a different one of said other totalizers and the actuators; means settable under control of the balance totalizer and in accordance with whether the total therein is positive or negative; and means controlled by said settable means and including a plurality of control elements, each cooperable with one of said setting means to control the selective operation of its related means so that one of said other totalizers will receive positive balances and to control the selective operation of another of said setting means so that another one of said other totalizers will receive negative balances.

98. In a machine of the class described, the combination of a balance totalizer operable to perform adding and subtracting operations; a plurality of other totalizers; means for entering amounts in said totalizers; a plurality of mechanisms each operable to establish a cooperative relation between one of said other totalizers and the entering means; selecting means operable under control of the balance totalizer in accordance with whether there is a positive or a negative total therein, for controlling the selective operation of one or another of said mechanisms to establish said relation between one or another of said totalizers and the entering means to cause one of said other totalizers to receive positive balances and another of said other totalizers to receive negative balances; and a single manipulative device to control the operation of the selecting means.

99. In a machine of the class described, a balance totalizer operable to receive positive and negative entries; another totalizer to receive negative totals; actuating means for entering amounts into said totalizers; a mechanism actuated under control of said balance totalizer during an operation in which the sign of the amount therein changes, for causing the entry of a unit in the lowest order of said balance totalizer during said operation; a member settable to a predetermined position under control of said mechanism, when the balance totalizer contains a negative amount; normally ineffective means for causing said negative total totalizer to engage said actuating means to receive an amount; and means under control of said member to render the last-mentioned means effective to cause the totalizer to receive an amount when the member is in said predetermined position.

100. In a machine of the class described having a balance totalizer operable to receive positive and negative entries, a plurality of other totalizers, and differential actuators for said totalizers, the combination of a member settable under control of said balance totalizer and occupying one position when the total on the balance totalizer is positive and another position when the total on the balance totalizer is negative; mechanism for causing one or another of said other totalizers to engage said actuators to receive an entry; a plurality of elements shiftable into and out of engaging relation with the mechanism, each element operable to so limit the operation of said mechanism that one or the other of said other totalizers will be engaged with the differential actuators; power-operated means movable into engagement with said member and shiftable in one direction when it engages the member and the member occupies one of its positions, and shiftable in another direction when it engages the member and the member occupies the other of its positions; and connections between the power-operated means and the elements to shift one of the elements when the means is shifted in one direction and to shift the other of the elements when the means is shifted in the other direction.

101. In a machine of the class described having a balance totalizer operable to receive positive and negative entries, a plurality of other totalizers, and differential actuators for said totalizers, the combination of mechanism operable to enter a unit in the lowest denominational order of the balance totalizer; a device controlled by said balance totalizer and actuated whenever the sign of the balance changes to render said mechanism effective to enter a unit during the operation in which the sign changes; a member settable under control of said device in accordance with the positive or negative total in said balance totalizer; devices for causing one or another of said other totalizers to engage said actuators to receive an entry; an element movable into engagement with said member and variously shifted by the member upon engagement therewith; connections between the element and the engaging devices whereby the element causes the selective operation of the engaging devices to cause the engaging devices to engage one of said other totalizers with the actuators if the total in the balance totalizer is positive and to engage another of said totalizers with the actuators if the total on the balance totalizer is negative; a driving element operated in each machine cycle for moving the control means to carry said element into engagement with said member; and manipulative means for coupling the control means to said driving element for operation thereby.

102. In a machine of the class described, a balance totalizer operable to perform addition and subtraction; a plurality of other totalizers; actuators for said totalizers; means settable to a plurality of positions under control of said balance totalizer in accordance with whether the total therein is positive or negative; devices for selectively engaging one or another of said other totalizers and said actuators; a sensing means for sensing the position of the settable means; connections between said sensing means and said engaging devices whereby the sensing means causes the selective operation of said engaging devices to cause one or another of said other totalizers to receive an entry according to the position of the settable means; and power-operated means for moving the sensing means into engagement with the settable means to sense the position thereof and for actuating said connections.

103. In a machine of the class described, including machine release means moved at each operation of the machine to release it for operation, cycle control mechanism operable to control the cycling of the machine in total-taking operations, a control element given an initial movement and a further movement to control the operation of certain parts of the machine in a total-taking operation, and means operated by the cycle control mechanism to cause said further movement of the element during the total-taking operation, the combination with said machine release means and said control element of an operating connection for said element arranged to be actuated by said machine release means, on a total-taking operation, to impart said initial movement to said element, said connection permitting the further movement of said element, independently of movement of the machine release means.

104. In a machine of the class described, including a total key, machine release means, moved to initiate each operation of the machine, cycle control mechanism operable to control the cycling of the machine on total-taking operations, a control element given an initial movement and a further movement to control the operation of certain parts of the machine in total-taking operations, and means operated by the cycle control mechanism to cause said further movement of the element during the total-taking operation, the combination with said total key, machine release means and control element of an operating connection for said element to impart said initial movement thereto; means normally retaining said connection out of operative relation with said machine release means; and a device actuated by depression of the total key to shift said connection into operative relation with the machine release means, whereby said means will impart the initial movement to said connection and control element.

105. In a machine of the class described having machine driving means, the combination of a balance totalizer operable to perform addition and subtraction; mechanism controlled by said balance totalizer and including an arm assuming either one of two positions depending upon whether the amount in the balance totalizer is positive or negative; a plurality of other totalizers; differential actuators for said totalizers; means for causing engagement of one of said other totalizers with said actuators and driven by said machine driving means; means for causing engagement of another of said other totalizers with said actuators and driven by said machine driving means; a plurality of elements, each cooperable with a different one of said causing means and shiftable to release its related means for operation by the machine driving means; a member; means for moving the member into engagement with the arm and variously shifting the member upon its engagement with the arm, depending upon the position of the arm; and means shifted by the member to selectively shift one or the other of said elements to allow one of the causing means to be operated by the machine driving means to render one of said other totalizers operable to receive an entry if the amount in the balance totalizer is positive and to allow the other causing means to be operated by the machine driving means to render another of said other totalizers operable to receive an entry if the amount in the balance totalizer is negative.

MAXIMILIAN M. GOLDBERG.

CERTIFICATE OF CORRECTION.

Patent No. 2,175,346. October 10, 1939.

MAXIMILIAN M. GOLDBERG.

It is hereby certified that error appears in the printed specificati . of the above numbered patent requiring correction as follows: Page 4, first column, lines 46, 47 and 48, strike out "43. Repeating operation using manual selection of the totalizer.
44. Printing. In general."

and insert instead

43. Repeating operation using manual selection of the totalizer.

Printing

44. In general. ;

page 6, first column, line 40, after the word "upper" insert 120; page 9, first column, line 29, for the numeral "340" read 346; page 12, second column, line 40, for "arms 517" read arm 517; page 16, second column, line 71, for "key 404" read key 494; page 17, first column, line 26, for "line 754" read link 754; line 50, for "layer 771" read lever 771; line 58, for "lever 171" read lever 771; page 17, second column, line 18, for "prong 780, out of the path of the arm 763 during" read prong 780 until the nose 777 rests on the step; line 20, for "781 is moved under stud 782 by depression of" read 781 during this movement. The lever 190 now; line 35, for "prong 780 until the nose 777 rests on the step" read prong 780, out of the path of the arm 763 during; line 41, for "781 during this movement. The lever 190 now" read 781 is moved under stud 782 by depression of; page 19, second column, line 48, for "upon" read up on; page 23, first column, line 50, for "pawls 142" read pawl 142; and second column, line 5, strike out "44. In general printing" and insert instead Printing 44. In general ;

page 26, first column, line 43, for "cooperates" read cooperate; page 32, second column, line 2, claim 10, after "moved" insert a comma; page 35, second column, line 34, claim 54, after "subtract" insert a comma; page 36, second column, line 74, claim 65, after "effective" insert a semicolon; page 37, first column, line 32, claim 67, for "inoperative" read inoperable; page 38, first column, line 37, claim 76, for "mechanism" read mechanisms; and that the said Letters Patent should be read with this correction therein that the same may conform to the record of the case in the Patent Office.

Signed and sealed this 14th day of November, A. D. 1939.

(Seal)

Henry Van Arsdale,
Acting Commissioner of Patents.